United States Patent
Serdynski et al.

(10) Patent No.: US 7,492,125 B2
(45) Date of Patent: Feb. 17, 2009

(54) POWER TOOLS, BATTERY CHARGERS AND BATTERIES

(75) Inventors: David P. Serdynski, Waukesha, WI (US); Boyd J. Miller, Mequon, WI (US); Scott D. Bublitz, Hartland, WI (US); Troy C. Thorson, Waukesha, WI (US); Thomas R. Bednar, Pewaukee, WI (US); David B. Griep, Rubicon, WI (US); Nancy Uehlein-Proctor, Nashotah, WI (US); Dennis J. Grzybowski, New Berlin, WI (US); Jeffrey S. Holly, Menomonee Falls, WI (US); Jeffrey C. Hessenberger, Neosho, WI (US); Mark A. Kubale, West Bend, WI (US); Todd W. Johnson, Wauwatosa, WI (US); Jonathan P. Lobert, Sussex, WI (US); Jay J. Rosenbecker, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 279 days.

(21) Appl. No.: 11/267,937

(22) Filed: Nov. 4, 2005

(65) Prior Publication Data
US 2006/0119318 A1 Jun. 8, 2006

Related U.S. Application Data

(60) Provisional application No. 60/625,151, filed on Nov. 4, 2004.

(51) Int. Cl.
*H02J 7/00* (2006.01)

(52) U.S. Cl. .................... 320/114; 320/106; 320/128
(58) Field of Classification Search ................. 320/114, 320/106, 128
See application file for complete search history.

(56) References Cited

U.S. PATENT DOCUMENTS

| 2,553,688 A | 5/1951 | Thompson |
| D225,300 S | 12/1972 | Boldt |
| D246,824 S | 1/1978 | Hansen et al. |
| D252,611 S | 8/1979 | Breger |
| D262,185 S | 12/1981 | Huber et al. |

(Continued)

FOREIGN PATENT DOCUMENTS

GB 2226716 7/1990

OTHER PUBLICATIONS

IEEE 100: The Authoritative Dictionary of IEEE Standards Terms, 7th Edition (cover of dictionary, front pages with bibliographic information and pp. 171, 1260, 1290), Dec. 2000.

*Primary Examiner*—Bao Q. Vu
*Assistant Examiner*—Nguyen Tran
(74) *Attorney, Agent, or Firm*—Michael Best & Friedrich LLP

(57) ABSTRACT

A battery pack for powering a cordless power tool. The battery pack includes at least one battery cell operable to supply a discharge current, a switch operable to control the discharge current and a protection device to protect the switch. The protection device is positioned such that the device absorbs a current traveling in a direction opposite to that of the discharge current supplied from the battery cell.

7 Claims, 81 Drawing Sheets

U.S. PATENT DOCUMENTS

| | | | |
|---|---|---|---|
| 4,705,200 A | 11/1987 | Kopf et al. | |
| D315,281 S | 3/1991 | Bosten et al. | |
| 5,028,858 A | 7/1991 | Schnizler et al. | |
| D325,858 S | 5/1992 | Saito et al. | |
| D335,619 S | 5/1993 | Ogawa et al. | |
| 5,293,156 A | 3/1994 | Shoji et al. | |
| D349,637 S | 8/1994 | Hoshino et al. | |
| D364,790 S | 12/1995 | Duennes | |
| 5,526,460 A | 6/1996 | DeFrancesco et al. | |
| D390,084 S | 2/1998 | McCabe | |
| D406,737 S | 3/1999 | Farnham | |
| D411,425 S | 6/1999 | Sugimoto et al. | |
| 5,909,103 A * | 6/1999 | Williams | 320/134 |
| D423,897 S | 5/2000 | Cooper | |
| D427,038 S | 6/2000 | Lin | |
| D427,040 S | 6/2000 | Heun | |
| 6,075,341 A | 6/2000 | White et al. | |
| D427,872 S | 7/2000 | Snider | |
| D427,874 S | 7/2000 | Hayakawa et al. | |
| D428,319 S | 7/2000 | Gallagher | |
| D441,269 S | 5/2001 | Tsai | |
| 6,229,280 B1 | 5/2001 | Sakoh et al. | |
| D443,491 S | 6/2001 | Robson | |
| 6,242,889 B1 | 6/2001 | Belyo | |
| 6,331,365 B1 * | 12/2001 | King | 429/9 |
| 6,331,764 B1 * | 12/2001 | Oglesbee et al. | 320/136 |
| D460,674 S | 7/2002 | Heun | |
| 6,457,535 B1 | 10/2002 | Tanaka | |
| 6,502,949 B1 | 1/2003 | Horiyama et al. | |
| D482,253 S | 11/2003 | Cooper et al. | |
| D502,377 S | 3/2005 | Aglassinger | |
| 6,905,052 B2 | 6/2005 | Sakai et al. | |
| D509,417 S | 9/2005 | Wikle et al. | |
| D522,828 S | 6/2006 | Brazell et al. | |
| 7,064,520 B2 | 6/2006 | Heigl et al. | |
| 7,176,656 B2 | 2/2007 | Feldmann | |
| 2001/0026159 A1 | 10/2001 | Price | |
| 2002/0094703 A1 | 7/2002 | Bert et al. | |
| 2003/0102844 A1 | 6/2003 | Bailey | |
| 2003/0117108 A1 | 6/2003 | Watson et al. | |
| 2003/0127932 A1 | 7/2003 | Ishida et al. | |
| 2003/0174449 A1 | 9/2003 | Yamamoto | |
| 2003/0184161 A1 | 10/2003 | Chu | |
| 2004/0069512 A1 | 4/2004 | Ng | |
| 2004/0150228 A1 | 8/2004 | Kropp et al. | |
| 2004/0158996 A1 | 8/2004 | McIntosh | |
| 2004/0174138 A1 | 9/2004 | Moores, Jr. et al. | |
| 2004/0179829 A1 | 9/2004 | Phillips et al. | |
| 2005/0073282 A1 * | 4/2005 | Carrier et al. | 320/106 |
| 2005/0188550 A1 | 9/2005 | Uehlein-Proctor et al. | |
| 2006/0091858 A1 | 5/2006 | Johnson et al. | |
| 2006/0260458 A1 | 11/2006 | Friend | |
| 2008/0006136 A1 | 1/2008 | McIntosh | |

* cited by examiner

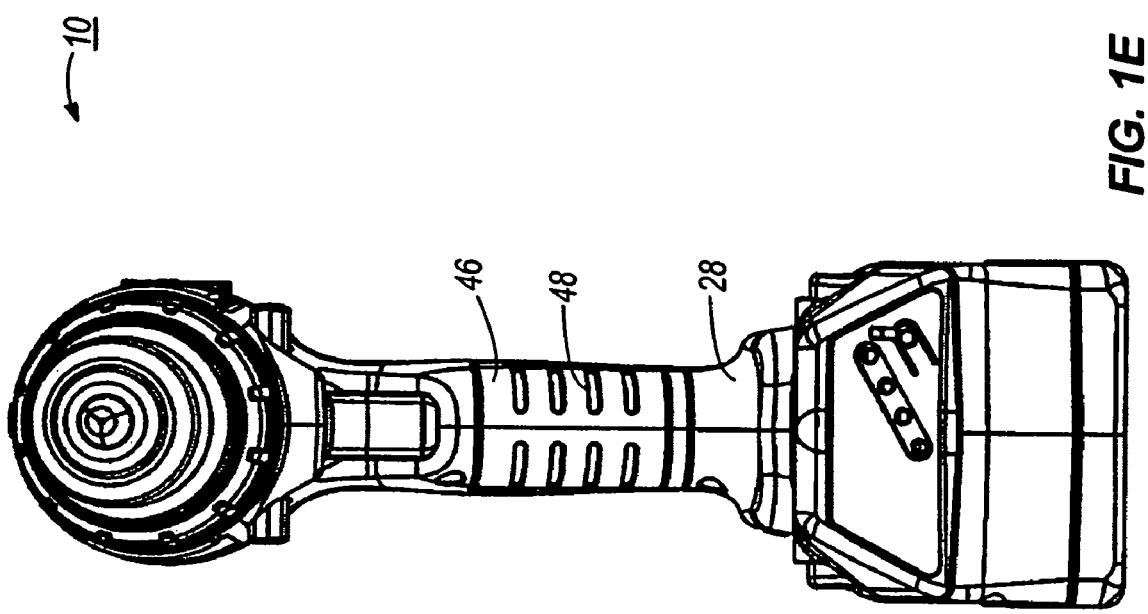

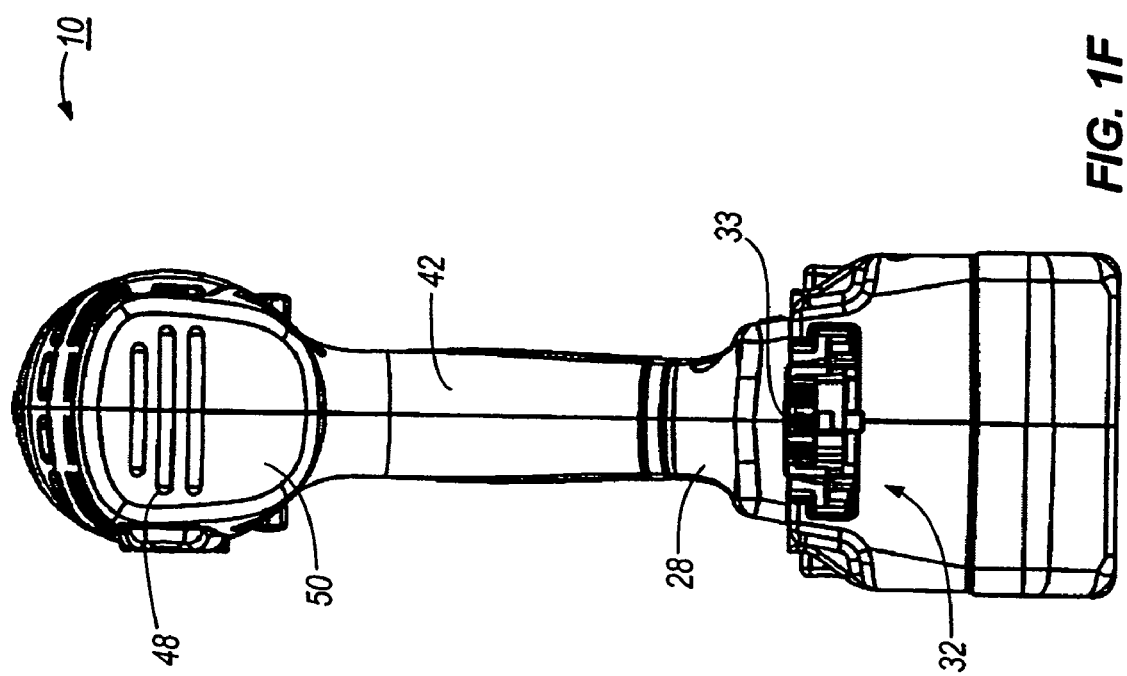

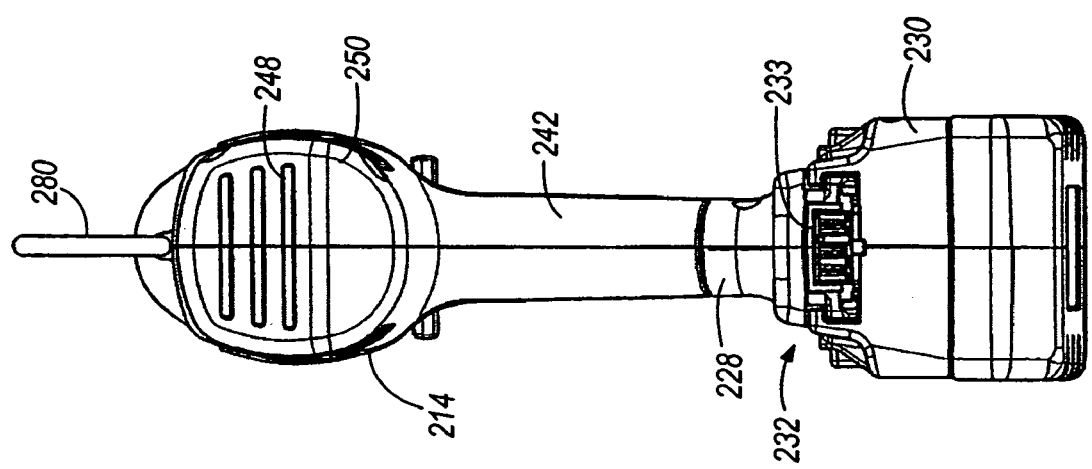

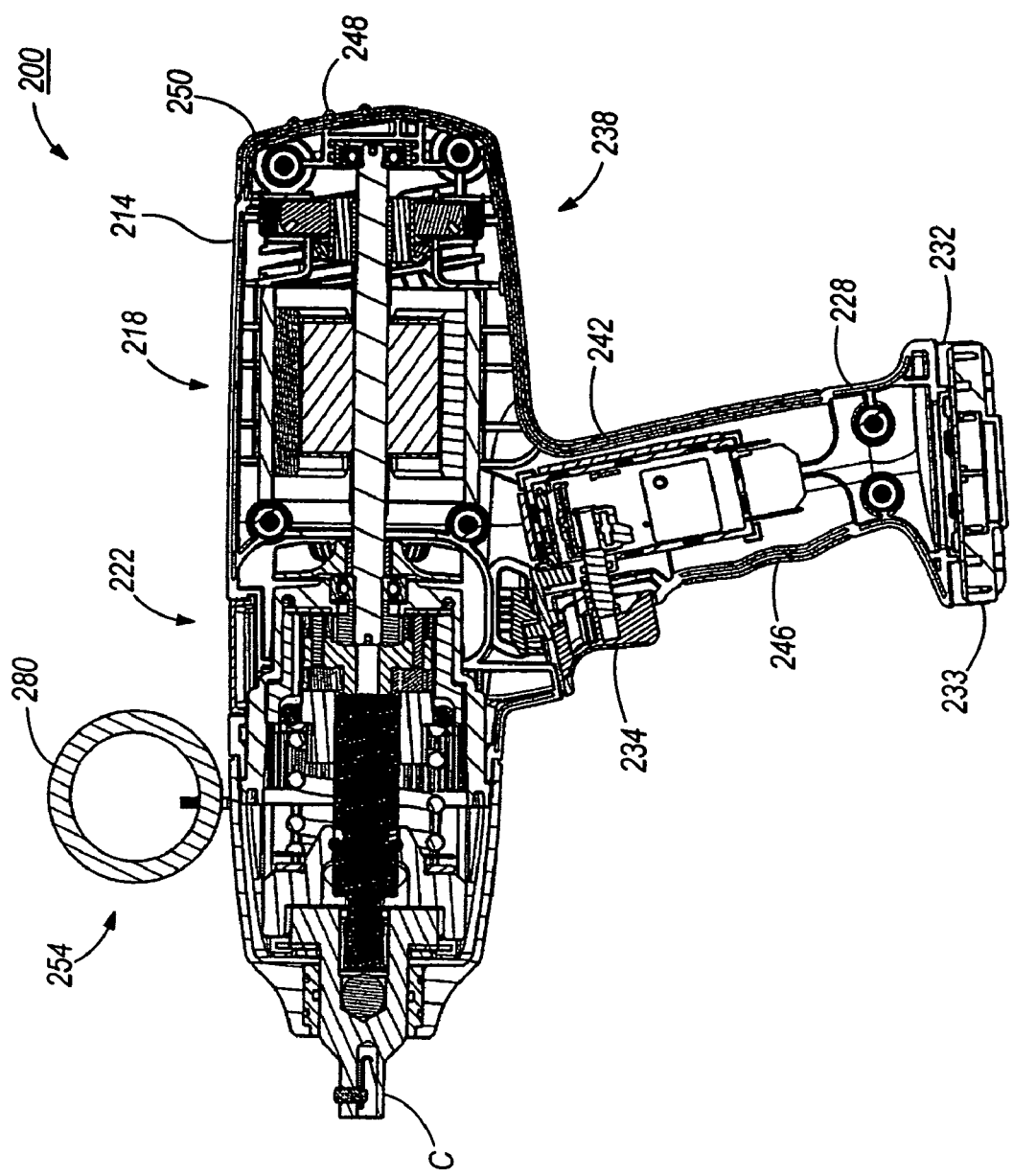

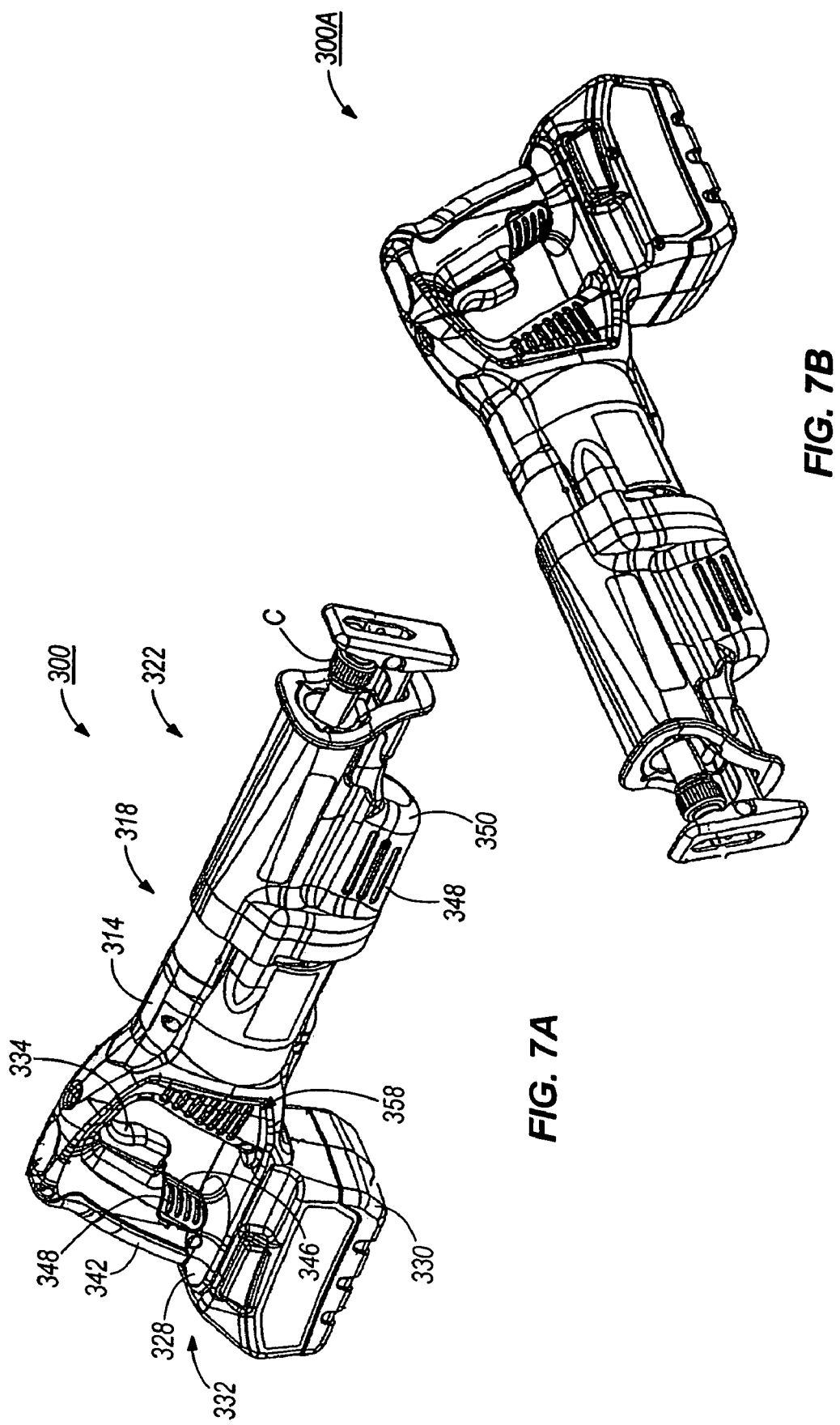

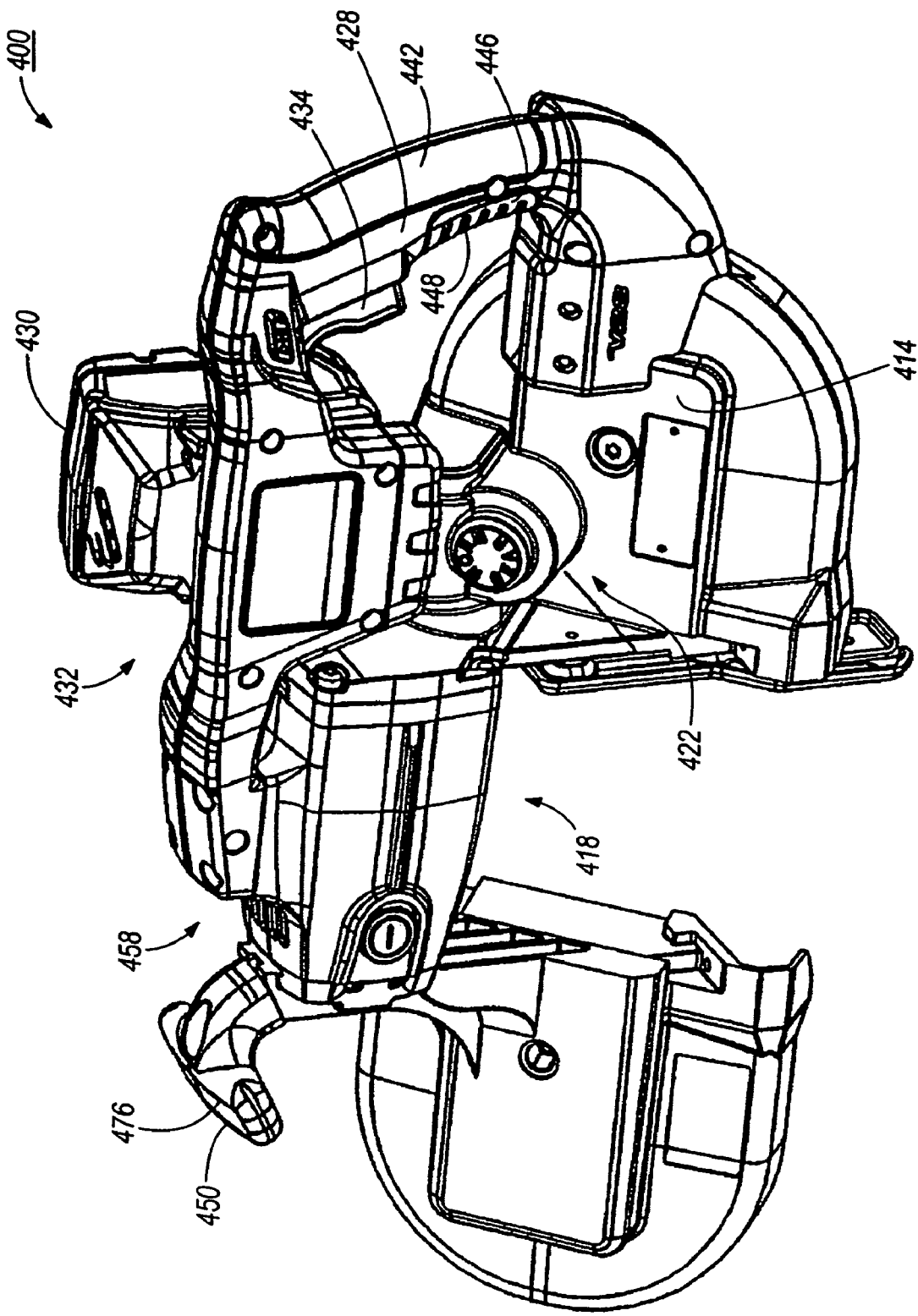

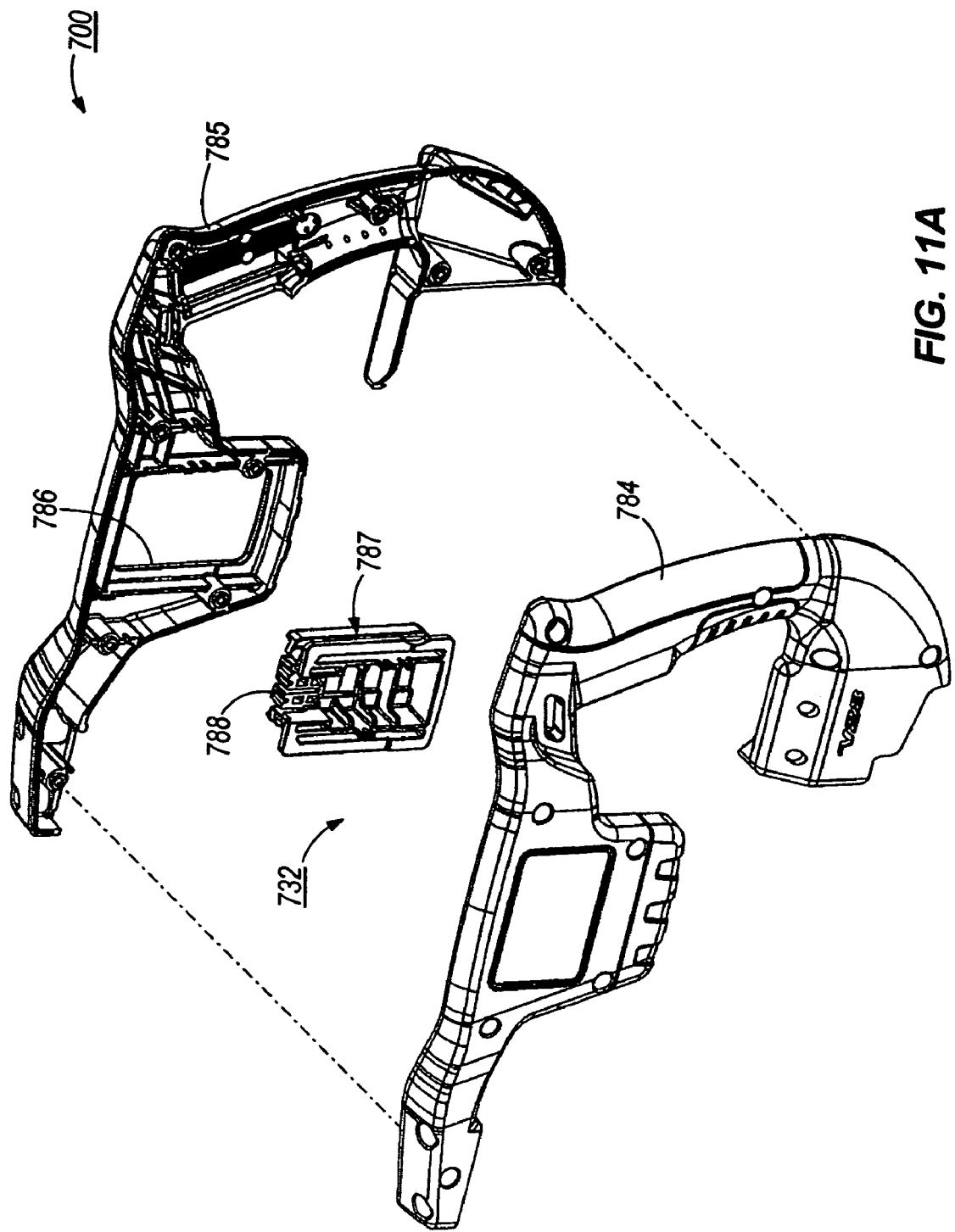

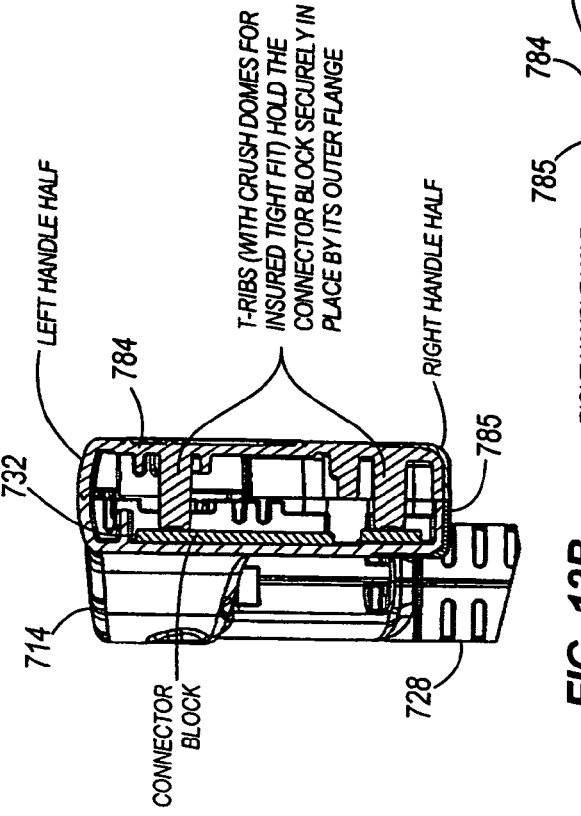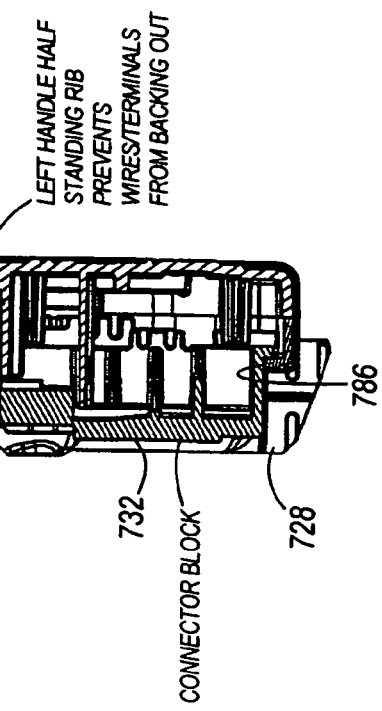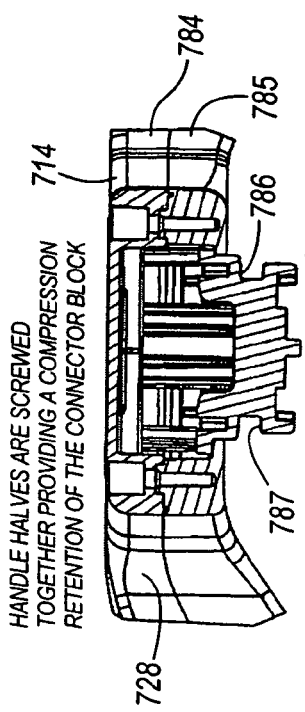

ONCE BATTERY AND TOOL ARE ASSEMBLED, THE BUMPER IS COMPRESSED. THE COMPRESSED BUMPER FILLS IN ANY HORIZONTAL CLEARANCE BETWEEN THE TOOL AND THE BATTERY. THIS ELIMINATES ANY RESIDUAL MOVEMENT BETWEEN THE BATTERY AND TOOL ONCE ASSEMBLED.

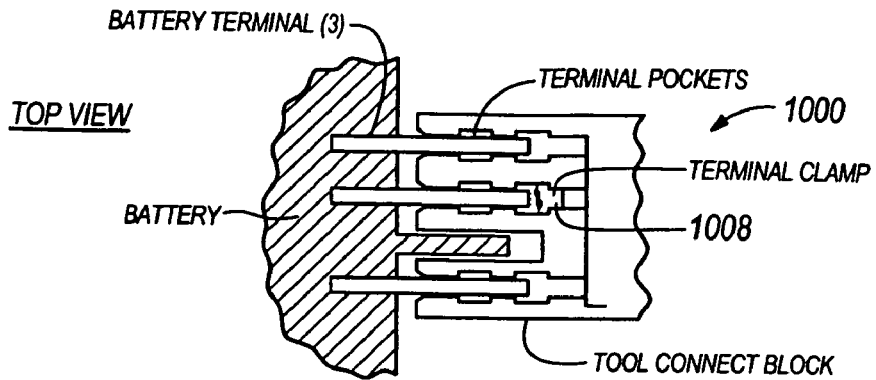

FIG. 15A

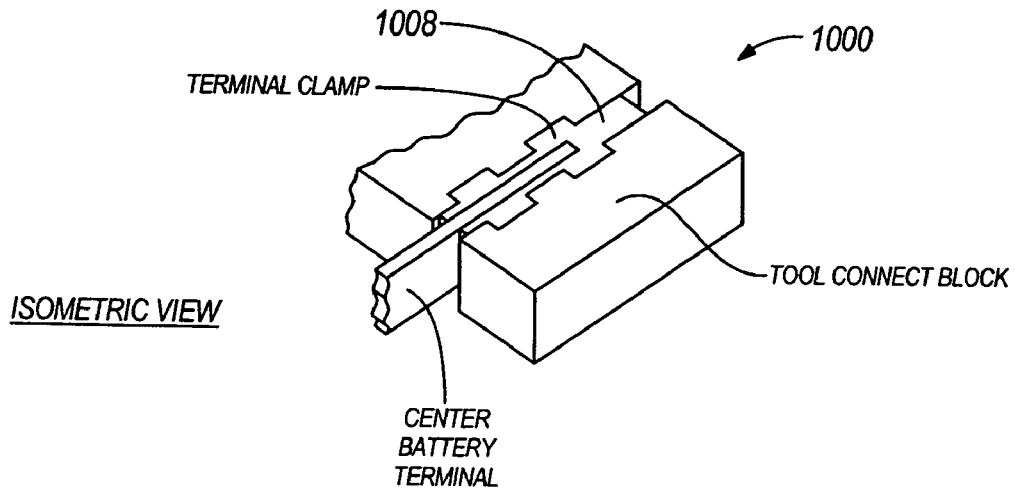

THE TERMINAL CLAMP IS A PART THAT IS THE SAME SIZE AND SHAPE OF THE TERMINAL POCKET IN THE CONNECTOR BLOCK ON THE TOOL. THERE IS A CUT IN THE CENTER OF THE CLAMP THAT ALLOWS THE BATTERY TERMINAL TO SLIDE INTO THE CLAMP. THERE IS AN INTERFERENCE FIT BETWEEN THE CLAMP AND THE BATTER TERMINAL.
WHEN THE BATTERY IS ASSEMBLED TO THE TOOL, THE CENTER TERMINAL SLIDES INTO THE CLAMP. WITH THE BATTERY ASSEMBLED, THE TERMINAL ON THE BATTERY IS "HELD" IN PLACE. THIS ELIMINATES RESIDUAL MOVEMENT BETWEEN TOOL AND BATTERY.

FIG. 15B

ONCE DETENT FEATURE MEETS THE GUIDE TRACK ON THE BATTERY COVER, DURING INSTALLATION OF THE BATTERY, A SLIGHT INCREASE IN FORCE IS REQUIRED TO CONTINUE THE ASSEMBLY OF THE BATTERY. WHEN THE BATTERY IS FULLY ASSEMBLED, THE DETENT FEATURE ON THE TOOL CONNECTOR BLOCK MEETS THE GROOVE CUT INTO THE GUIDE TRACK. THIS "LOCKS" THE BATTERY IN HORIZONTAL POSITION.

DURING ASSEMBLY OF THE BATTERY ONTO THE TOOL THE RATCHETS WILL MEET THE TEETH ON THE BATTERY'S TOP COVER. THIS WILL CREATE A "RATCHETING" SOUND. WHEN THE BATTERY IS FULLY ASSEMBLED, THE ARMS WILL LOCK THE BATTERY IN POSITION. WHEN THE BATTERY NEEDS TO BE REMOVED THE LEVER ARMS WILL BUCKLE AND ALLOW THE BATTERY TO REVERSE DIRECTION.

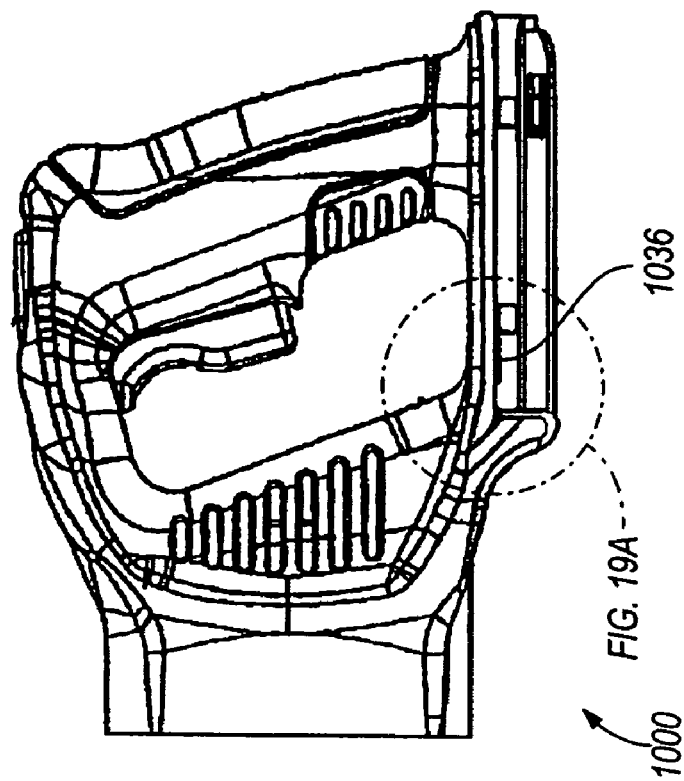
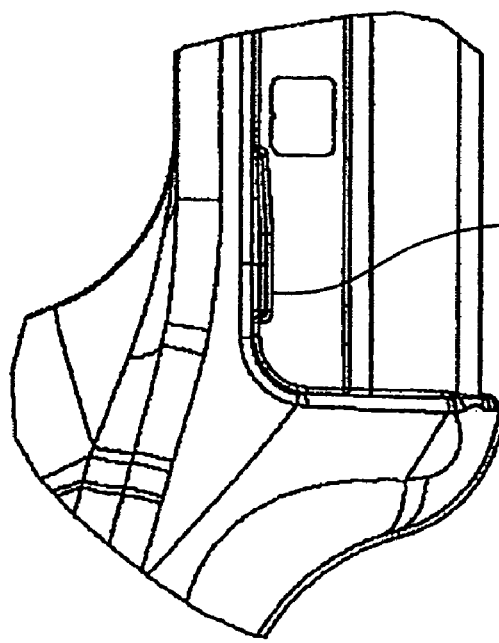
FIG. 19
FIG. 19A

*TOWARD THE END OF THE INSTALLATION CYCLE OF THE BATTERY ONTO THE TOOL, THE BATTERY MEETS A WEDGE FEATURE ON THE TOOL. THIS FEATURE IS LOCATED ON THE TOP OF THE "TRACK" THAT THE BATTERY ENGAGES. WITH BATTERY FULLY ASSEMBLED ONTO THE TOOL, MOVEMENT BETWEEN THE BATTERY AND THE TOOL IS RESTRICTED.*

POWER TOOLS, BATTERY CHARGERS AND BATTERIES

RELATED APPLICATIONS

The present patent application claims the benefits of prior filed and co-pending U.S. provisional patent application Ser. No. 60/625,151, filed on Nov. 4, 2004, the entire contents of which are hereby incorporated by reference. The present patent application also incorporates by reference the entire contents of co-pending U.S. patent application Ser. No. 11/267,470, filed on Nov. 4, 2005, entitled POWER TOOLS, BATTERY CHARGERS AND BATTERIES.

FIELD OF THE INVENTION

The present invention relates to power tools, battery chargers and batteries.

SUMMARY OF THE INVENTION

In some aspects and in some constructions, an electrical component, such as a power tool or a battery charger, generally includes a housing and a modular battery interface or connector supported by the housing.

In some aspects and in some constructions, an electrical component, such as a power tool or battery charger, generally includes a housing, a battery connector or support supported by the housing and a member positionable between a portion of a power tool battery and one of the housing and the battery support to limit movement of the battery relative to the one of the housing and the support. In such aspects and in such constructions, any play or rattle between the battery and the electrical component is limited. Also, movement between the male and female terminals during use is reduced to eliminate fretting corrosion and excessive wear.

In some aspects and in some constructions, a power tool, such as, for example, an impact wrench, generally includes a housing, a motor supported by the housing and connectable to a power source, and an on/off switch supported by the housing and operable to control the supply of power from the power source to the motor. The housing may generally include a motor housing portion supporting the motor and a handle portion extending from the motor housing portion at an angle. The switch is supported on the handle and is engageable by one or more fingers of an operator. The switch is slidable along an axis.

In such aspects and in such constructions, the handle extends from the motor housing at an angle of greater than 97°. In other words, the axis of the handle is at an angle of greater than 97° relative to the axis of the motor housing. The handle may be at an angle of greater than 100° and may be at an angle of about 102° relative to the motor housing. The switch axis is oriented at an angle of greater than 7° relative to the axis of the motor housing. The axis of the switch may be at an angle of at least 10° and may be at an angle of about 12° relative to the axis of the motor housing.

In some aspects and in some constructions, a power tool generally includes a housing, a motor supported by the housing and connectable to a power source, an on/off switch operable to control a supply of power from a battery to the motor and a diode electrically connected between the motor and the battery. The battery may include a FET and a microcontroller operable to turn the FET on and off rapidly.

In some aspects and in some constructions, a power tool generally includes a motor, a motor housing supporting the motor and a handle connected to and extending from the motor housing. A material, such as, for example, an elastomeric material, may be molded over portions of the handle and/or of the motor housing.

In some aspects and in some constructions, a power tool generally includes a motor and a motor housing supporting the motor, the motor housing defining a vent to allow the flow of air relative to the motor. In some constructions, the vents are angled to be non-vertical and may be angled at about 30° relative to the vertical. In some constructions, the power tool may include material overmolded around a portion of the motor housing, and a vent window may be defined in the overmolded material so that the material does not cover the vent.

In some aspects and in some constructions, a power tool, such as, for example, an impact wrench, generally includes a housing and a support member or ring connected to the housing and operable to support the power tool from a support structure when the power tool is not in use.

In some aspects and in some constructions, a power tool, such as, for example, a circular saw, generally includes a housing, a motor supported by the housing and connectable to a power source, the motor being operable to drive a tool element, such as, for example, a circular saw blade, at a depth of cut, a shoe for supporting the power tool relative to a work surface, the shoe having an upper portion, and a battery supportable by the housing and operable to supply power to the motor, the battery having an angled surface to prevent engagement between the battery and the upper portion of the shoe.

In some aspects and in some constructions, a power tool, such as, for example, a circular saw, generally includes a housing, a motor supported by the housing and operable to drive a tool element and a battery supportable by the housing and operable to supply power to the motor. The housing generally includes a battery support portion extending along an attachment axis and an end wall extending in a plane generally perpendicular to the attachment axis. The battery is supportable on the battery support portion and includes a battery wall at least partially engageable with the end wall.

In some aspects and in some constructions, the invention provides a battery pack for powering a cordless power tool. The battery pack includes at least one battery cell operable to supply a discharge current, a switch operable to control the discharge current and a protection device to protect the switch. The protection device is positioned such that the device absorbs a current traveling in a direction opposite to that of the discharge current supplied from the battery cell.

In some aspects and in some constructions, the invention provides a power tool including a motor electrically connectable to a battery pack and to receive a discharge current from the battery pack, a body housing the motor, a drive mechanism driven by the motor, a tool element operably connected to the drive mechanism, an on/off switch operable to control the discharge current from the battery pack and a protection device positioned within the power tool such that the protection device absorbs a current traveling in a direction opposite of the discharge current.

In some aspects and in some constructions, the invention provides a combination including a battery pack, a power tool and a protection device. The battery pack has at least one battery cell and an electronic circuit. The power tool includes a body housing a motor electrically connectable to the battery pack and to receive a discharge current from the battery pack. The power tool also includes a drive mechanism driven by the motor and an on/off switch operable to control a discharge current from the battery pack when the battery pack is electrically connected to the motor. The drive mechanism is operably connected to a tool element. The protection device protects the electronic circuit.

Independent features and independent advantages of the present invention will become apparent to those skilled in the art upon review of the following detailed description and drawings.

BRIEF DESCRIPTION OF THE DRAWINGS

FIGS. 1A-1H are views of a power tool, such as, for example, a hammer-drill, a drill or a screwdriver.

FIGS. 4A-4H are views of a power tool, such as, for example, an impact wrench.

FIGS. 5A-5B are cross-sectional views of the power tool shown in FIGS. 4A-4H.

FIGS. 7A-7G are views of a power tool, such as, for example, a reciprocating saw.

FIGS. 8A-8H are views of a power tool, such as, for example, a band saw.

FIGS. 11A-11B are exploded perspective views of a portion of a power tool, such as, for example, a band saw.

FIGS. 12-12C are views of the portion of the power tool as shown in FIGS. 11A-11B.

FIGS. 15A-15B are views of a portion of an electrical component such as, for Example, a power tool and a battery.

FIGS. 19 and 19A are side views of a portion of a power tool.

Figure 1A:
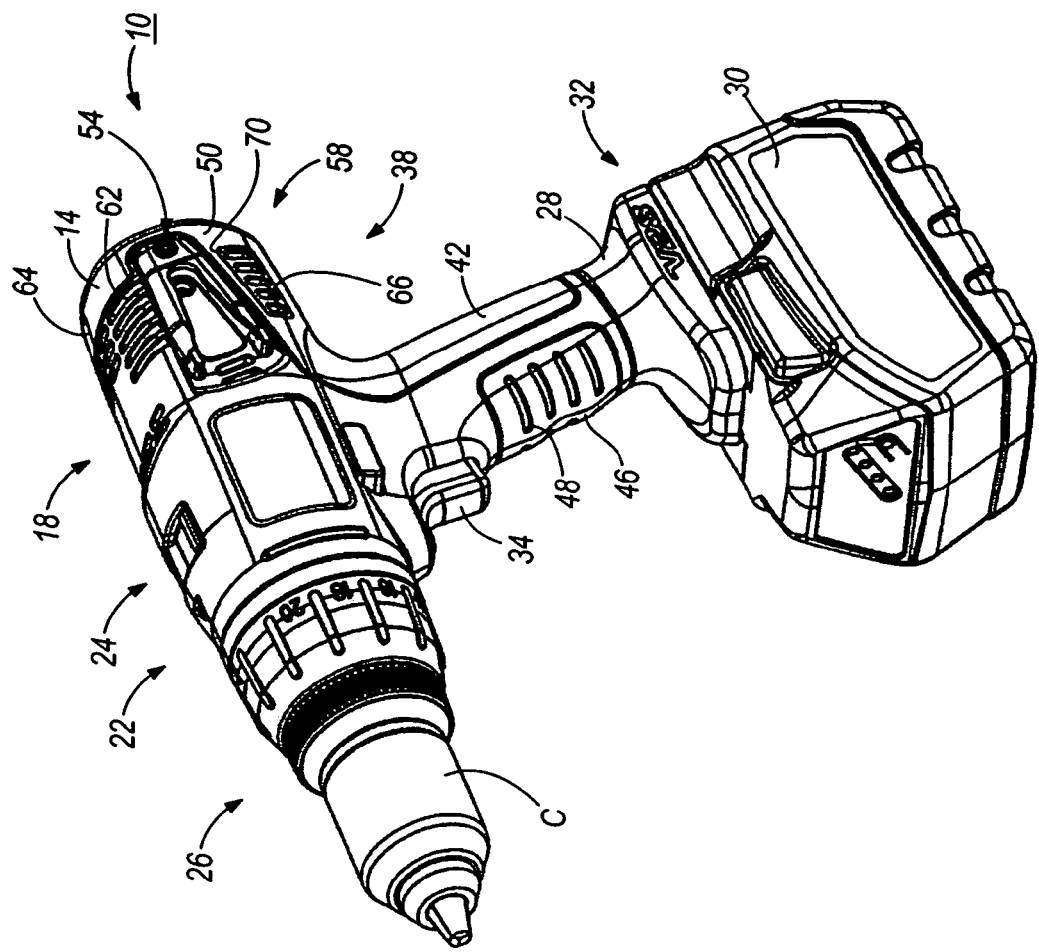
Figure 1B:
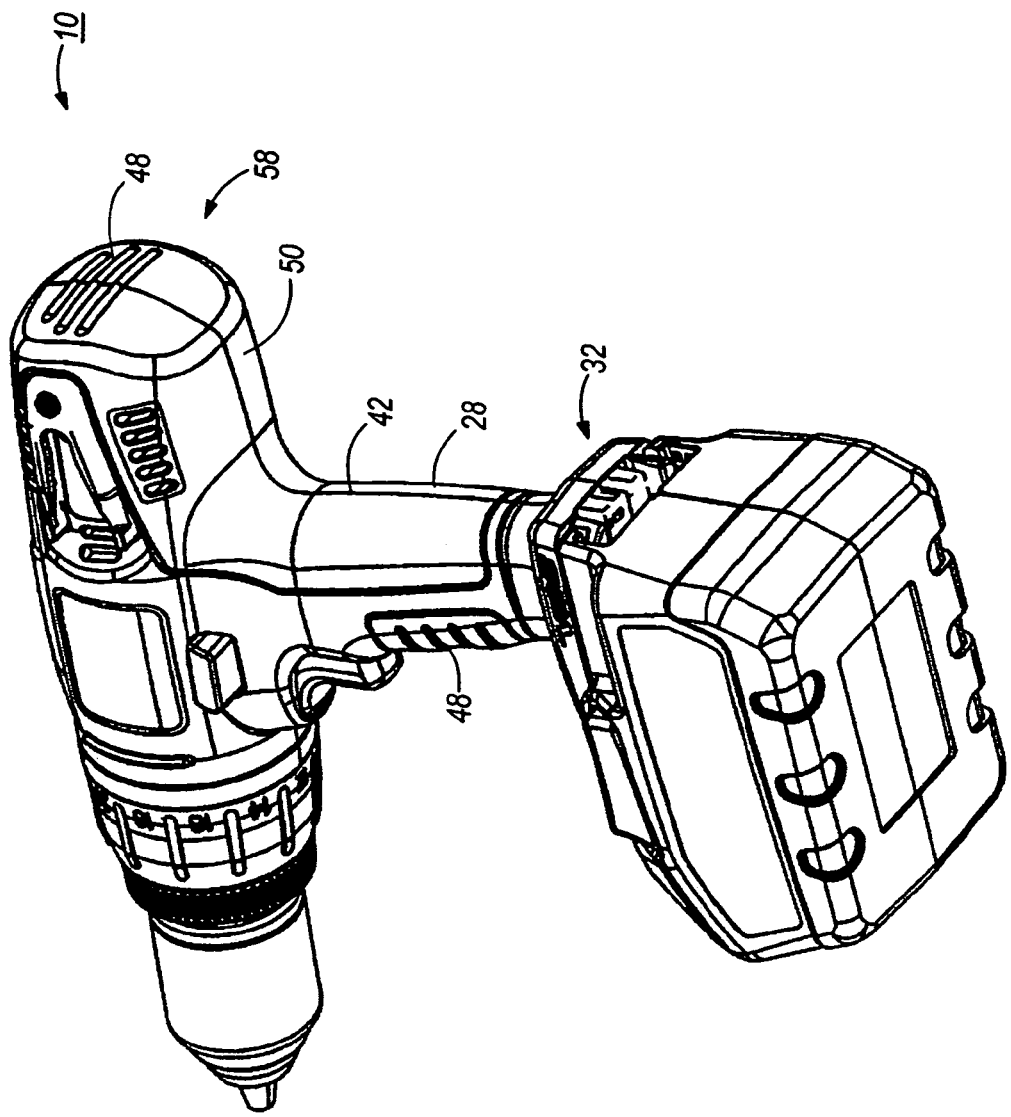

Before at least one embodiment of the invention is explained in detail, it is to be understood that the invention is not limited in its application to the details of the constructions and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

FIGS. 1A-1H illustrate a power tool, such as, for example a hammer-drill 10, a drill or a screwdriver, embodying one or independent aspects of the invention. The hammer-drill 10 includes a housing body 14 supporting a motor 18 which is operable to drive a transmission 22. A chuck C is supported on a spindle (not shown) and is driven by the motor 18 and the transmission 22 for rotation and, in the illustrated construction, for selective reciprocation. The chuck C is operable to support a tool element, such as, for example, a drill bit.

In the illustrated construction, the transmission 22 includes a 2-speed planetary gear arrangement (not shown). An actuator 24 is supported on the housing 14 and is operable to adjust the condition of the transmission 22 between a first speed and torque setting and a second speed and torque setting. In the illustrated construction, the actuator 24 is movable laterally relative to the axis of the housing 14 to cause axial movement of the ring gear (not shown) of the planetary gear arrangement relative to the housing 14 to set the condition of the transmission 22.

In the illustrated construction, the hammer-drill 10 also includes an adjustable torque clutch and hammer mechanism (not shown). An actuator assembly 26 is operable by an operator to set the torque setting of the clutch and to set the condition of the hammer mechanism, if a hammer mechanism is provided. In the illustrated construction, the assembly 26 includes a first ring for setting the torque of the clutch and for disengaging the clutch to provide a drilling mode and a separate second ring for selectively engaging the hammer mechanism.

A handle 28 is connected to the housing 14, and a power source, such as, for example, a battery 30, is supported on the handle 28. The battery 30 is operable to supply power to the motor 18. In the illustrated construction, the battery 30 is a rechargeable, removable power tool battery. The battery 30 has a nominal voltage of at least 24 V to provide sufficient power to the motor 18 for operating on a work piece. It should be understood that, in other constructions, the battery 30 may have a lower nominal voltage (e.g., 12 V, 18 V, etc.) or a higher nominal voltage (e.g., 28 V, 40 V, etc.) as required by the performance requirements of the hammer-drill 10 and/or by the performance requirements of other power tools which may be usable with a battery 30.

The handle 28 provides a battery support portion 32 for physically supporting the battery 30 on the handle 28 and on the housing 14. The battery support portion 32 also includes a terminal assembly (not shown) for electrically connecting the battery 30 to the motor 18 by an electrical circuit (not shown). An on/off switch 34 is supported on the handle 28 and is operable to control the supply of power from the battery 30 to the motor 18.

The battery 30 and the battery support portion 32 are similar to those described in co-pending U.S. patent application Ser. No. 10/720,027, filed Nov. 20, 2003, entitled METHOD AND SYSTEM OF BATTERY PROTECTION, in co-pending U.S. patent application Ser. No. 10/721,800, filed Nov. 24, 2003, entitled BATTERY PACK, in co-pending U.S. patent application Ser. No. 11/138,070, filed May 24, 2005, entitled METHOD AND SYSTEM OF BATTERY PROTECTION, in co-pending U.S. patent application Ser. No. 11/165,615, filed Jun. 22, 2005, entitled BATTERY PACK, the entire contents of all of which are hereby incorporated by reference.

In the illustrated construction, the battery 30 is operable to power a family of power tools, such as, for example, the hammer-drill 10, a drill, a screwdriver, a circular saw 100 (see FIGS. 2A-2H and 3A-3H), an impact wrench 200 (see FIGS. 4A-4H), a reciprocating saw 300 (see FIGS. 7A-7G, a band saw 400 (see FIGS. 8A-8H), a light (e.g., a work light, a flood light, etc.), a vacuum, a blower, an audio component, etc., and is rechargeable by a battery charger, such as, for example, the battery charger 500 (see FIGS. 9A-9P), an audio component/charger, etc.

A flexible or elastomeric material 38 may be provided on one or more surfaces of the hammer-drill 10. In the illustrated construction, elastomeric material 42 and 46 is provided on the handle 28, and elastomeric material 50 is provided on a portion of housing 14. In the illustrated construction, the elastomeric material 42 and 50 is generally continuous. Contoured grip portions, grooves, ridges or ribs 48 may also be provided on the gripping surfaces, such as the handle 28. The material 38 may provide one or more of an improved grip surface, isolate vibration and impacts from the operator, prevent heat build-up and/or transfer to the operator, etc.

In the illustrated construction, the hammer-drill 10 includes a portion of a connecting or carrying system for connecting two components such as, for example, the hammer-drill 10 to a belt-clip (not shown) or an accessory (not shown) to the hammer-drill 10. In the illustrated construction, the system includes a connector provided on the hammer-drill 10. In the illustrated construction, the connector is a receptacle 54 which is engageable with a stud (not shown) formed on another component. The connecting or carrying system is similar to that described in co-pending U.S. patent application Ser. No. 10/389,070, filed Mar. 14, 2003, entitled TOOL AND ACCESSORY CONNECTING SYSTEM, the entire contents of which are hereby incorporated by reference.

Figure 1C:
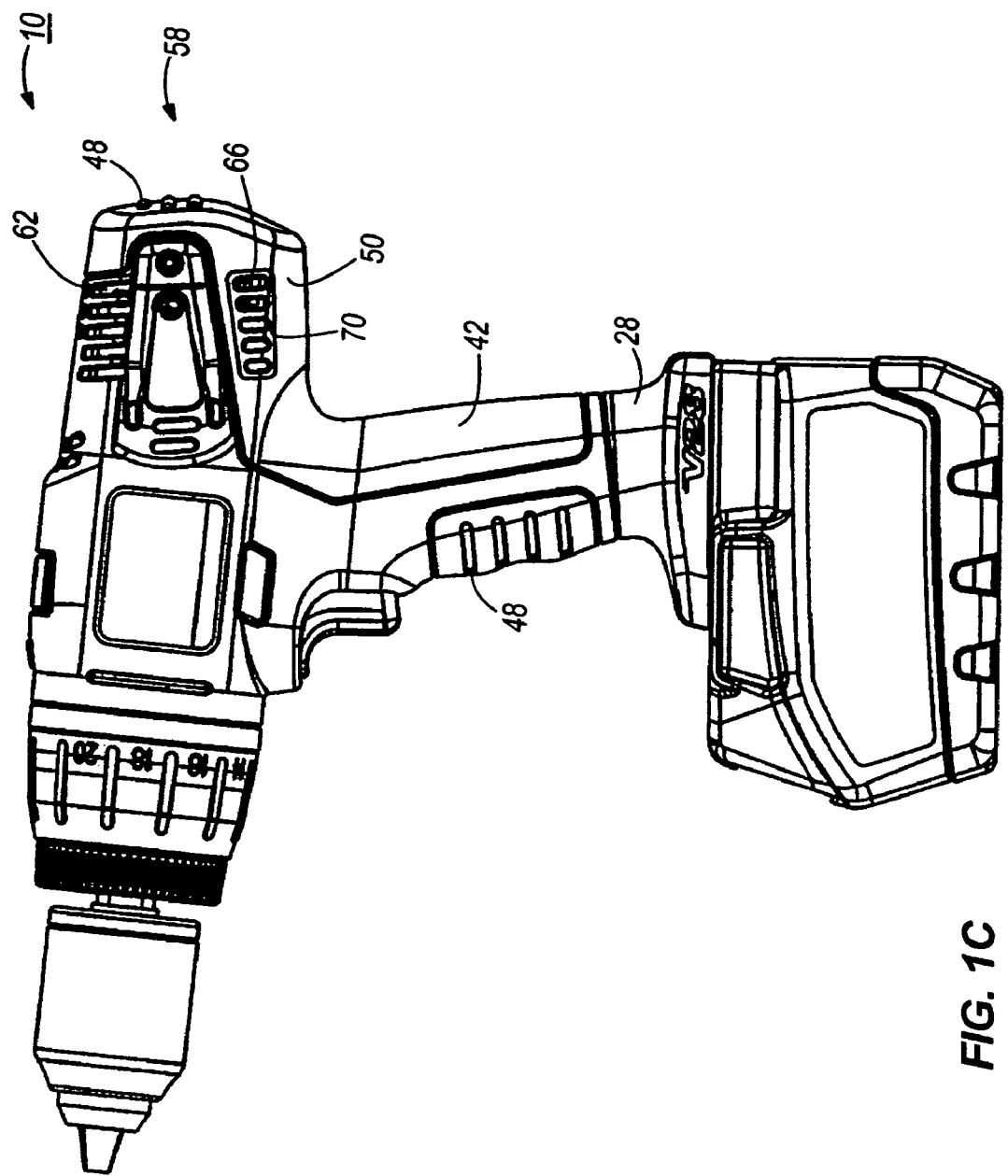
Figure 1D:
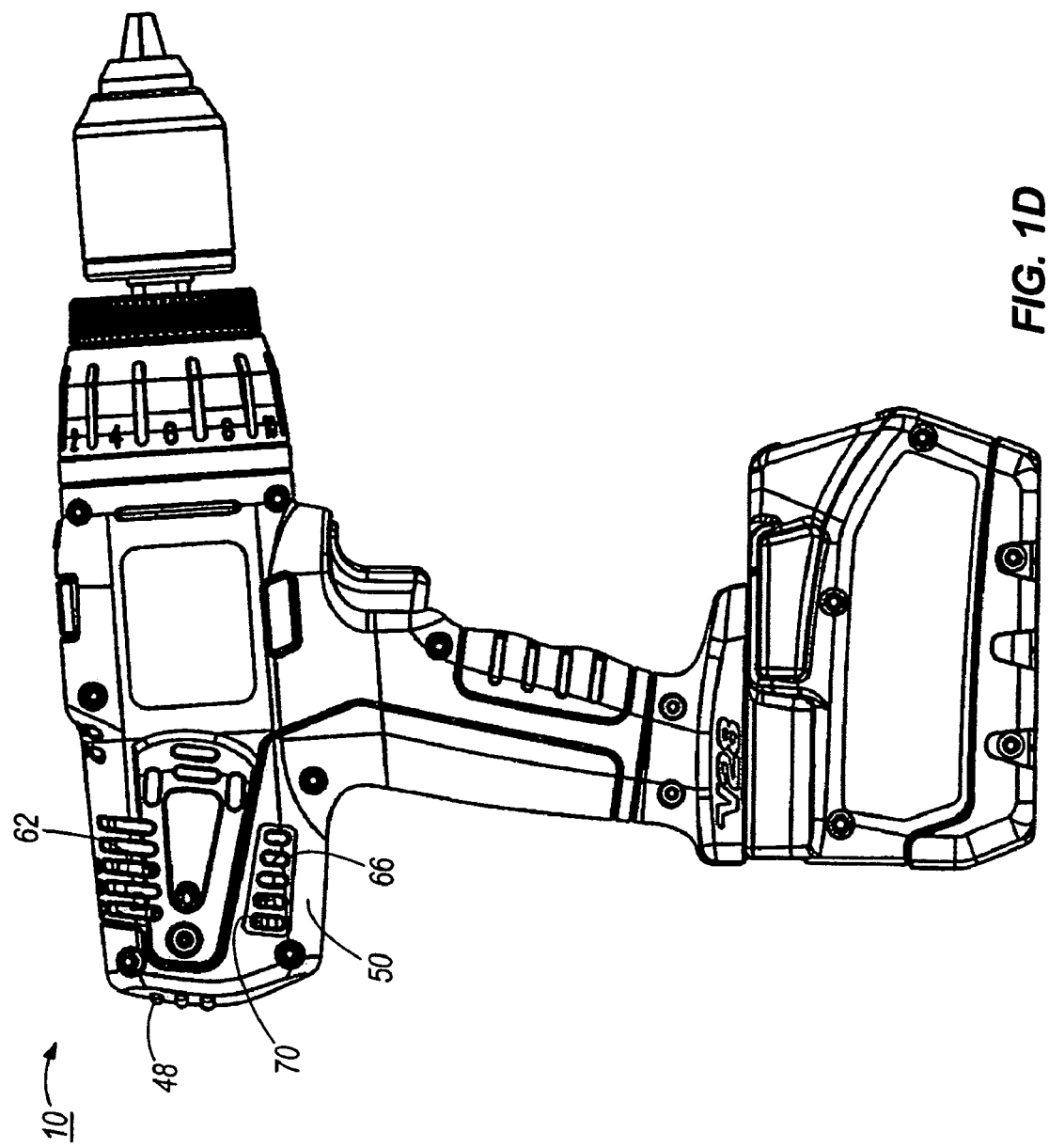
Figure 1G:
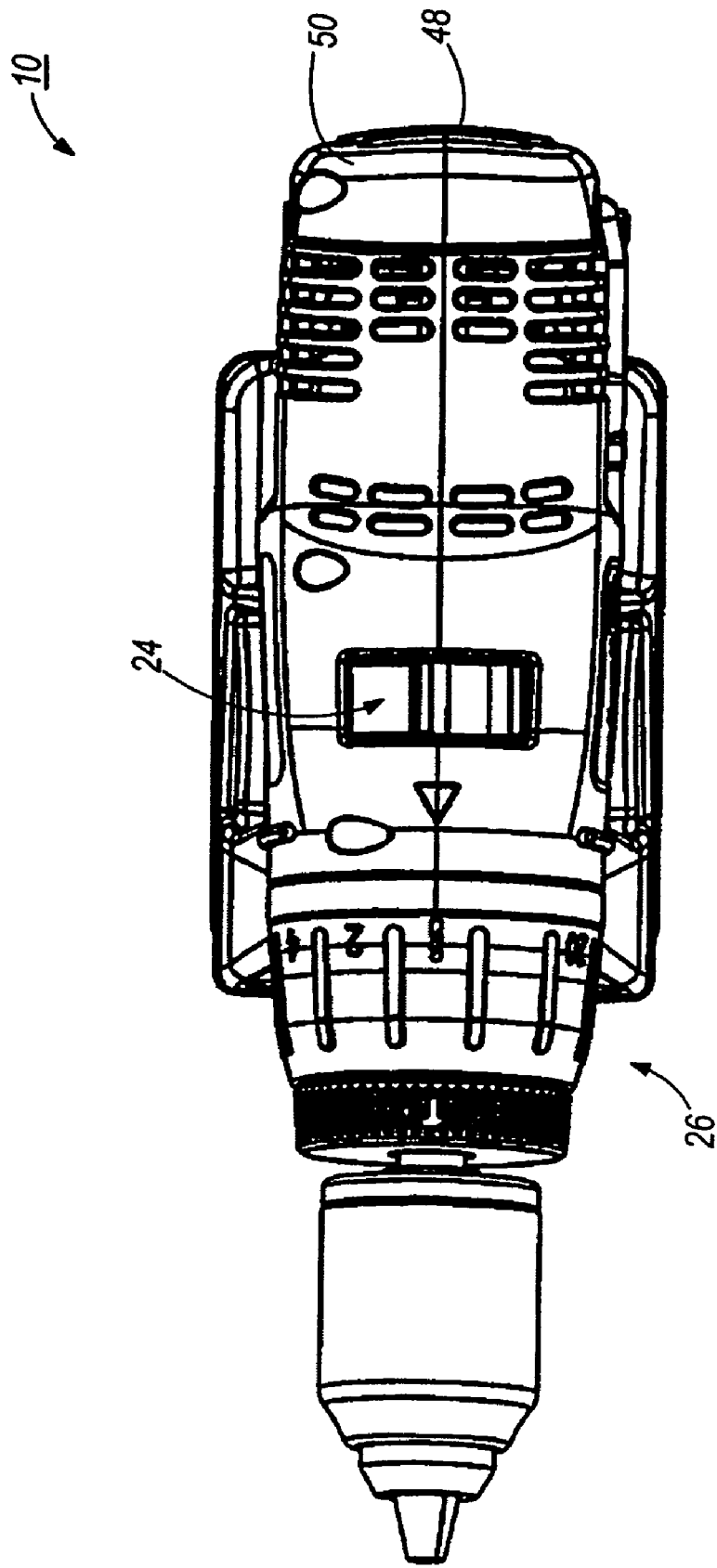
Figure 1H:
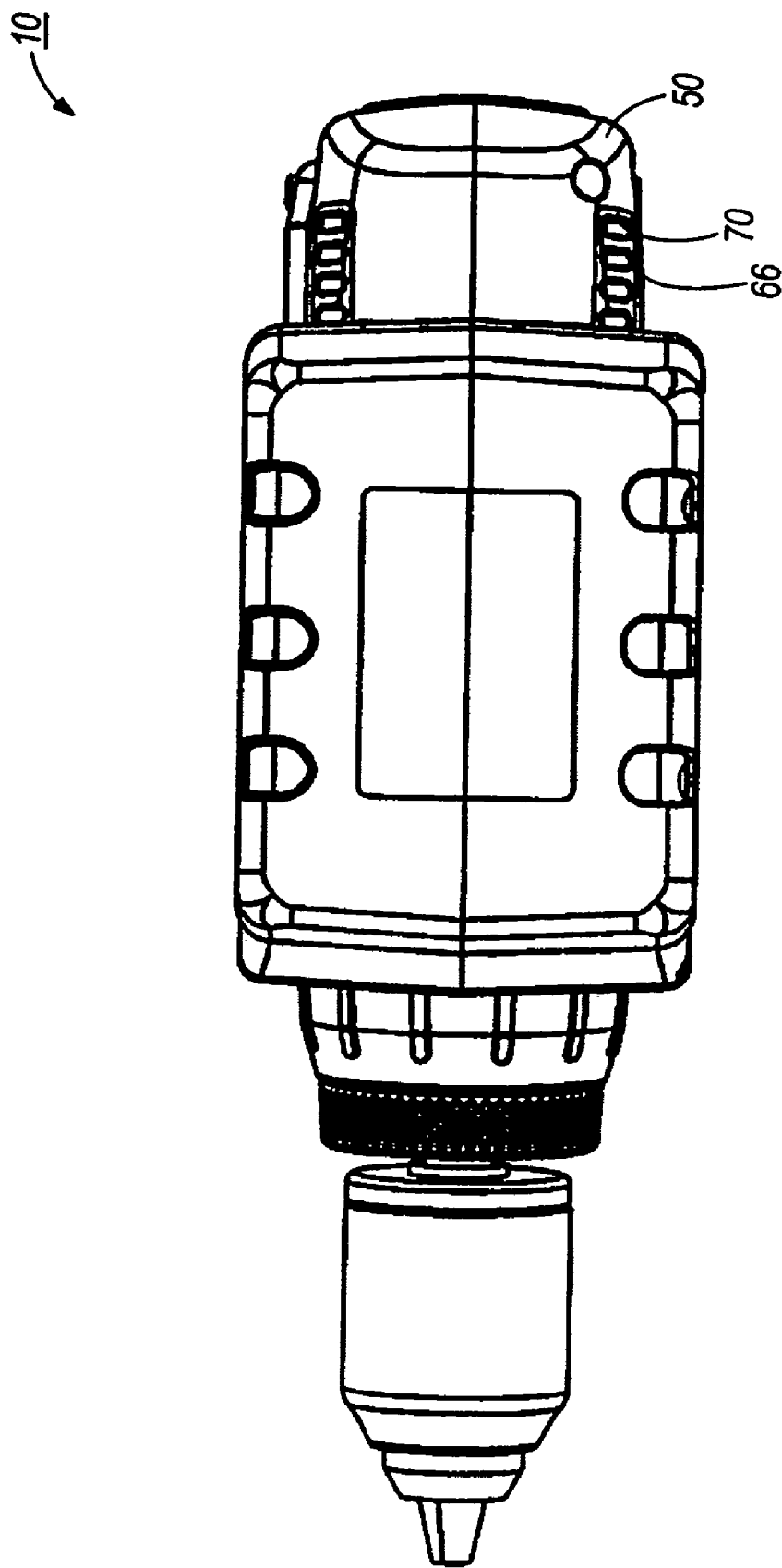

A venting system 58 is provided to allow air flow relative to the motor 18. In the illustrated construction, the venting system 58 includes vents 62, 64 and 66 defined by the housing 14 and communicating between the interior and exterior of the housing 14. If elastomeric material is provided on the housing 14 (such as the elastomeric material 50), a window 70 is provided in the elastomeric material around the vent (e.g., the vents 66). As shown in FIG. 1C, the vents 62 and/or 66 do not extend vertically. Instead, the vents 62 and 66 extend at a non-vertical angle (as shown in FIGS. 1C and 1D). The vents 62 and 66 may be angled at least 10° and may be angled about 30° relative to the vertical.

FIGS. 2A-2H and 3A-3H illustrate a power tool, such as, for example, a circular saw 100, embodying one or more independent aspects of the invention. Common elements are identified by the same reference number in the "100" series.

The circular saw 100 includes a housing body 114 supporting a motor 118 which is operable to drive a transmission 122. A tool holder or blade clamp C is supported on a spindle (not shown) as is driven by motor 118 and the transmission 122. The clamp C is operable to support a tool element, such as, for example, a circular saw blade.

A main operator's handle 128 is connected to the housing 114, and, as shown in FIGS. 3A-3H, a power source, such as, for example, a battery 130, is supported on the handle 128. The battery 130 is operable to supply power to the motor 118. In the illustrated construction, as discussed above with respect to the battery 30, the battery 130 is a rechargeable, removable power tool battery and includes a fuel gauge 131 positioned on a rearwardly-facing surface 133.

The handle 128 provides a battery support portion 132 for physically supporting the battery 130 on the handle 128 and on the housing 114. The battery support portion 132 also includes a terminal assembly portion 133 for electrically connecting the battery 130 to the motor 118 by an electrical circuit (not shown). An on/off switch 134 is supported on the handle 128 and is operable to control the supply of power from the battery 130 to the motor 118.

As discussed above, the battery 130 and the battery support portion 132 are similar to those described in co-pending U.S. patent application Ser. Nos. 10/720,027; 10/721,800; 11/138,070; and 11/165,615.

The saw 110 also includes a guard arrangement 172 for covering at least a portion of the saw blade. The saw 110 also includes a support or shoe plate 174 connected to the housing 114 and operable to support the saw on a work piece or work surface. In the illustrated construction, the angle of the saw blade (and of the housing 114) relative to the shoe plate 174 (and relative to the work piece) is adjustable to provide bevel cutting of the work piece. Also, the housing 114 and the saw blade are pivotable as a unit relative to the shoe plate 174 about an axis which is generally parallel to the axis of the saw blade to adjust the depth of cut of the saw blade.

An auxiliary handle 176 is also connected to the housing 114. An operator generally grips the handles 128 and 176 to provide 2-handed operation of the saw 100. Elastomeric material 138 may be provided on one or more surfaces of the saw 110. In the illustrated construction, elastomeric material 142 and 146 is provided on the handle 128, and elastomeric material 150 is provided on the auxiliary handle 176. Contoured grip portions, grooves, ridges or ribs 148 may be provided on the gripping surfaces, such as the handles 128 and 176.

A venting system 158 is provided to allow air flow relative to the motor 118. In the illustration construction, the venting system 158 includes vents 162, 164 and 166 defined by the housing 114 and communicating between the interior and exterior of the housing 114. As shown in FIG. 2D, the vents 162 and 166 do not extend vertically. Instead, the vents 162 and 166 extend at a non-vertical angle as shown in FIG. 2D. This angle may be more than 10° and may be about 30°.

Figure 3A:
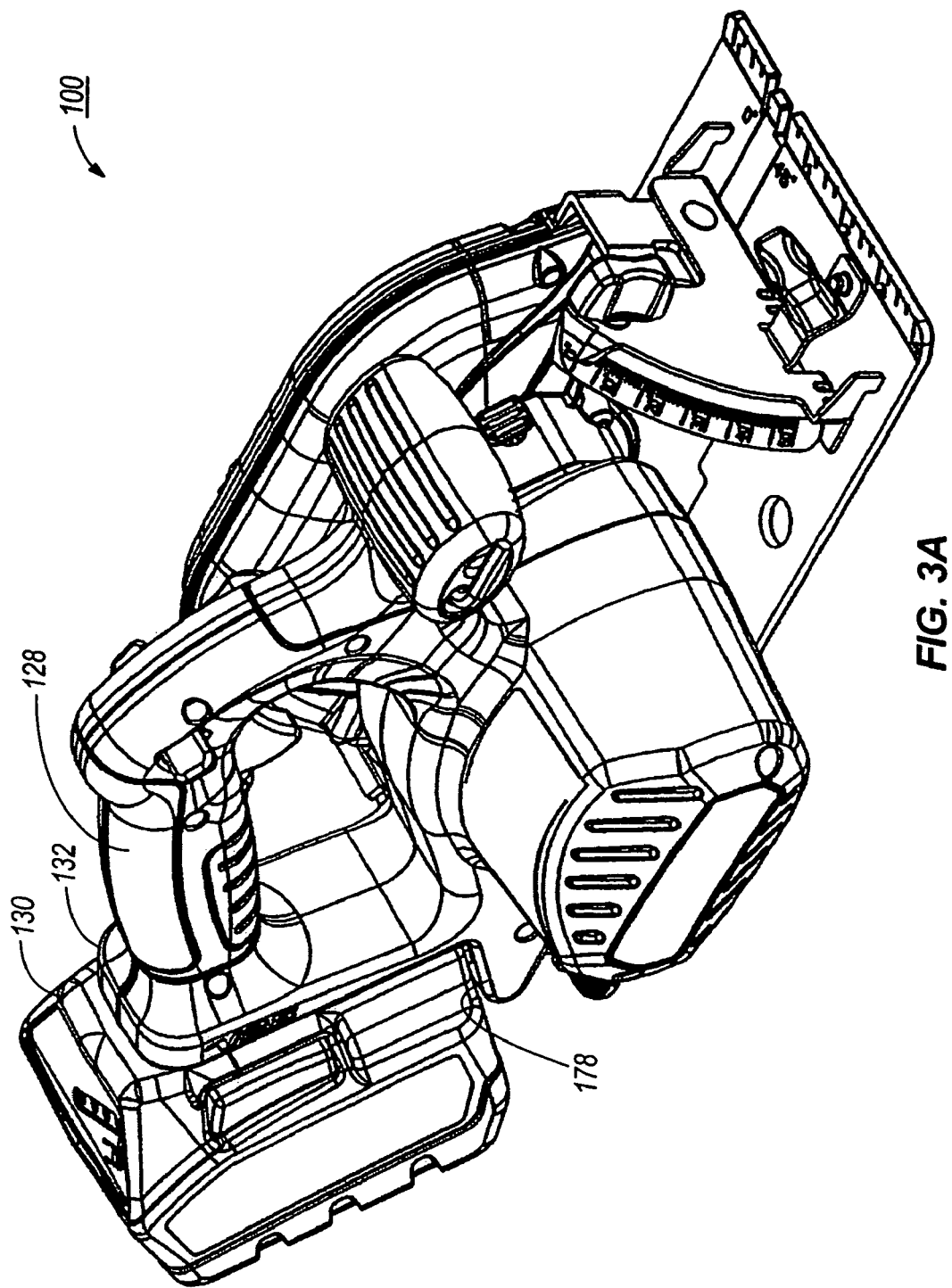
FIGS. 3A-3H are views of the power tool shown in 2A-2H and illustrating the power tool connected to a battery.
Figure 3B:
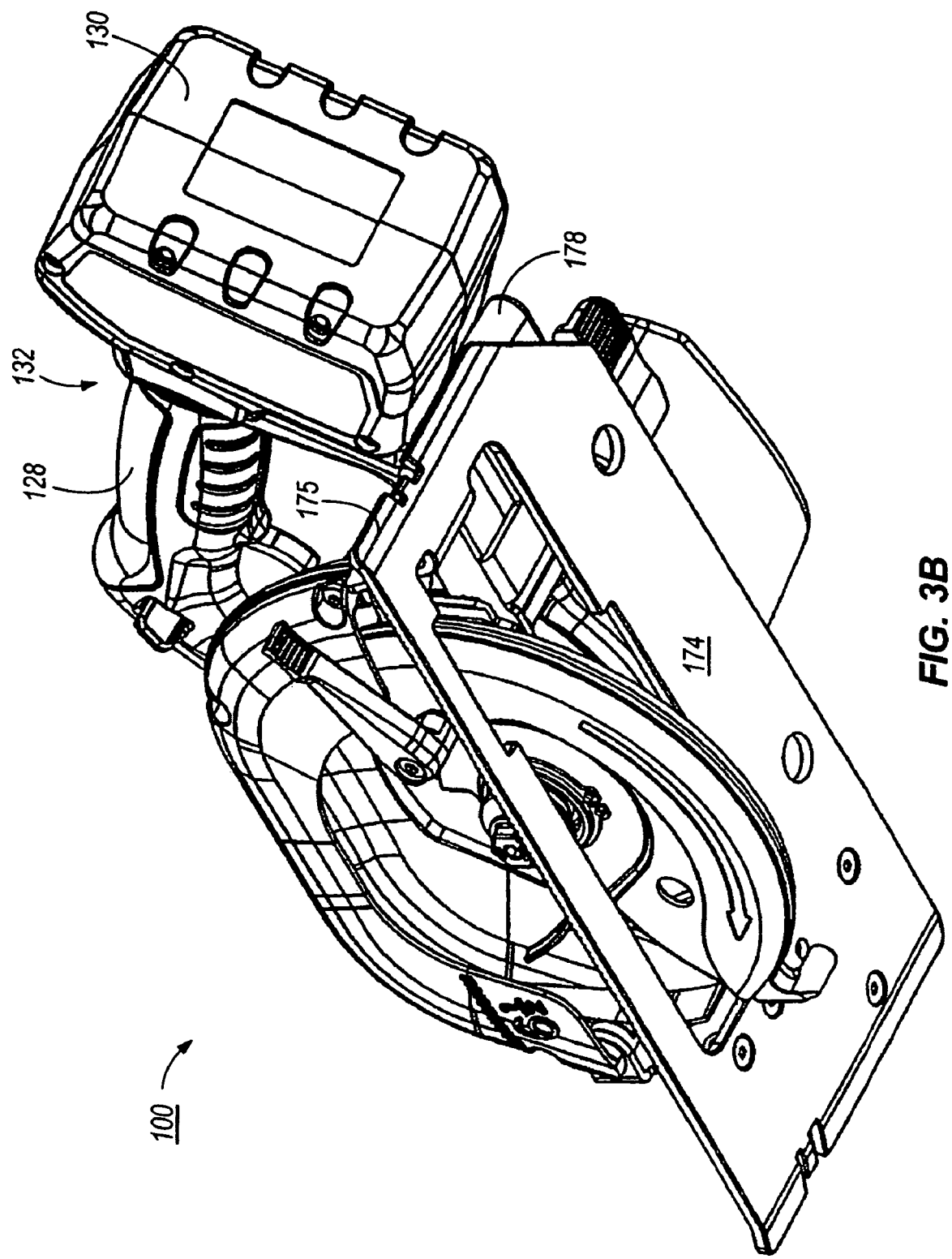
Figure 3C:
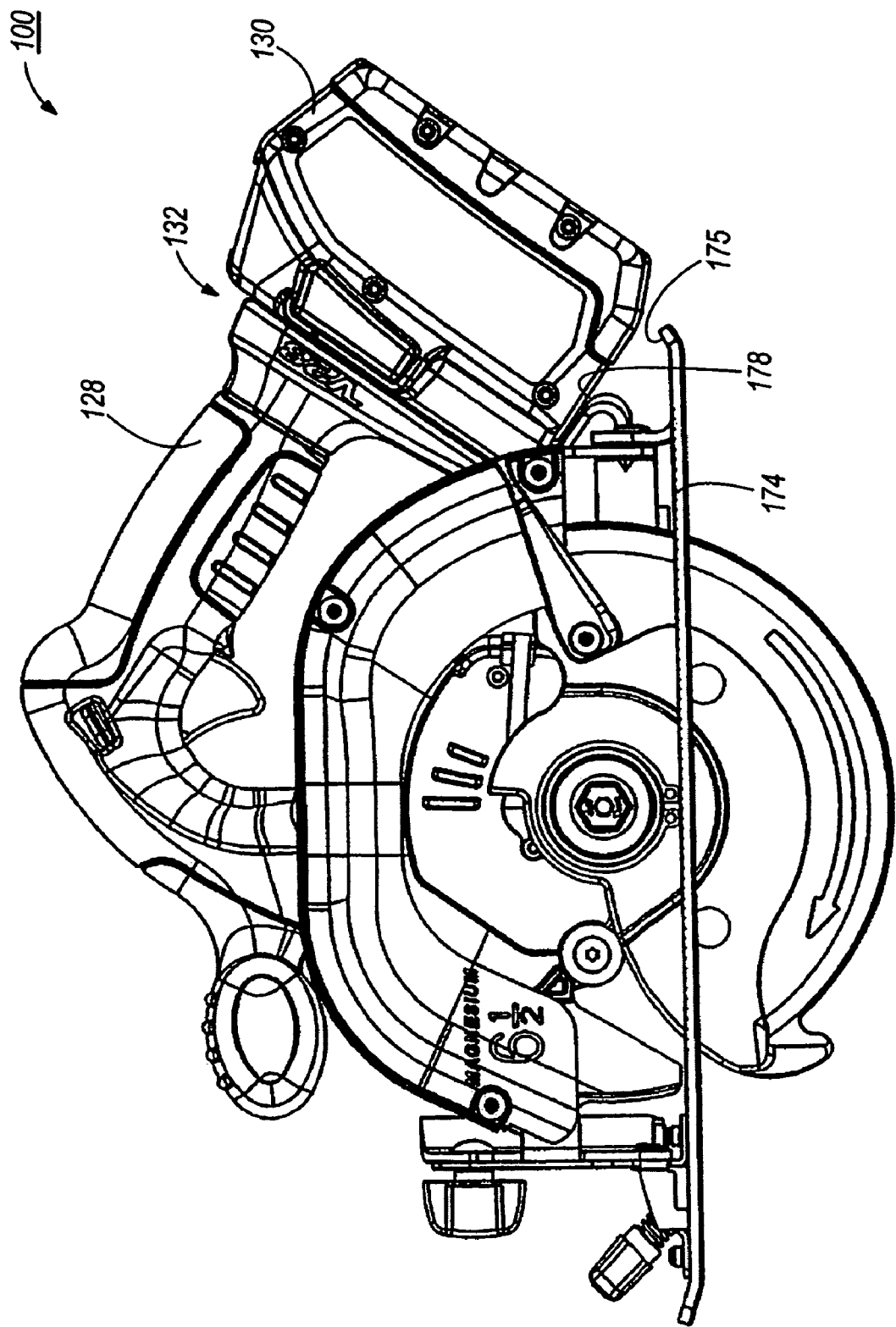
Figure 3D:
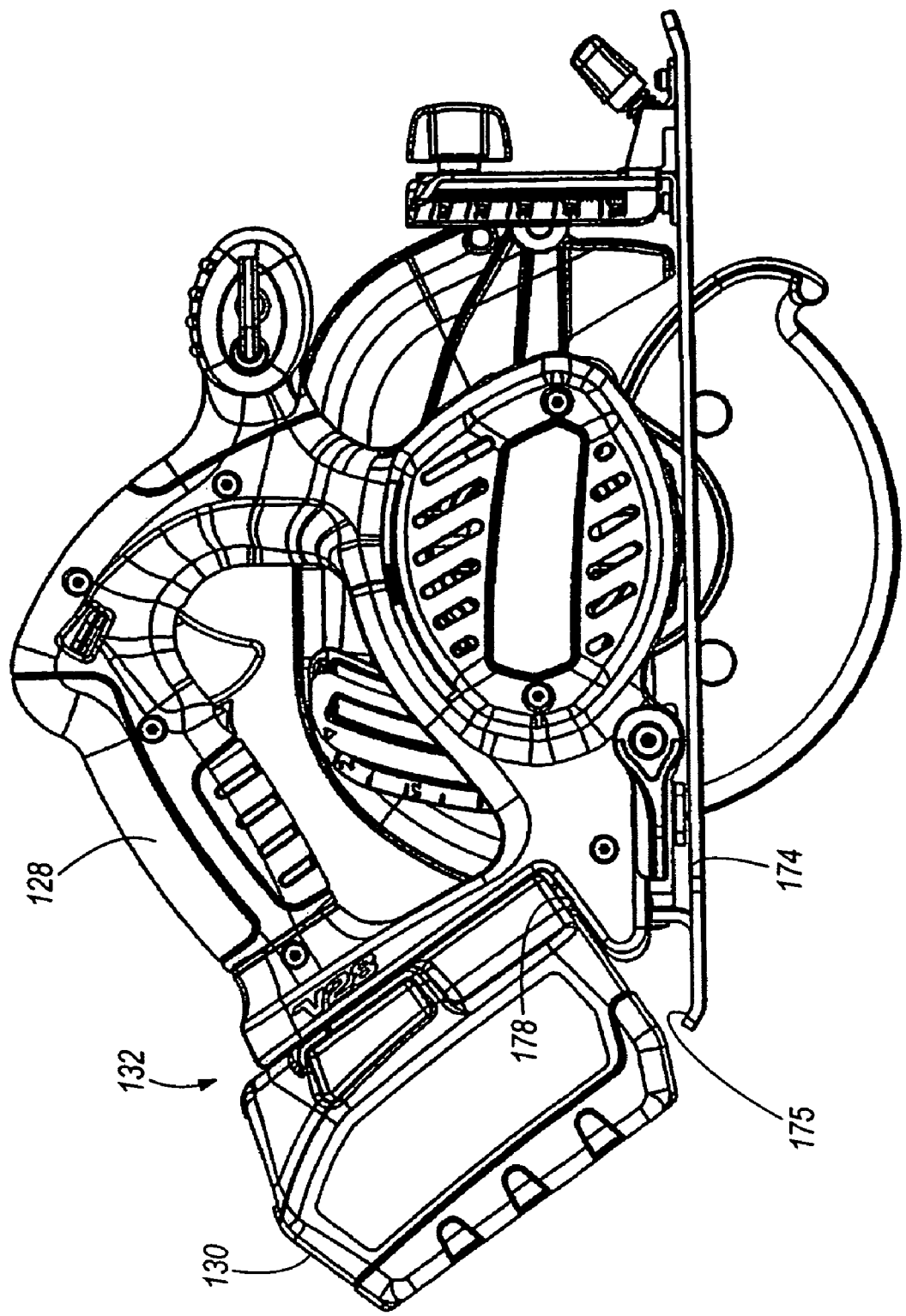
Figure 3E:
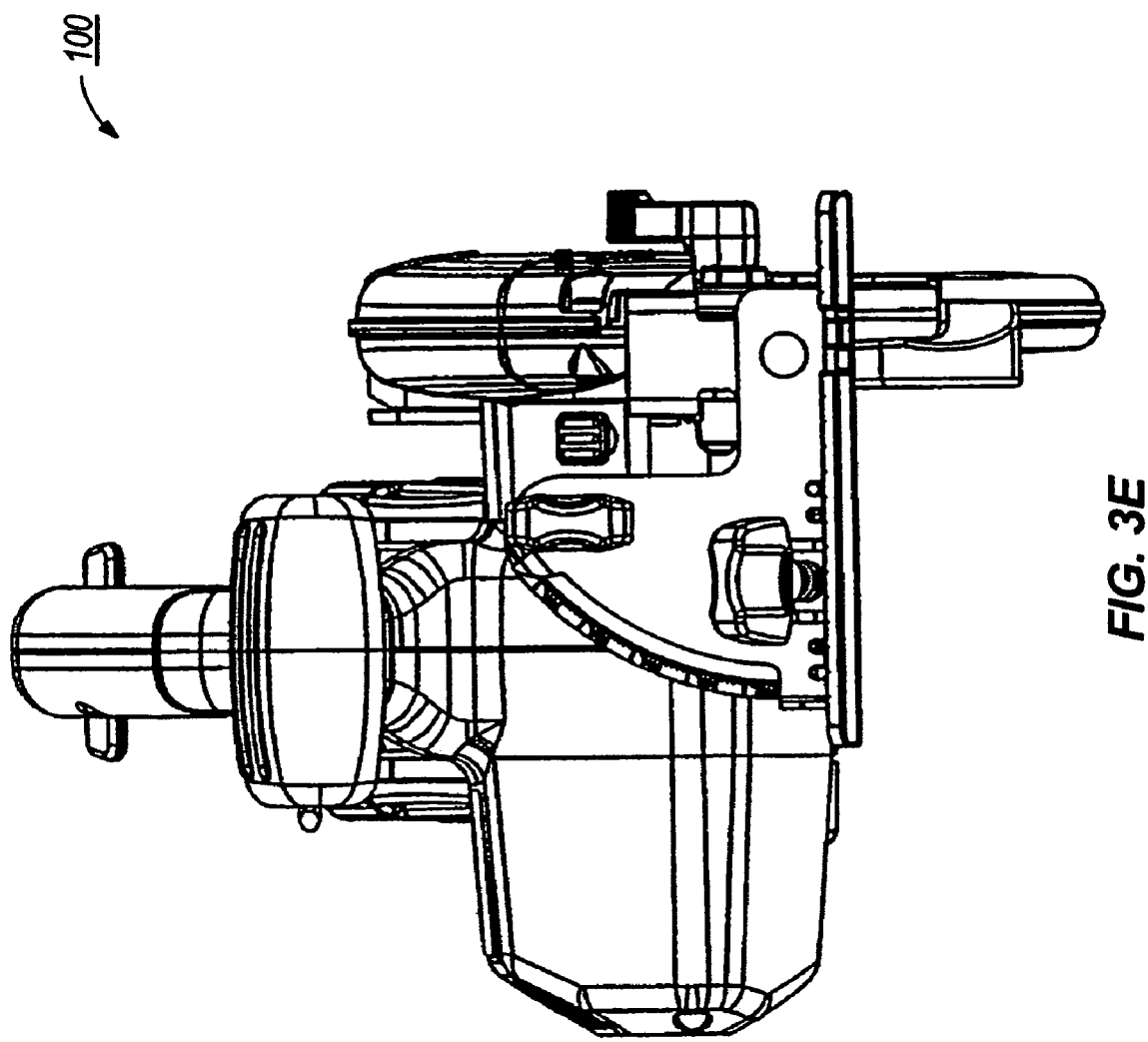
Figure 3F:
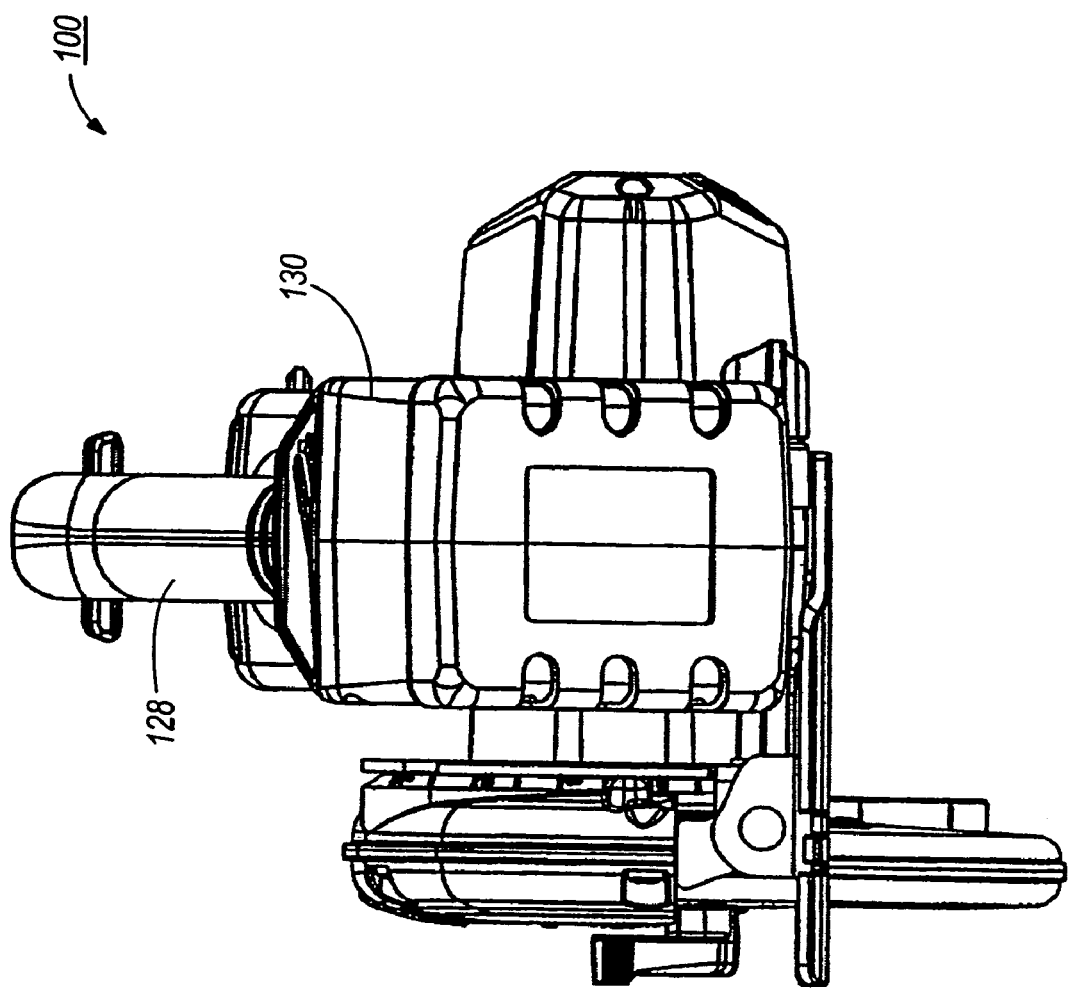
Figure 3G:
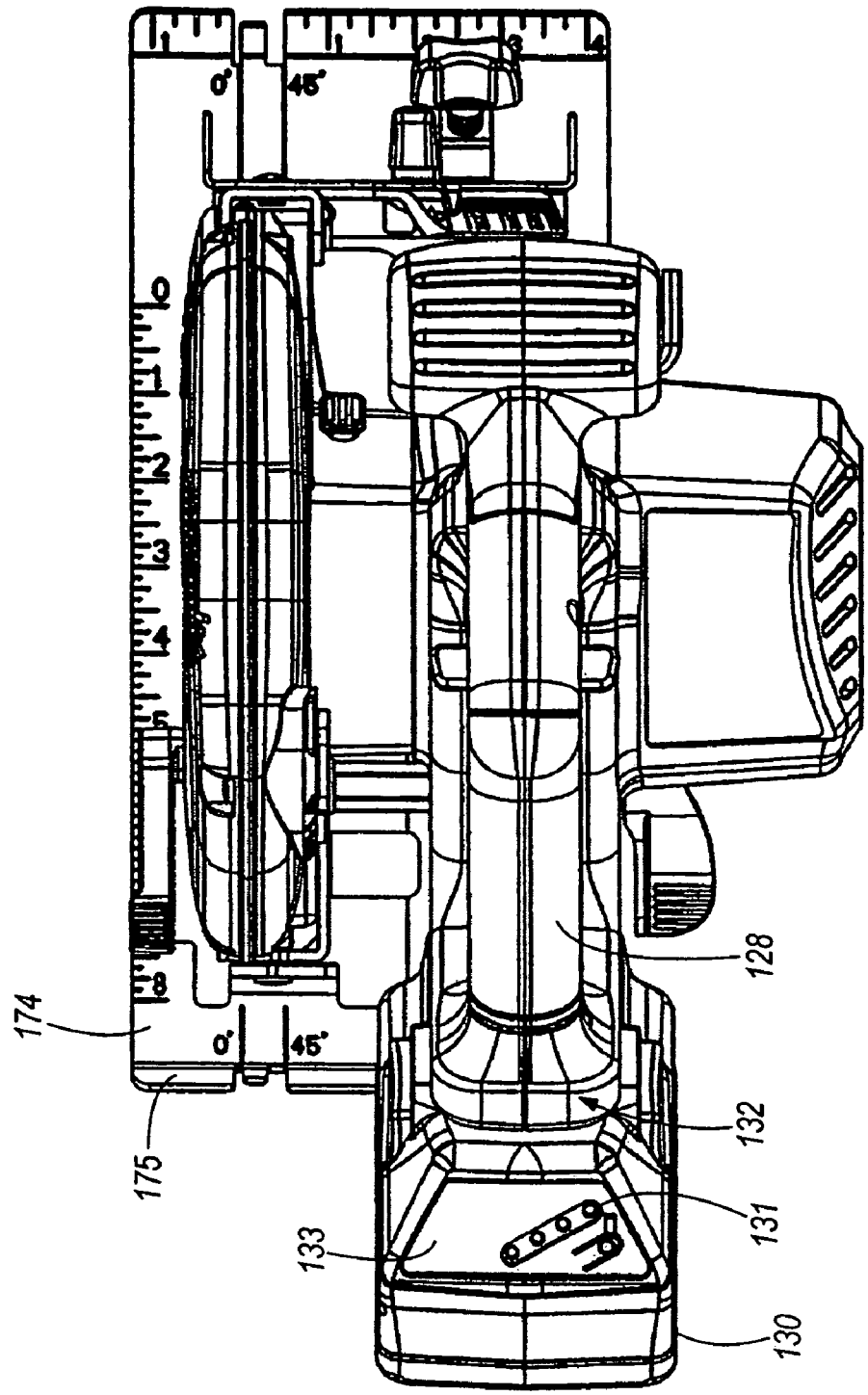
Figure 3H:
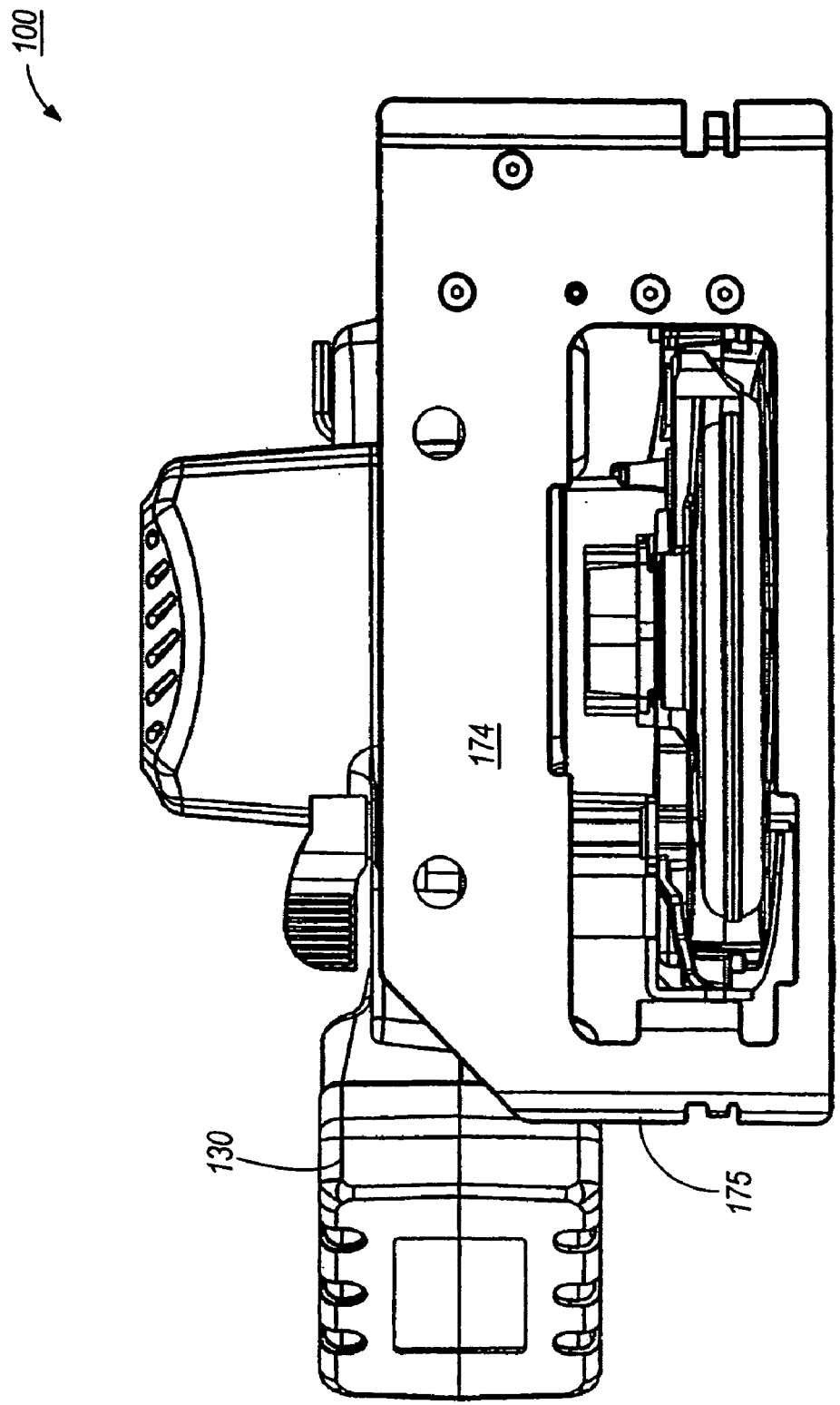

The shoe plate 174 includes upwardly angled surfaces 175. As shown in FIGS. 3C and 3D, with the saw 110 in the maximum depth of cut position (as shown), the angled surface on the bottom rear of the battery 130 prevents engagement between the battery 130 and the surface 175 of the shoe plate 174.

The housing 114 includes an end wall 178 proximate to the battery support portion 132. The end wall 178 extends in a plane generally perpendicular to the attachment axis of the battery 130 and provides a support surface. As shown in FIG. 3D, with the battery 130 supported on the battery support portion 132, an upper portion of the rear of the battery 130 engages the end wall 178.

Figure 2A:
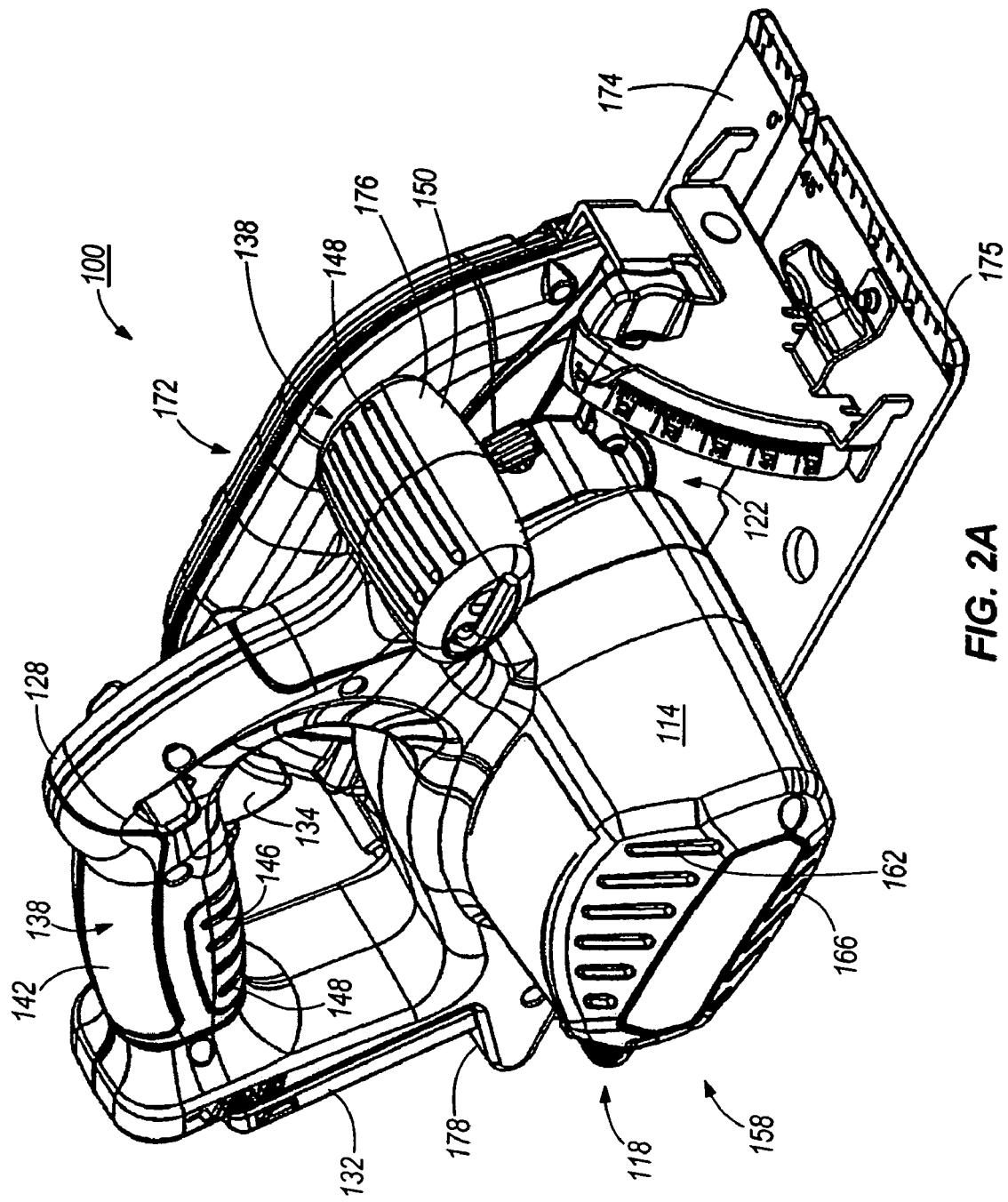
FIGS. 2A-2H are views of a power tool, such as, for example, a circular saw.
Figure 2B:
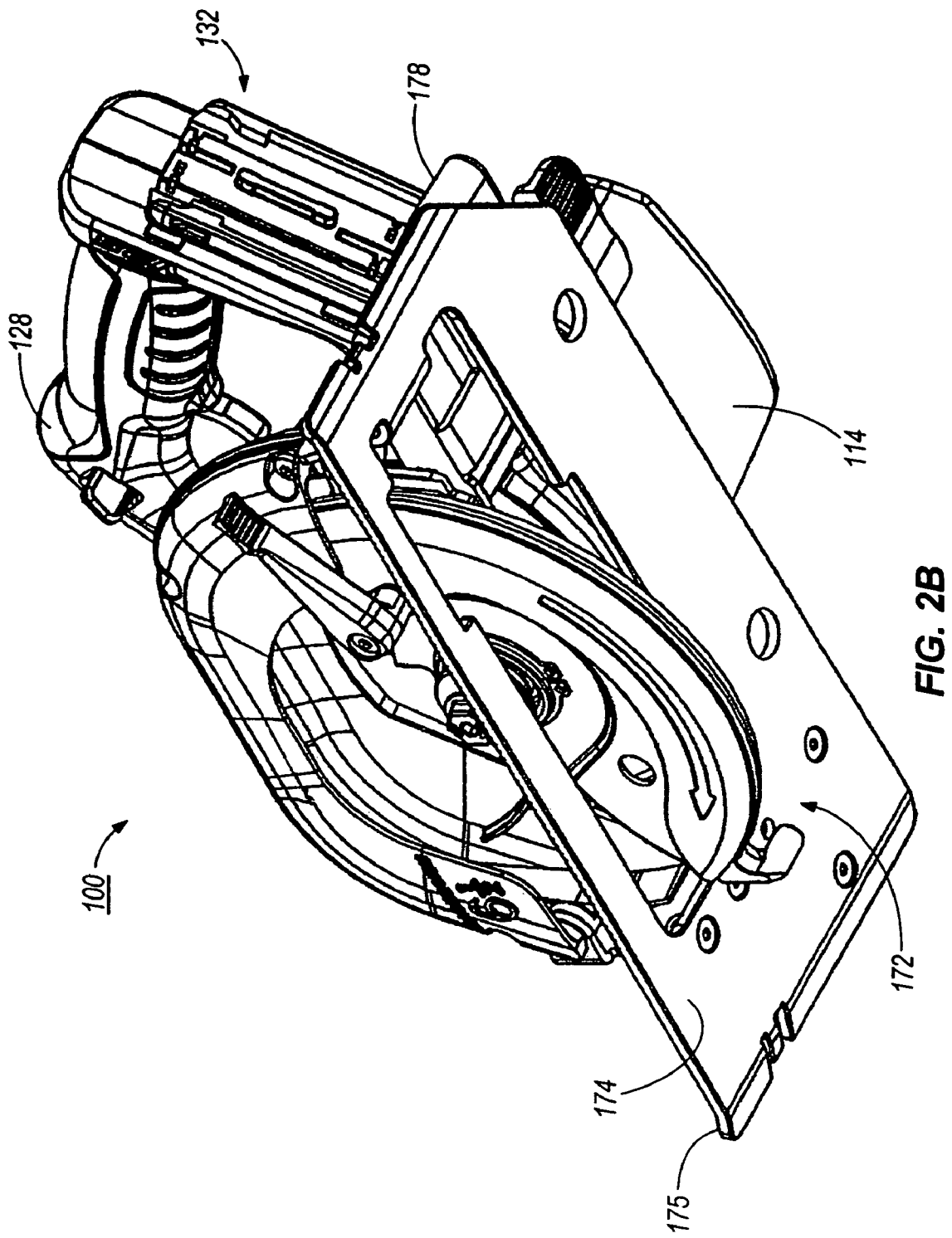
Figure 2C:
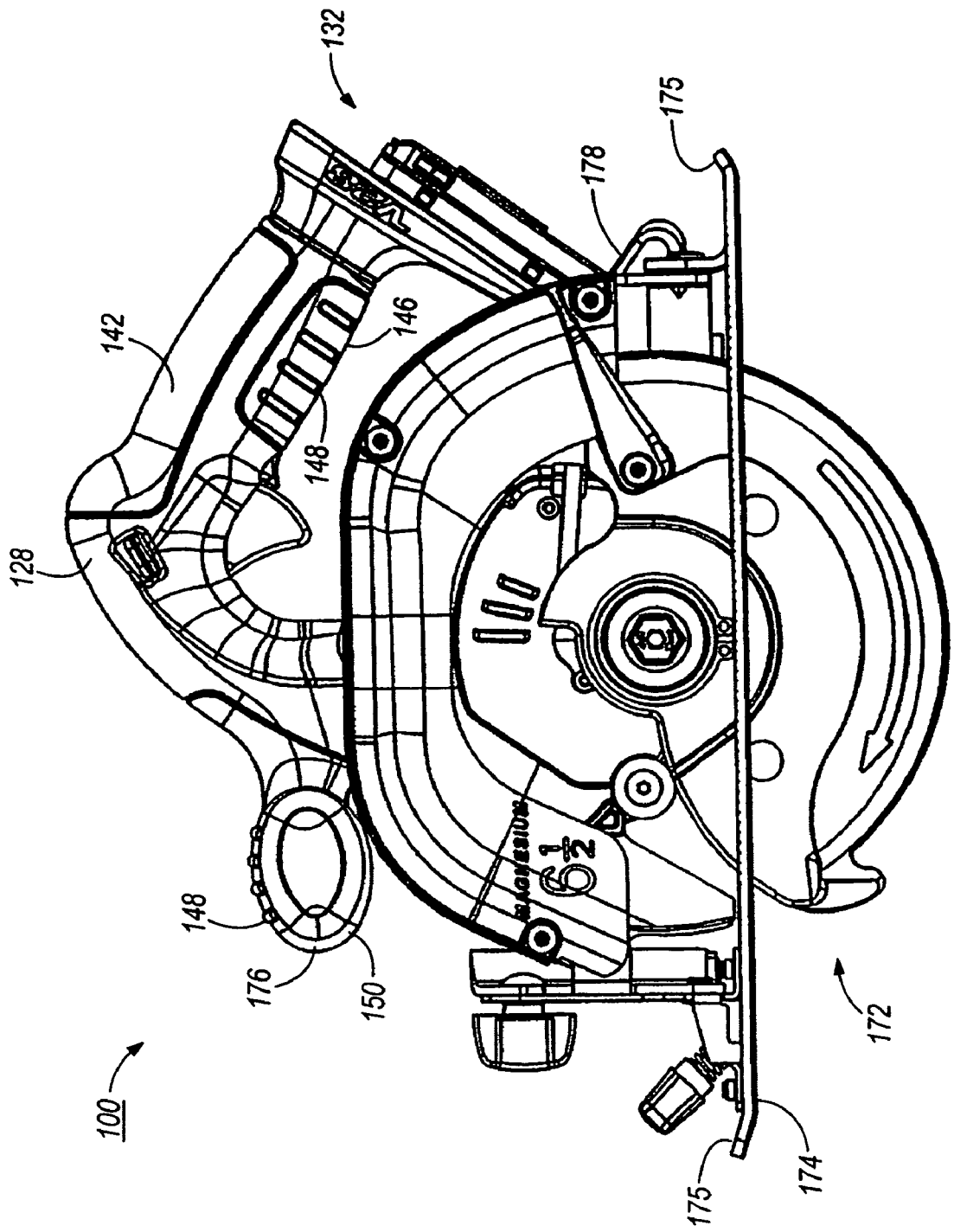
Figure 2D:
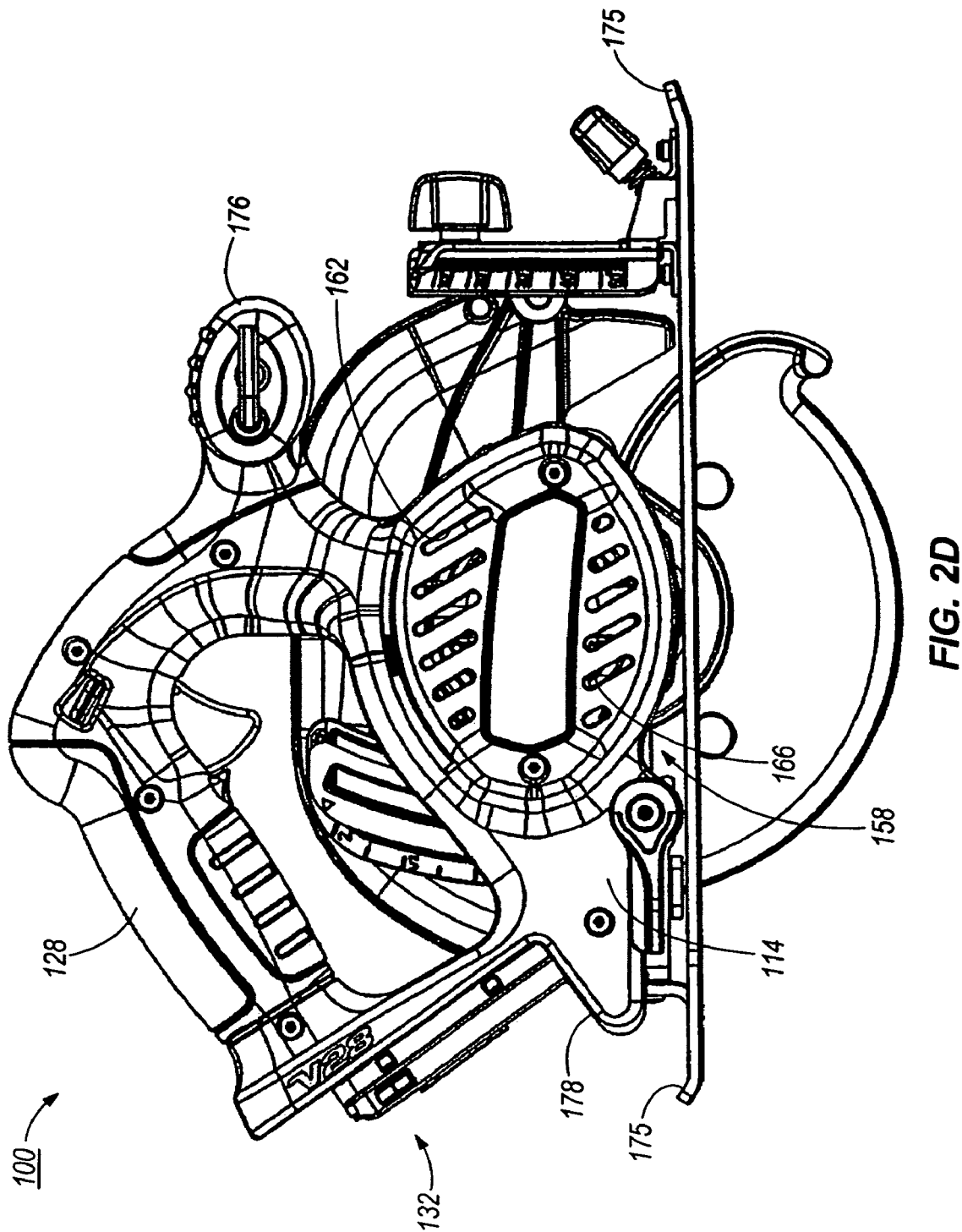
Figure 2E:
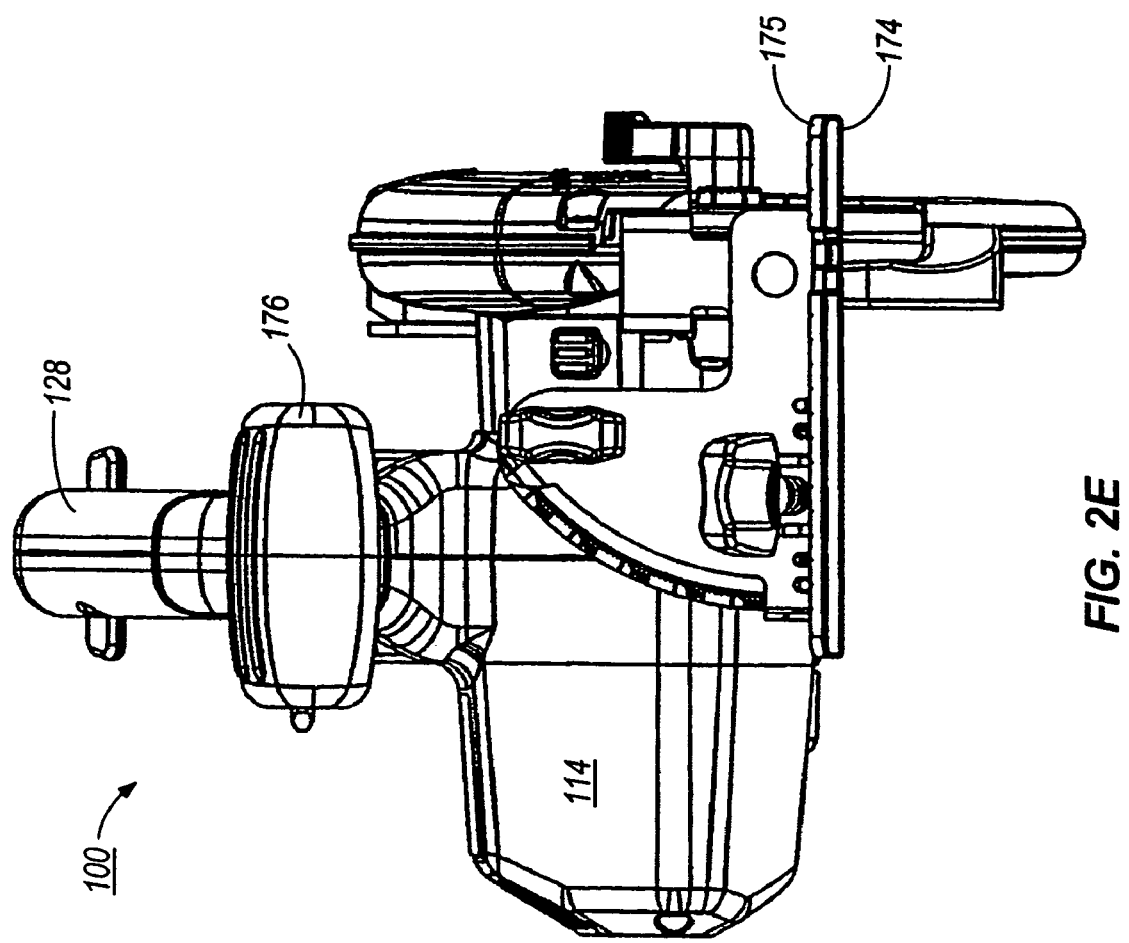
Figure 2F:
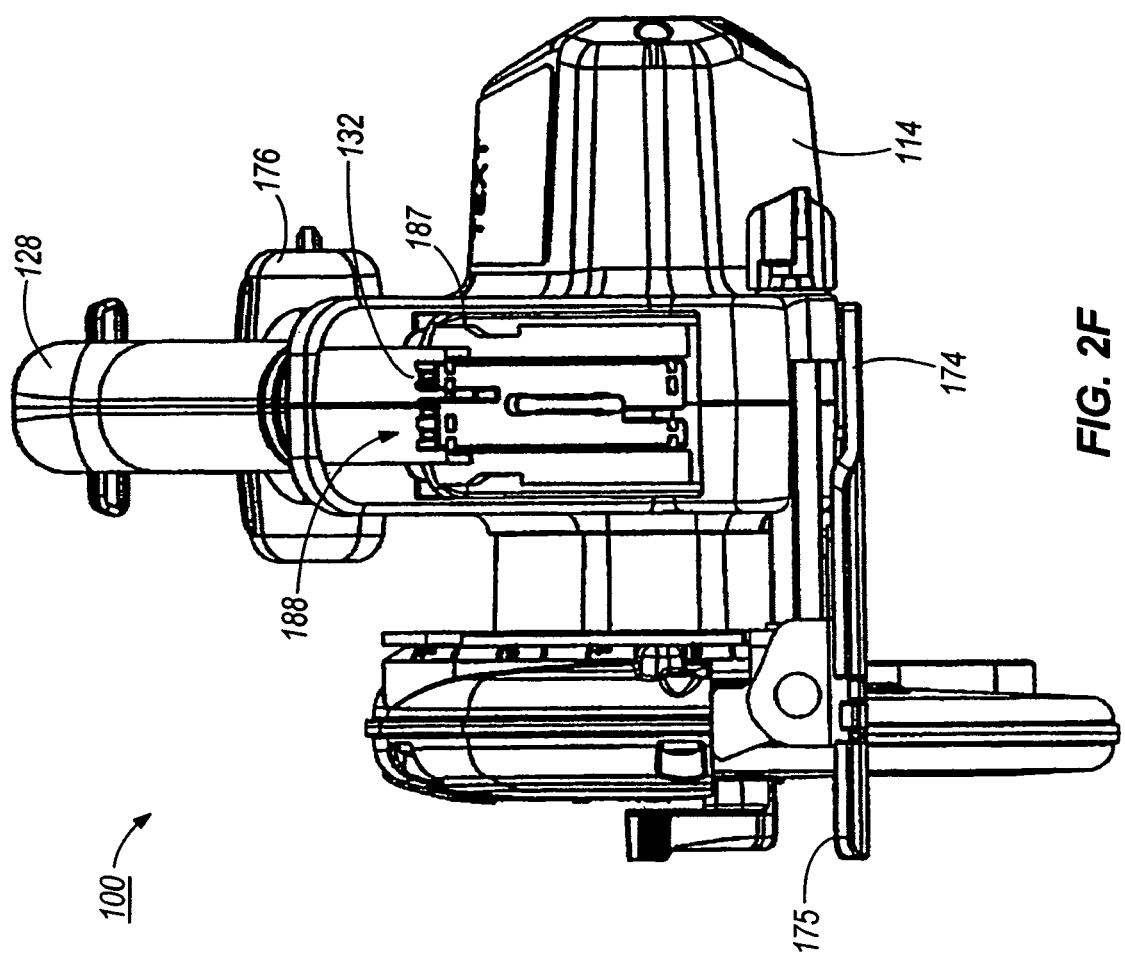
Figure 2G:
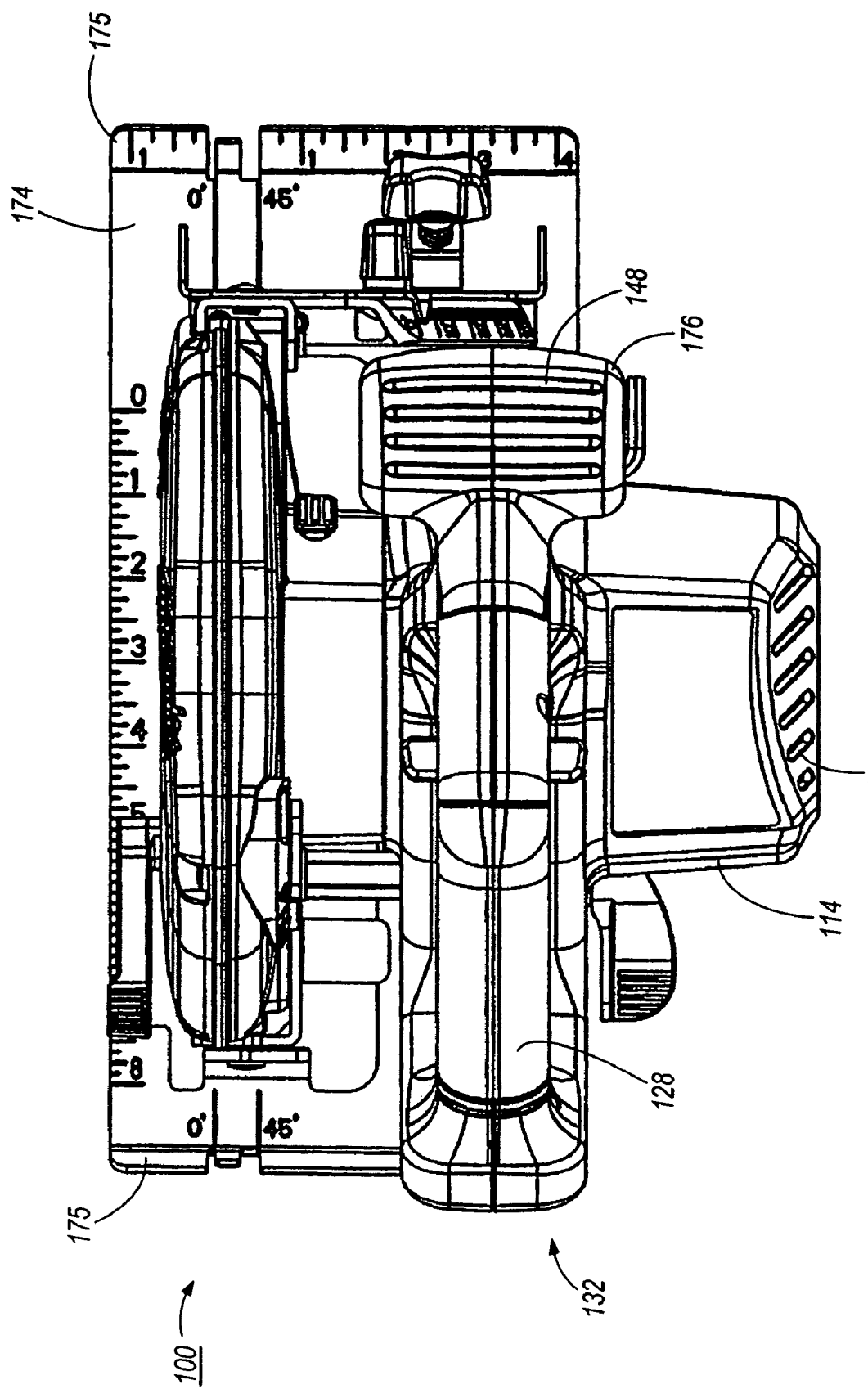
Figure 2H:
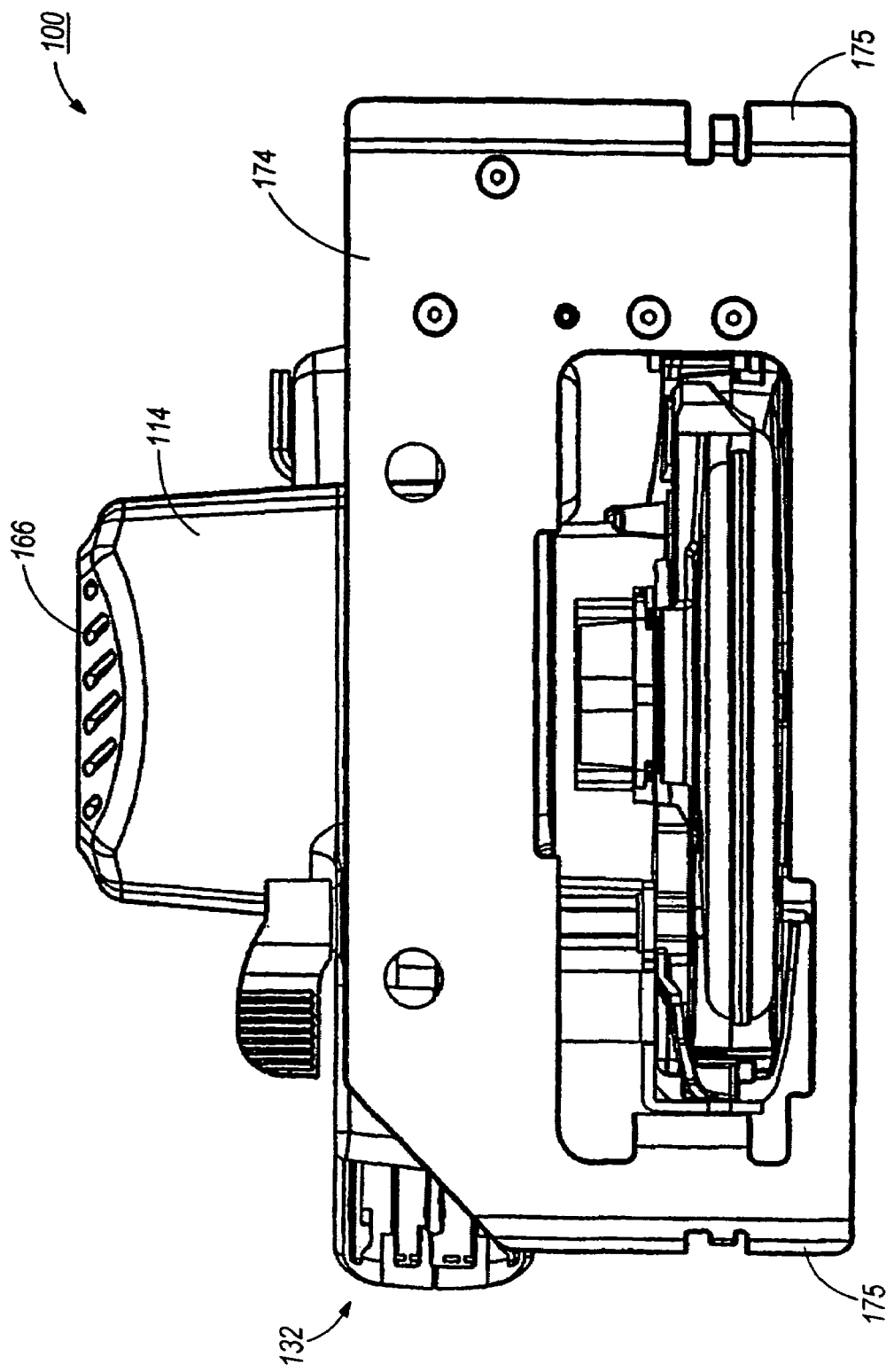

As shown in FIGS. 2C and 2D, the handles 128 and 176 are shaped and arranged to provide for 2-handed operation of the saw 110 as a work piece is cut. In the illustrated construction, each handle 128 and 176 has an ergonomic design to provide for comfortable gripping and controlled operation of the saw 110. The ergonomic design of each handle 128 and 176 and of the combination of the handles 128 and 176 may include the orientation or angle of the handle(s) 128 and/or 176. The ergonomic design may also include the use of material, such as the elastomeric material 138, on the handle(s) 128 and/or 176.

FIGS. 4A-4H illustrate a power tool, such as, for example, an impact wrench 200, embodying one or more independent aspects of the invention. Common elements are identified by the same reference number in the "200" series.

The impact wrench 200 includes a housing body 214 supporting a motor 218 which is operable to drive a transmission 222. A drive connector C is supported on a spindle (not shown) and is driven by the motor 218 and the transmission 222 for rotation and reciprocation. The connector C is operable to support a tool element, such as, for example, a socket.

A handle 228 is connected to the housing 214, and a power source, such as, for example, a battery 230, is supported on the handle 228. The battery 230 is operable to supply power to the motor 218. In the illustrated construction, as discussed above with respect to the battery 230, the battery 230 is a rechargeable, removable power tool battery.

The handle 228 provides a battery support portion 232 for physically supporting the battery 230 on the handle 228 and on the housing 214. The battery support portion 232 also includes a terminal assembly (not shown) for electrically connecting the battery 230 to the motor 218 on electrical circuit (not shown). An on/off switch 234 is supported on the handle 228 and is operable to control the supply of power from the battery 230 to the motor 218.

As discussed above, the battery 230 and the battery support portion 232 are similar to those described in co-pending U.S. patent application Ser. Nos. 10/720,027; 10/721,800; 11/138,070; and 11/165,615.

A flexible or elastomeric material 238 may be provided on one or more surfaces of the impact wrench 10. In the illustrated construction, elastomeric material 242 and 246 is provided on the handle 228, and elastomeric material 250 is provided on a portion of the housing 214. In the illustrated construction, the elastomeric material 242 and 250 is generally continuous. Contoured grip portions, grooves, ridges or ribs 248 may also be provided on the gripping surfaces, such as the handle 228. The material 238 may provide one or more of an improved grip surface, isolate vibration and impacts from the operator, prevent heat build-up and/or transfer to the operator, etc.

In the illustrated construction, the impact wrench 210 includes a support or carrying system 254 for supporting the impact wrench 210. In the illustrated construction, the system 254 includes a connector or ring 280 which is connected to the housing 214. A connecting portion 282 connects the ring 280 to the housing 214. In the illustrated construction, the connecting portion 282 is connected to the housing 214 by fasteners, such as, for example, screws. In other constructions, the connecting portion 282 may be provided by a connecting or carrying system similar to that described in U.S. patent application Ser. No. 10/389,070, as discussed above.

A venting system 258 is provided to allow air flow relative to the motor 218. In the illustrated construction, the venting system 258 includes vents 262 and 266 defined by the housing 214 and communicating between the interior and the exterior of the housing 214. If elastomeric material is provided on the housing 214 (such as the elastomeric material 250), a window 270 is provided in the elastomeric material around the vent (e.g., the vents 266).

Figure 4A:
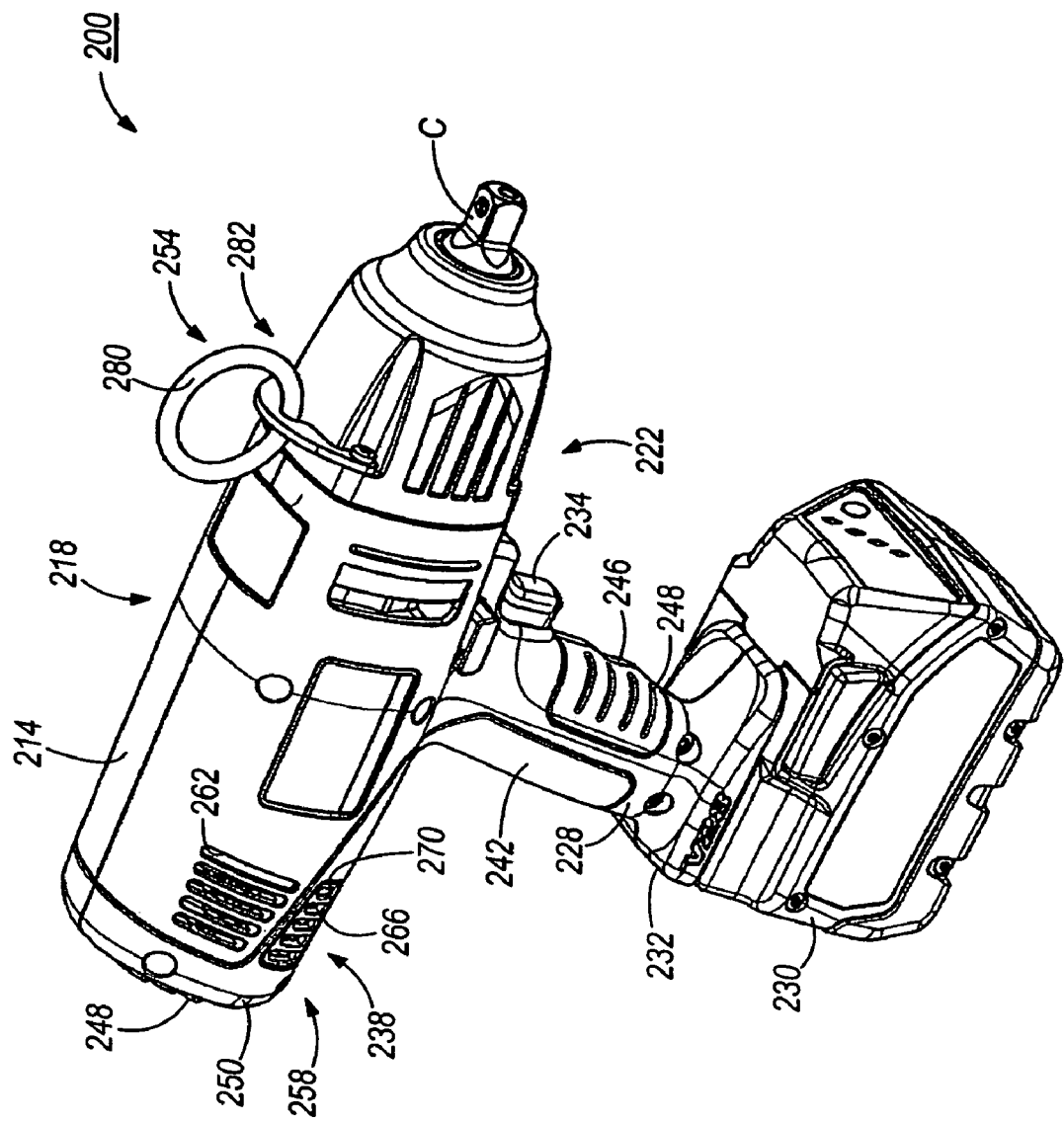
Figure 4B:
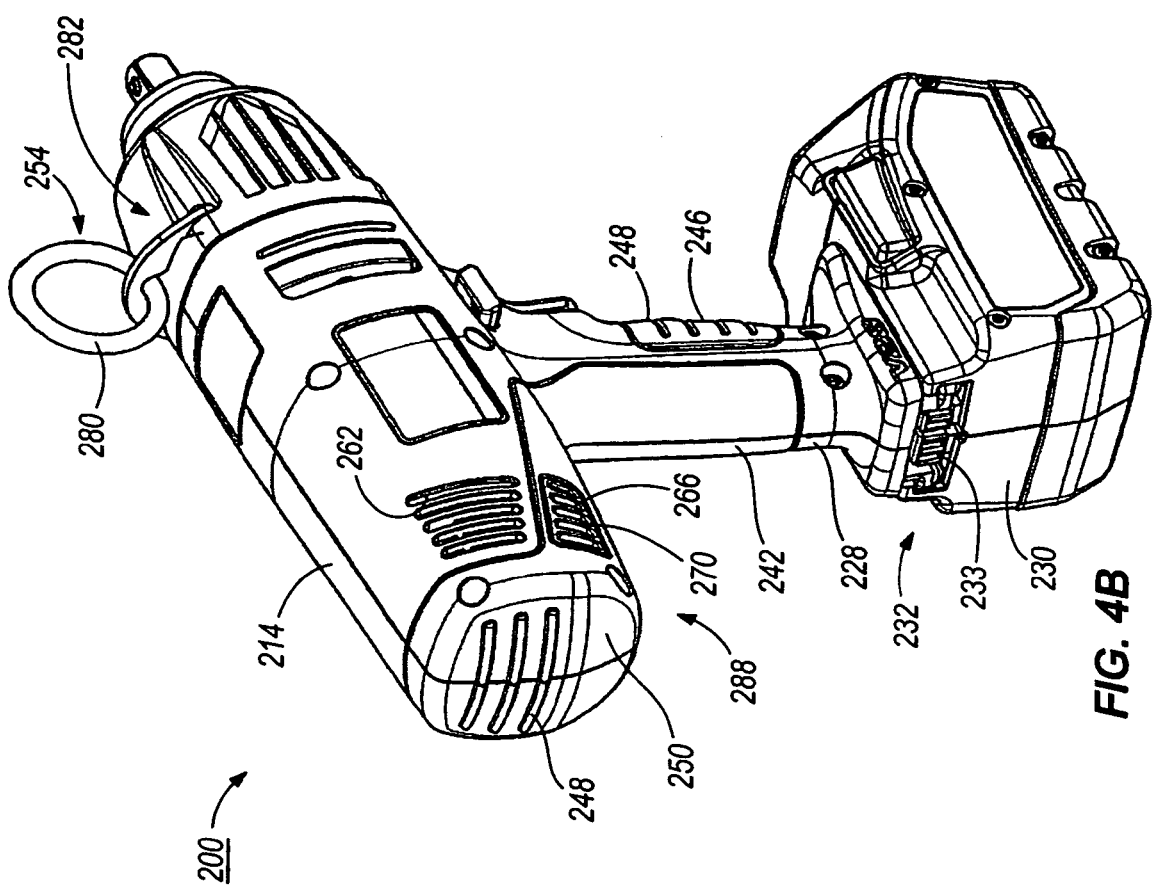
Figure 4C:
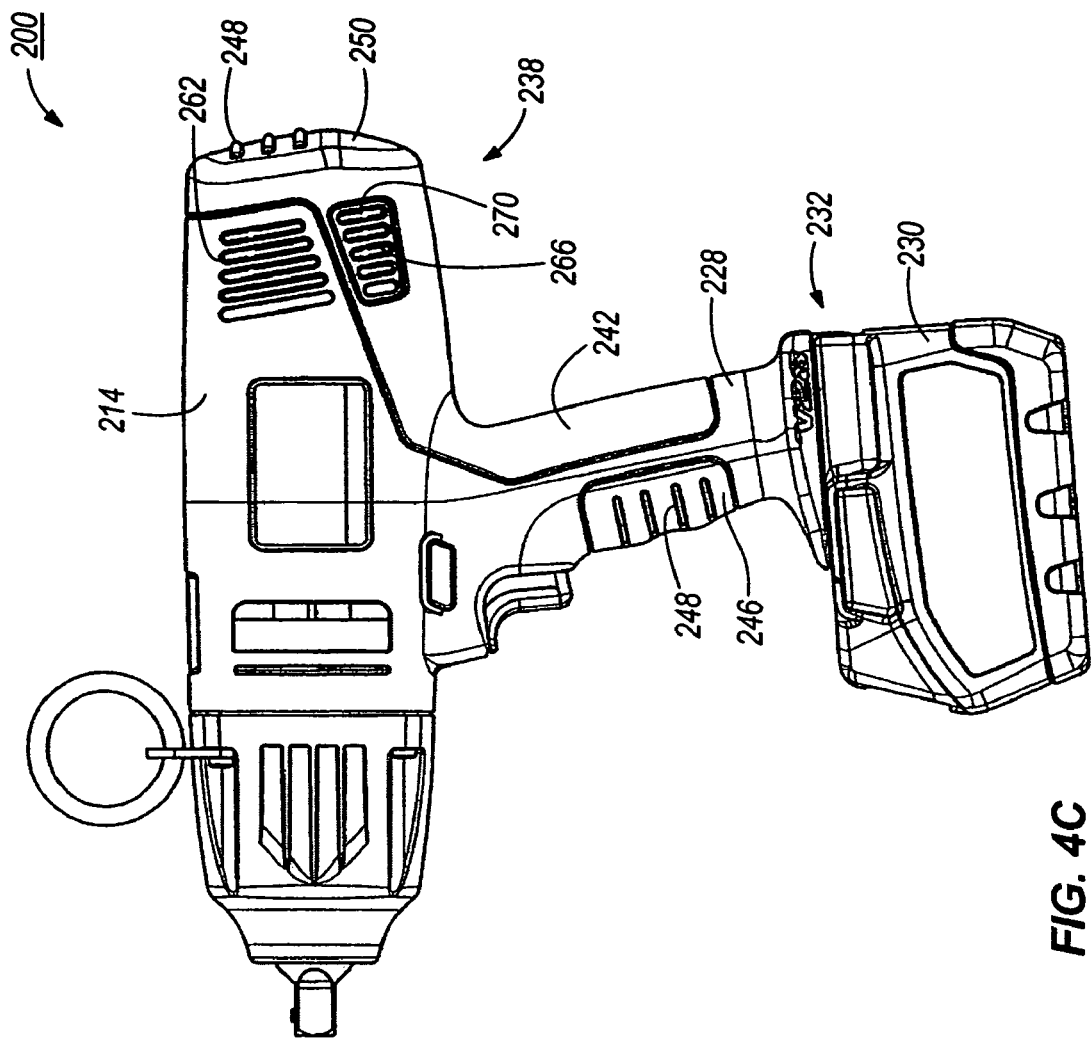
Figure 4D:
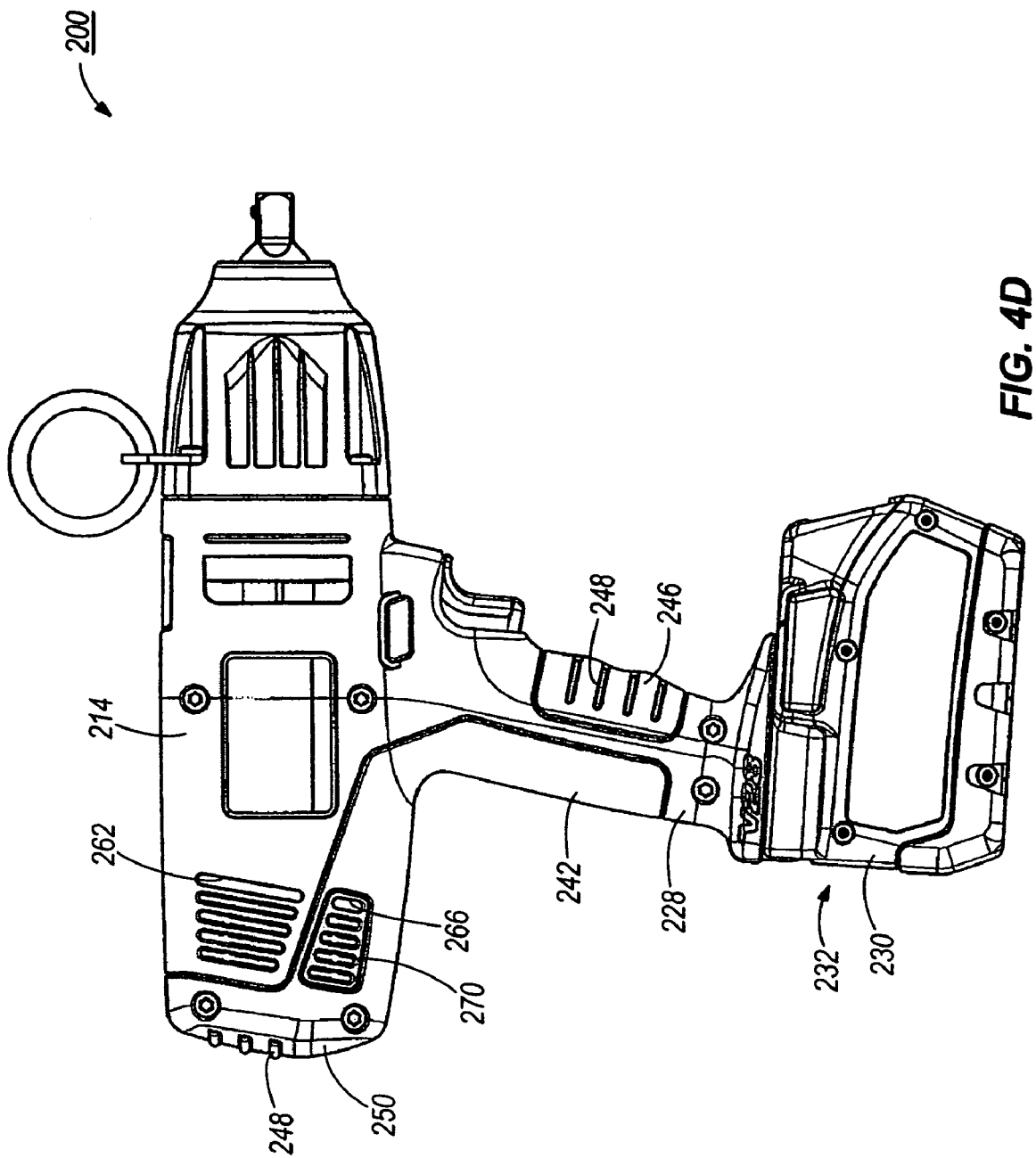
Figure 4E:
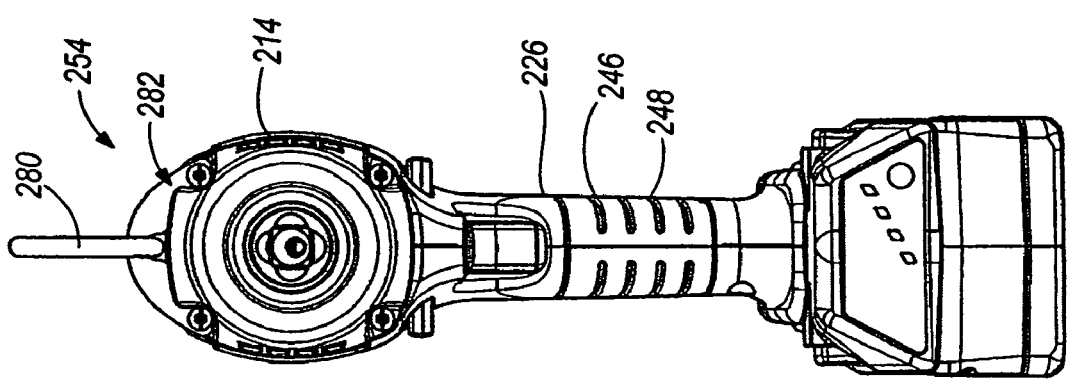
Figure 4G:
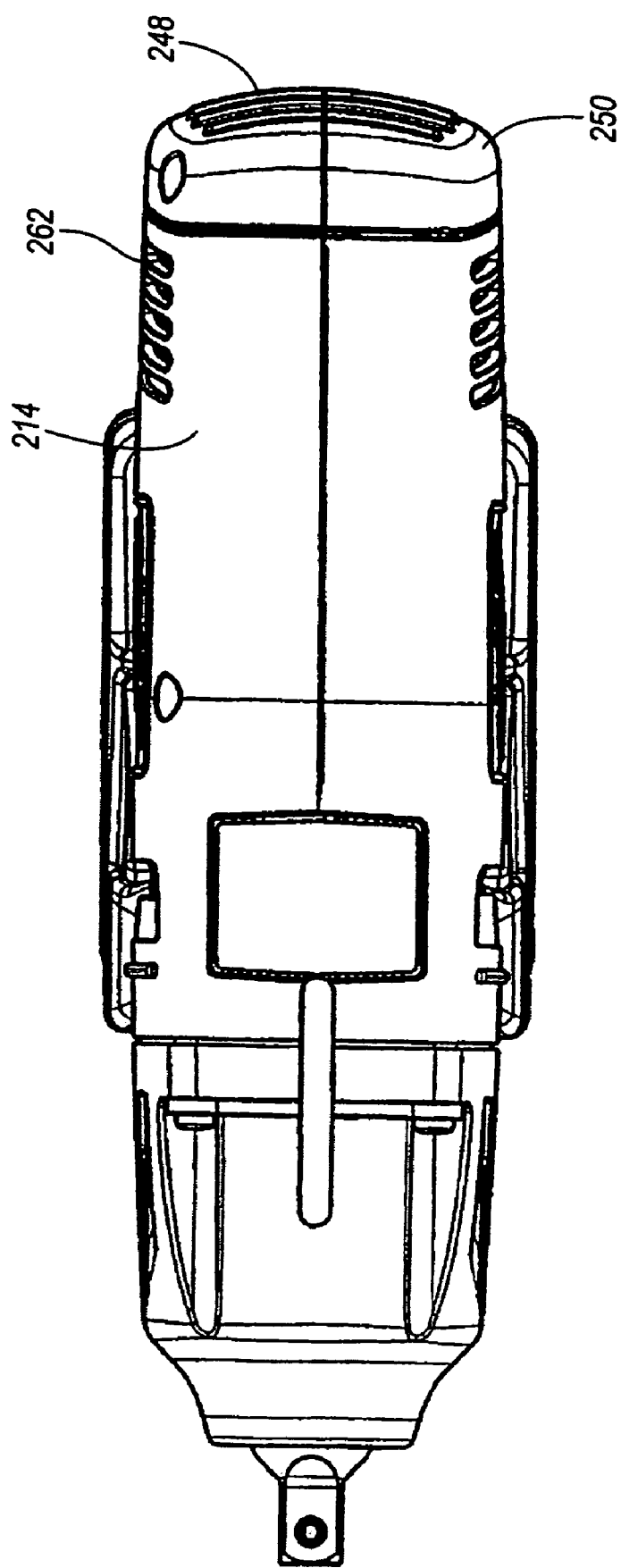
Figure 4H:
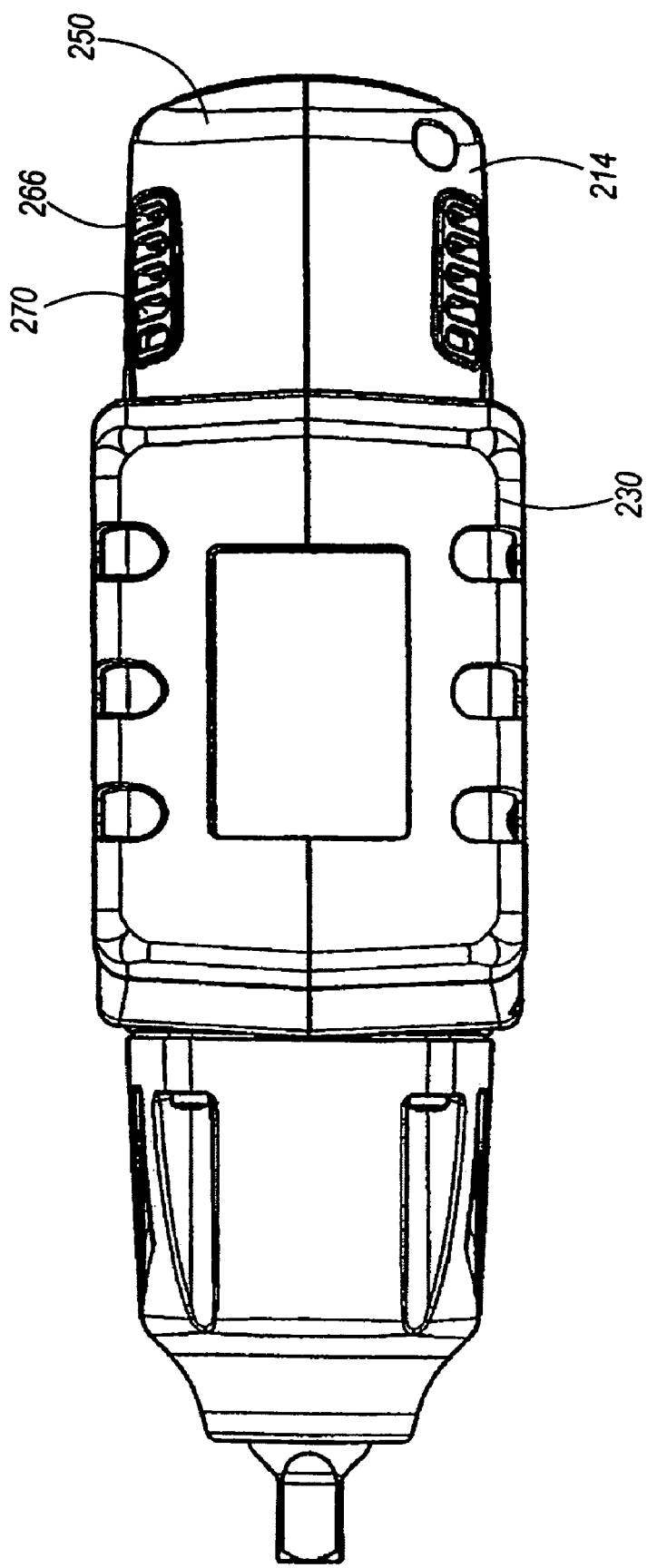

As shown in FIGS. 4C and 4D, the vents 262 and/or 266 do not extend vertically. Instead, the vents 262 and 266 extend at a non-vertical angle (as shown in FIGS. 1C and 1D). The non-vertical angle of the vents 262 and 266 may be at least 10° and may be about 30°.

The impact wrench 200 may be similar to the impact wrench described in U.S. Pat. No. 6,733,414, issued May 11, 2004, entitled GEAR ASSEMBLY FOR A POWER TOOL, the entire contents of which are hereby incorporated by reference.

Figure 5B:
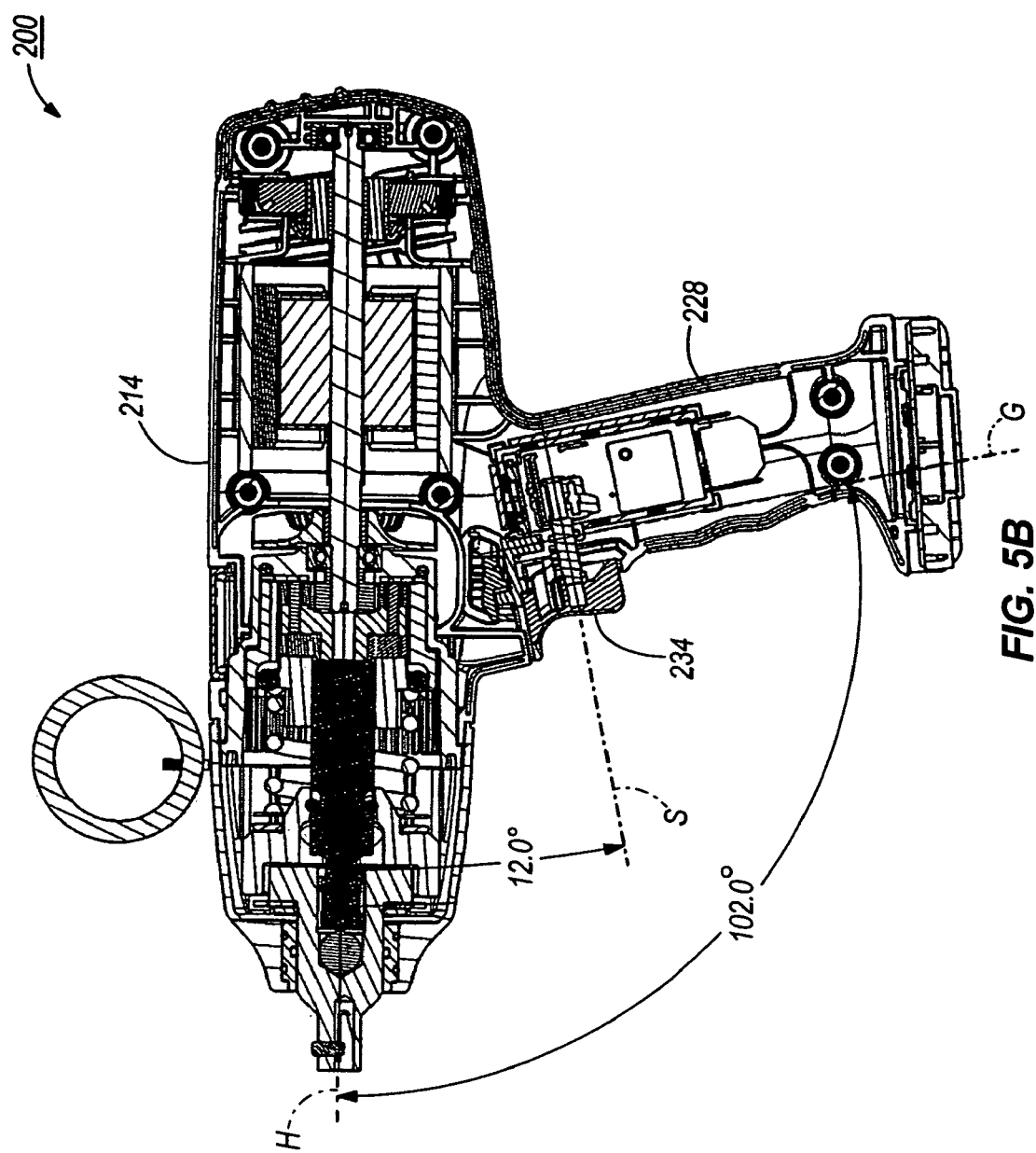

As shown in FIGS. 5A and 5B, the handle 228 extends from the motor housing 214 at an angle which is greater than about 97°. In other words, the axis G of the handle 228 is at an angle of greater than 97° relative to the axis H of the motor housing. In the illustrated construction, the angle of the handle 228 relative to the housing 214 may be at least 100° and may be about 102°.

The switch 234 is slidable along an axis S relative to the handle 228 and to the housing 214. The switch axis S is oriented at an angle of greater than 7° relative to the axis H of the housing 214. The axis S of the switch 234 may be oriented at an angle of at least 10° and may be at an angle of about 12° relative to the axis H of the housing 214.

In the illustrated construction, the battery 230 is a relatively high power battery. To accommodate the increased power supplied through the electrical circuit to the motor 214, a switch 234 having a higher current capacity is provided. To provide an ergonomic configuration of the housing 214, the handle 228 and the higher current capacity switch 234, the handle 228 extends at the illustrated angle relative to the housing 214, and the switch 234 slides along the axis S which is oriented at the illustrated angle relative to the housing 214.

Figure 6:
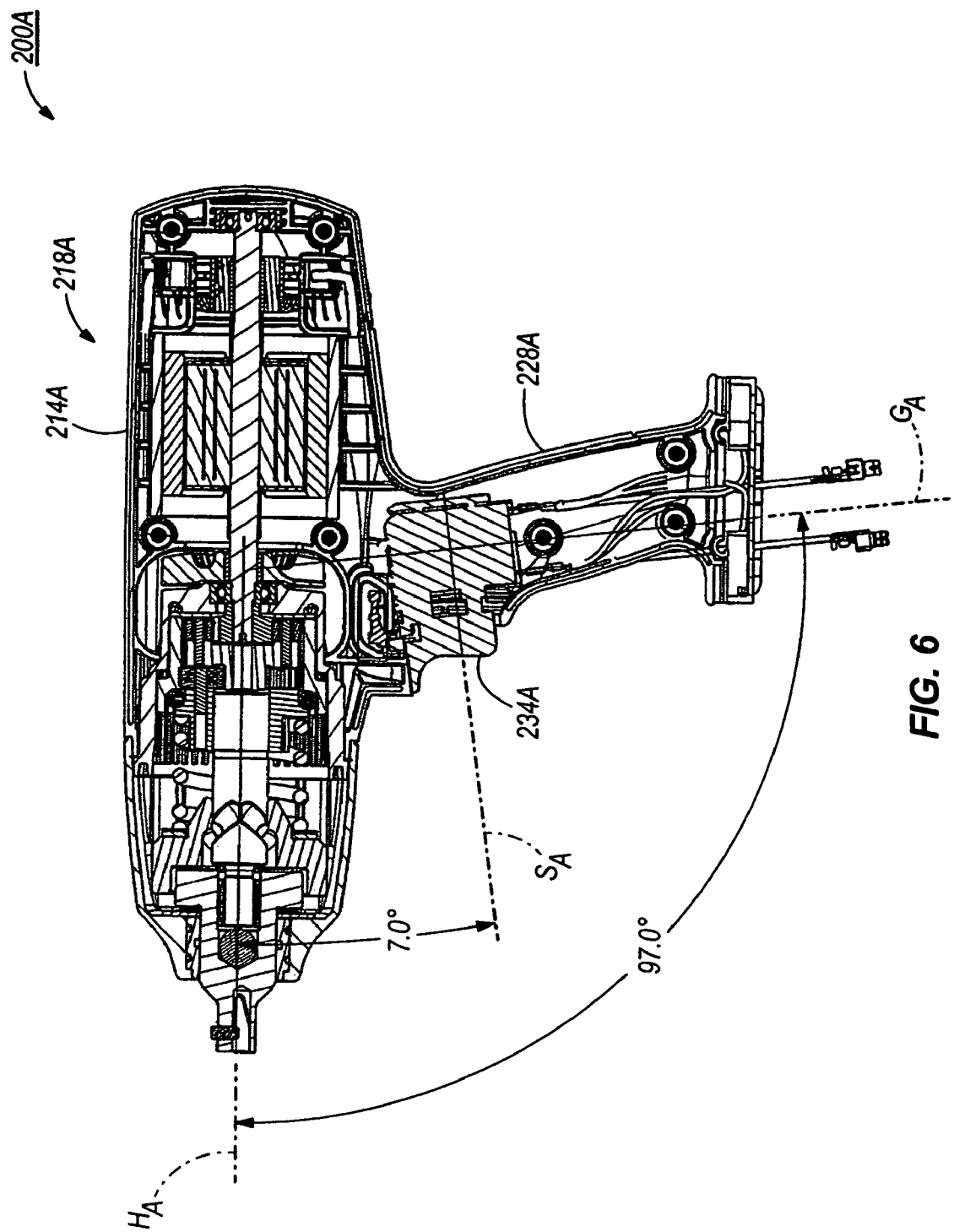
FIG. 6 is a side cross-sectional view of another construction of an impact wrench.
Figure 7F:
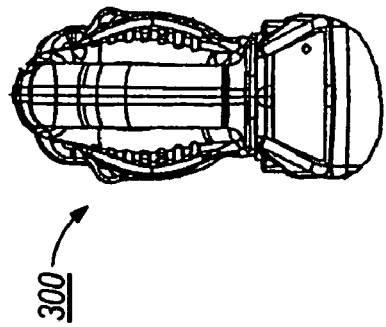
Figure 7G:
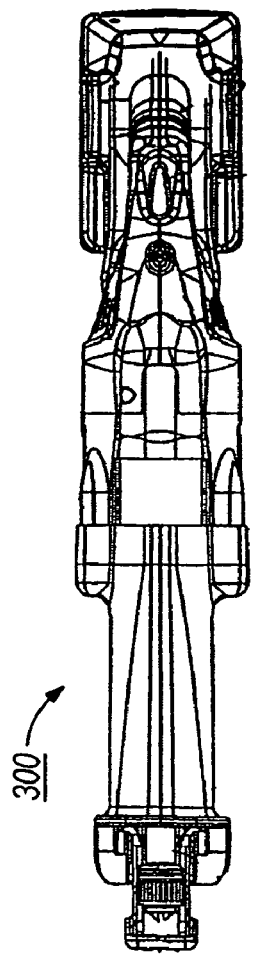
Figure 7C:
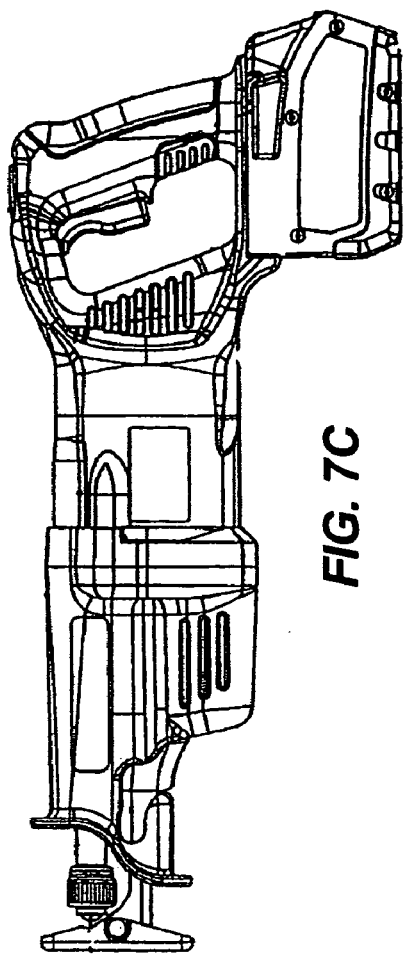
Figure 7D:
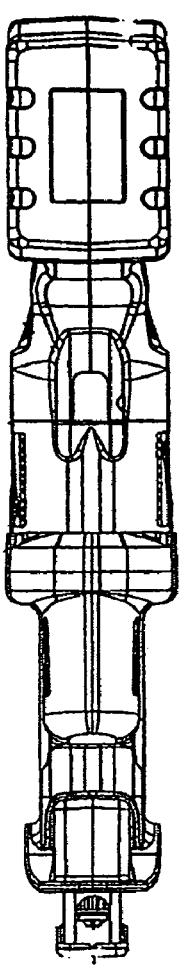
Figure 7E:
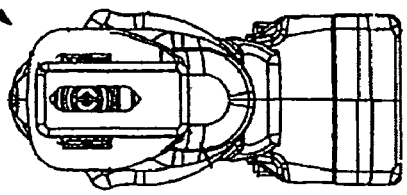
Figure 8B:
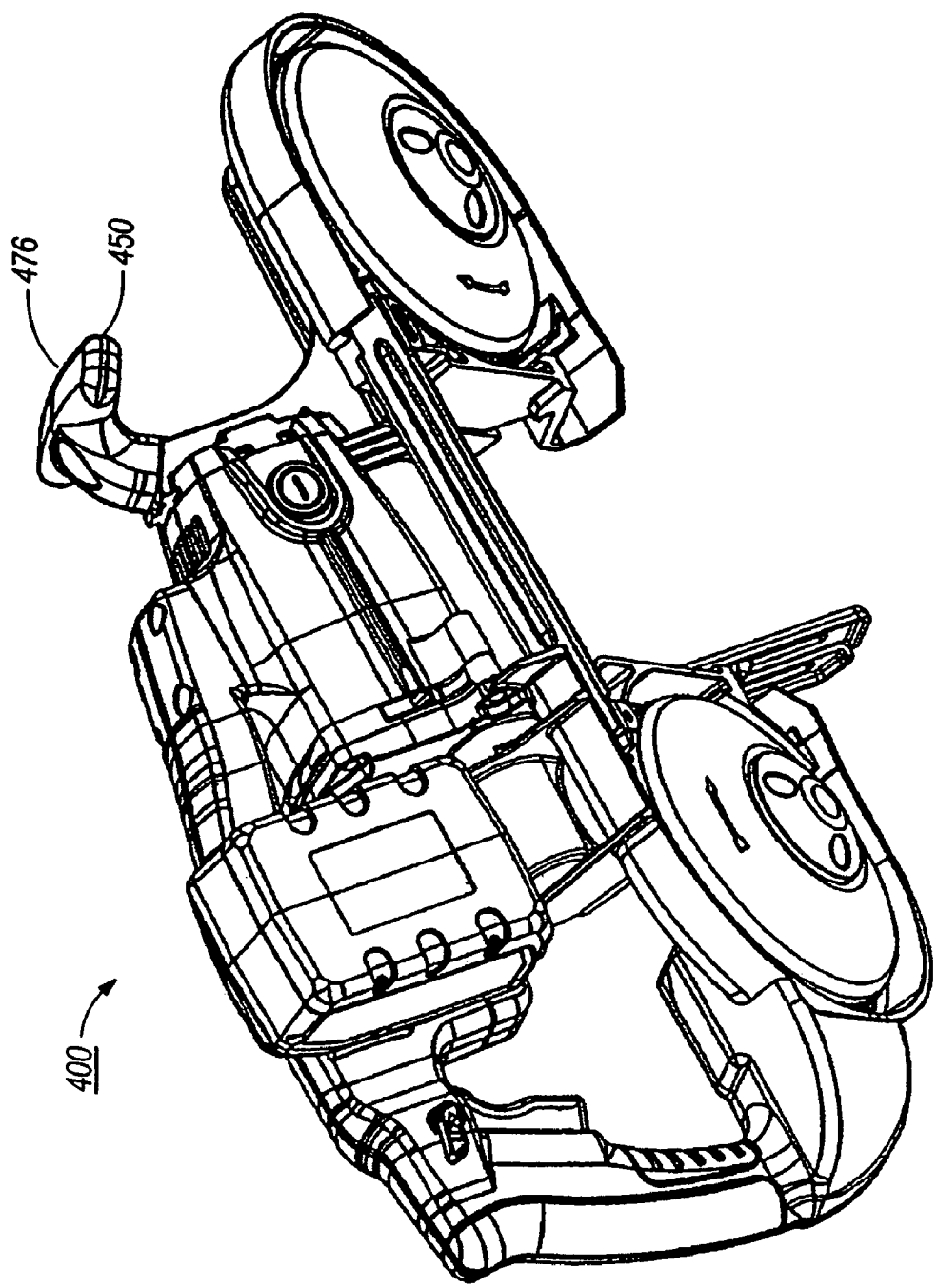
Figure 8C:
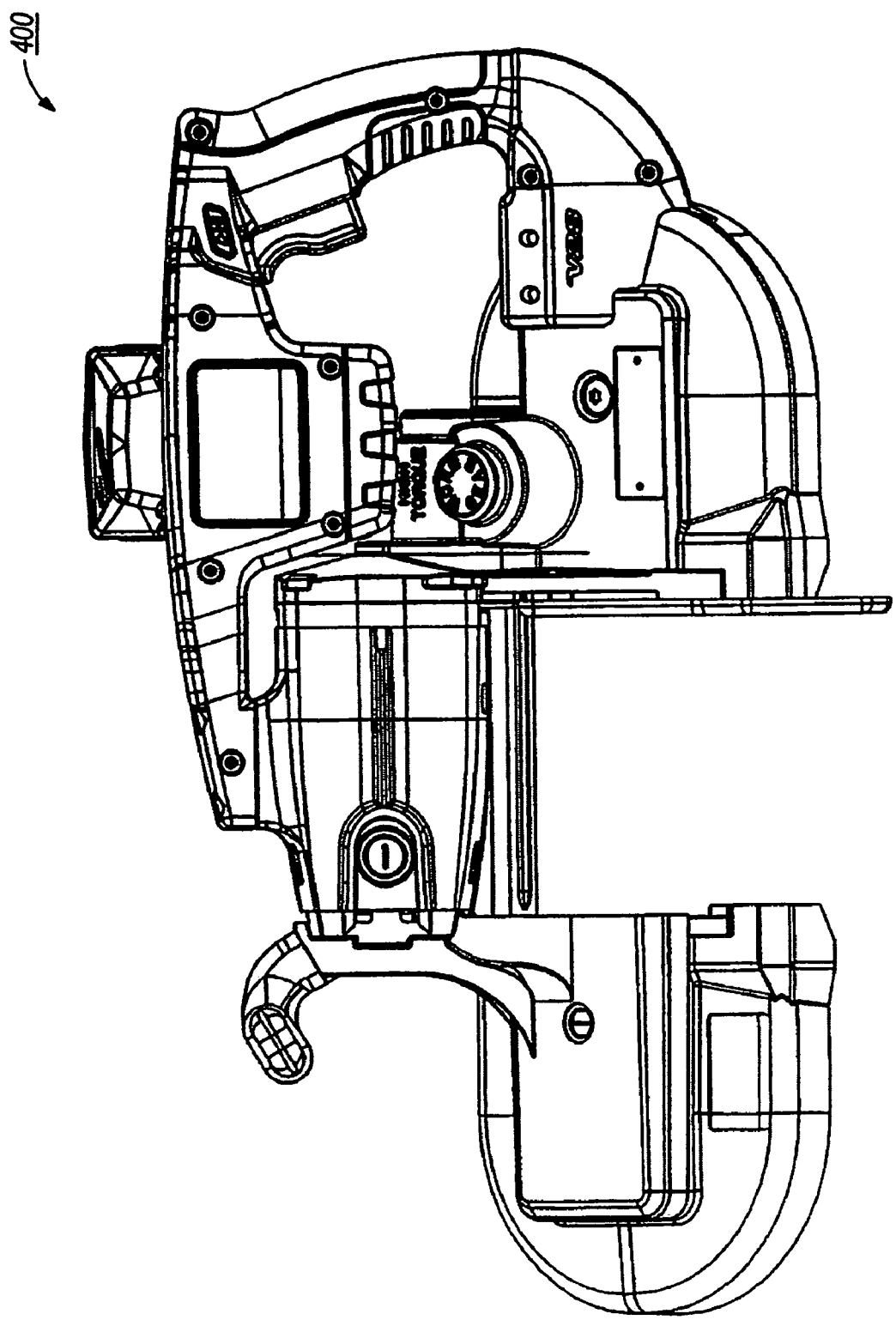
Figure 8D:
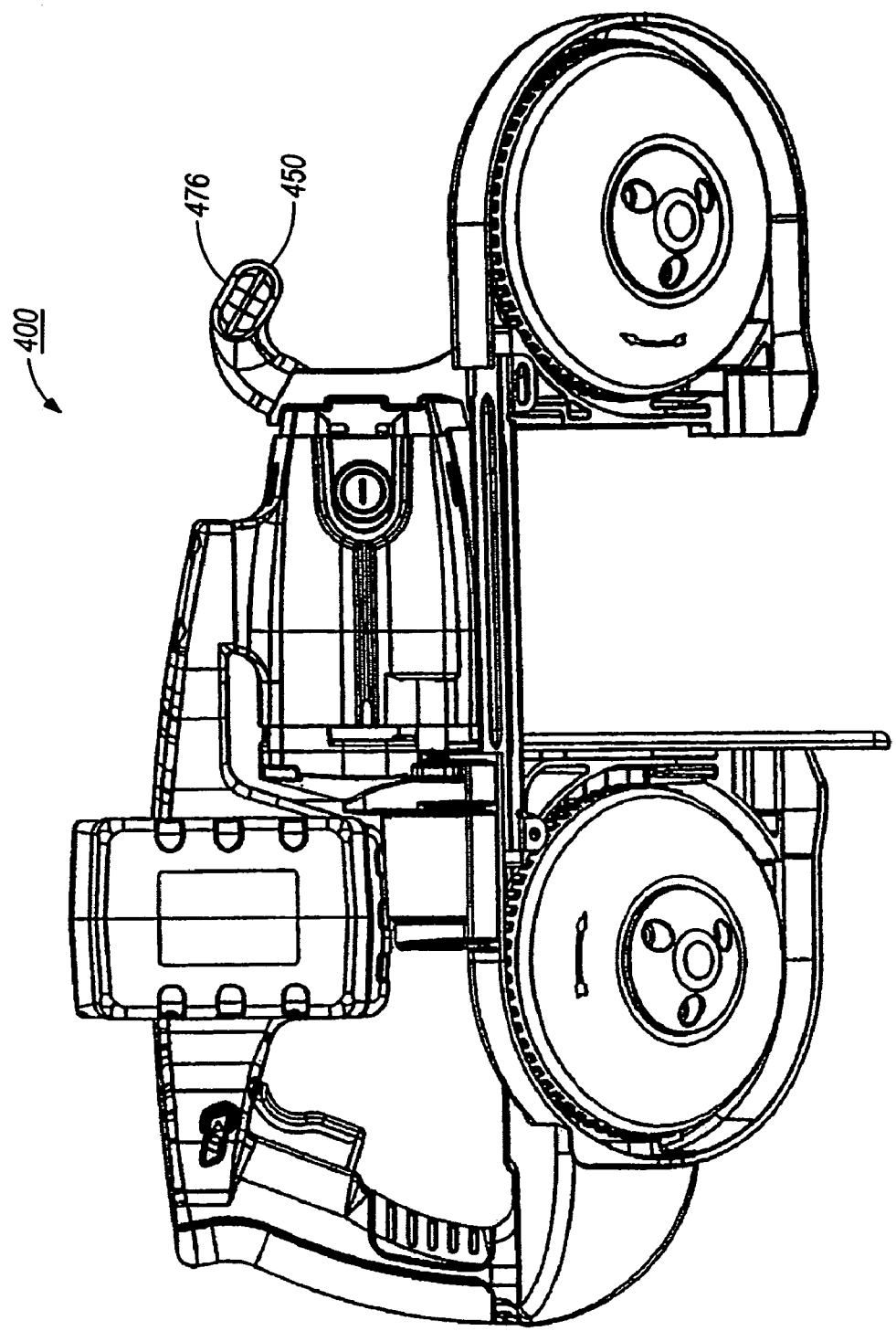
Figure 8E:
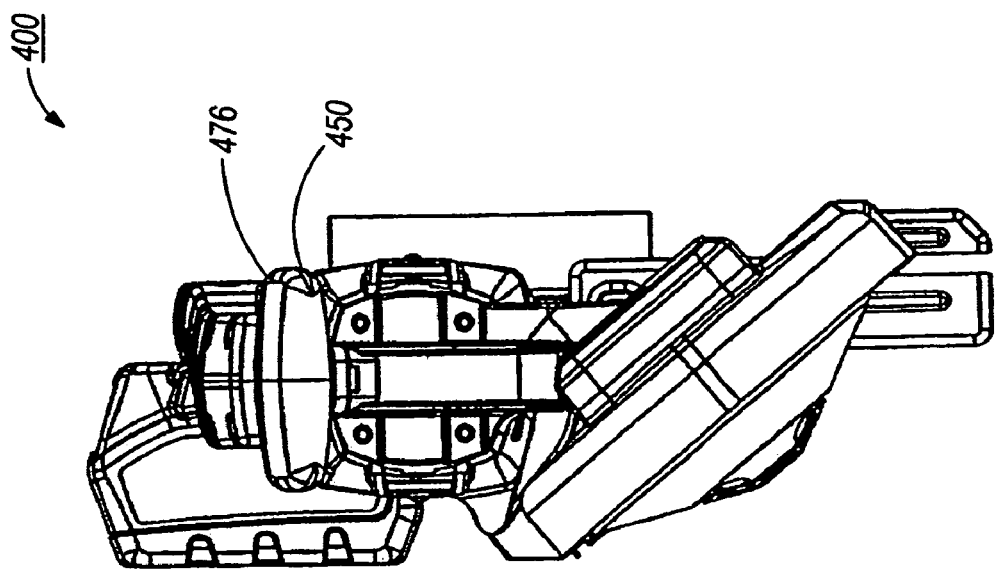
Figure 8F:
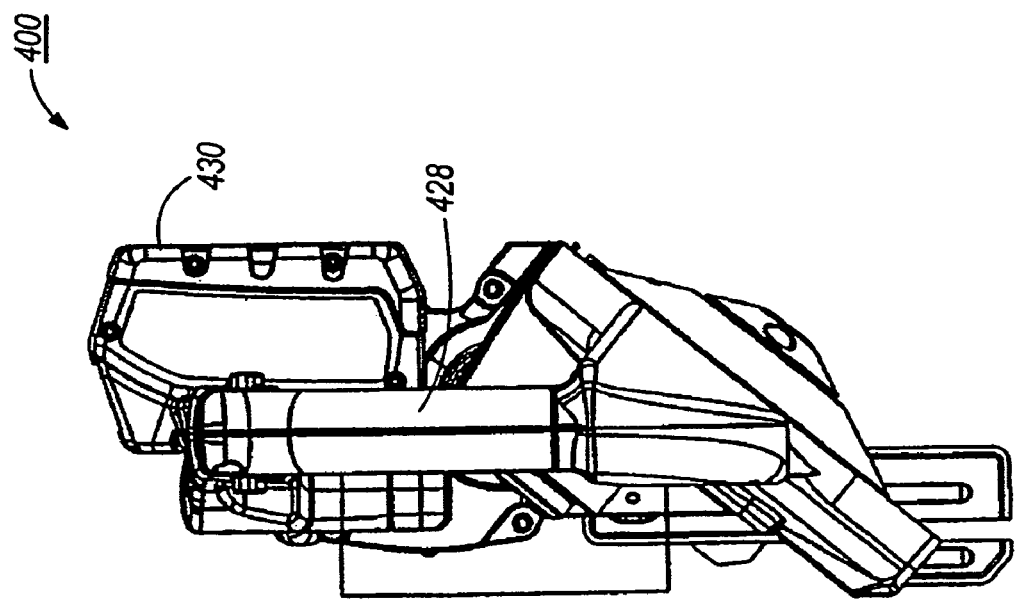
Figure 8G:
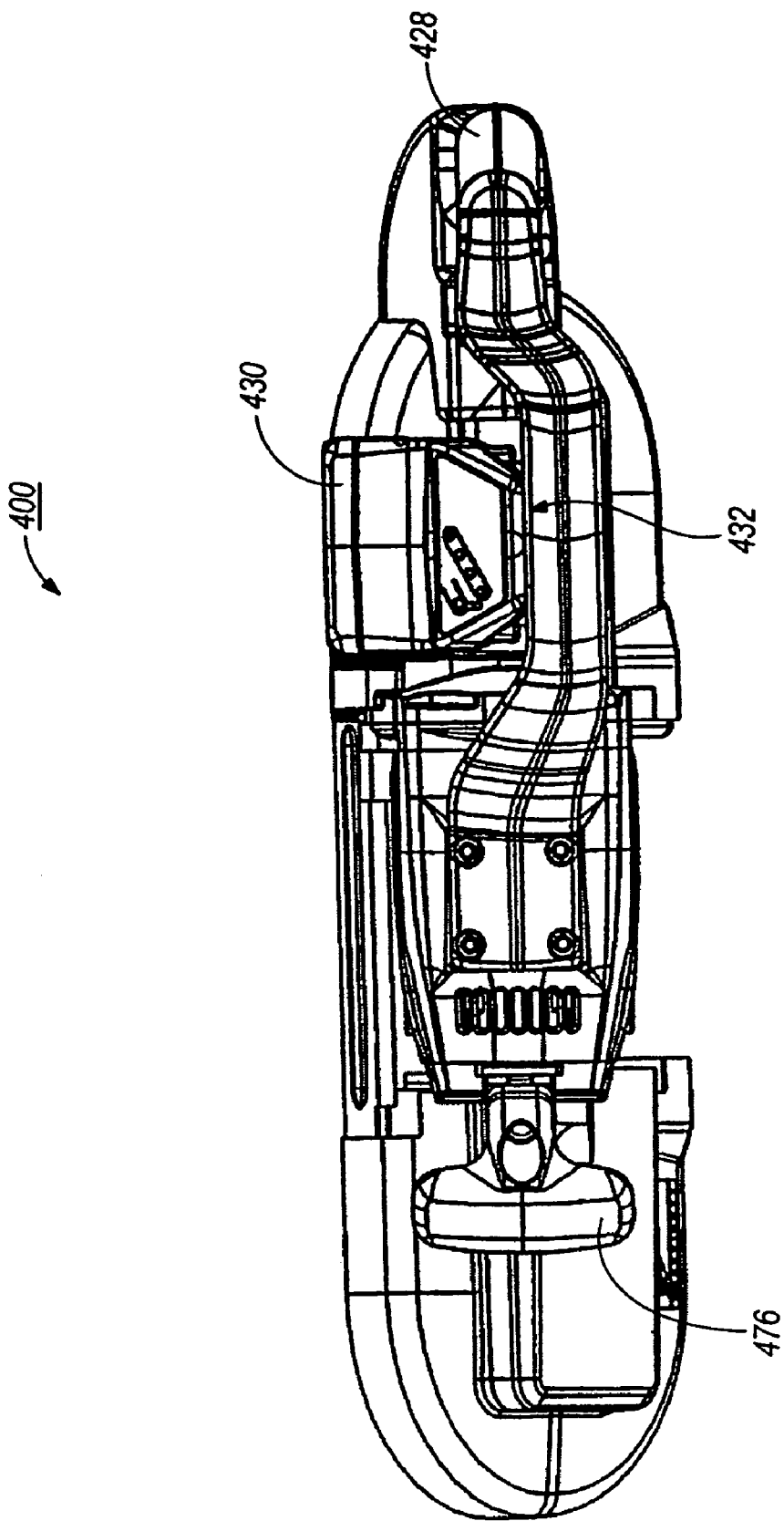
Figure 8H:
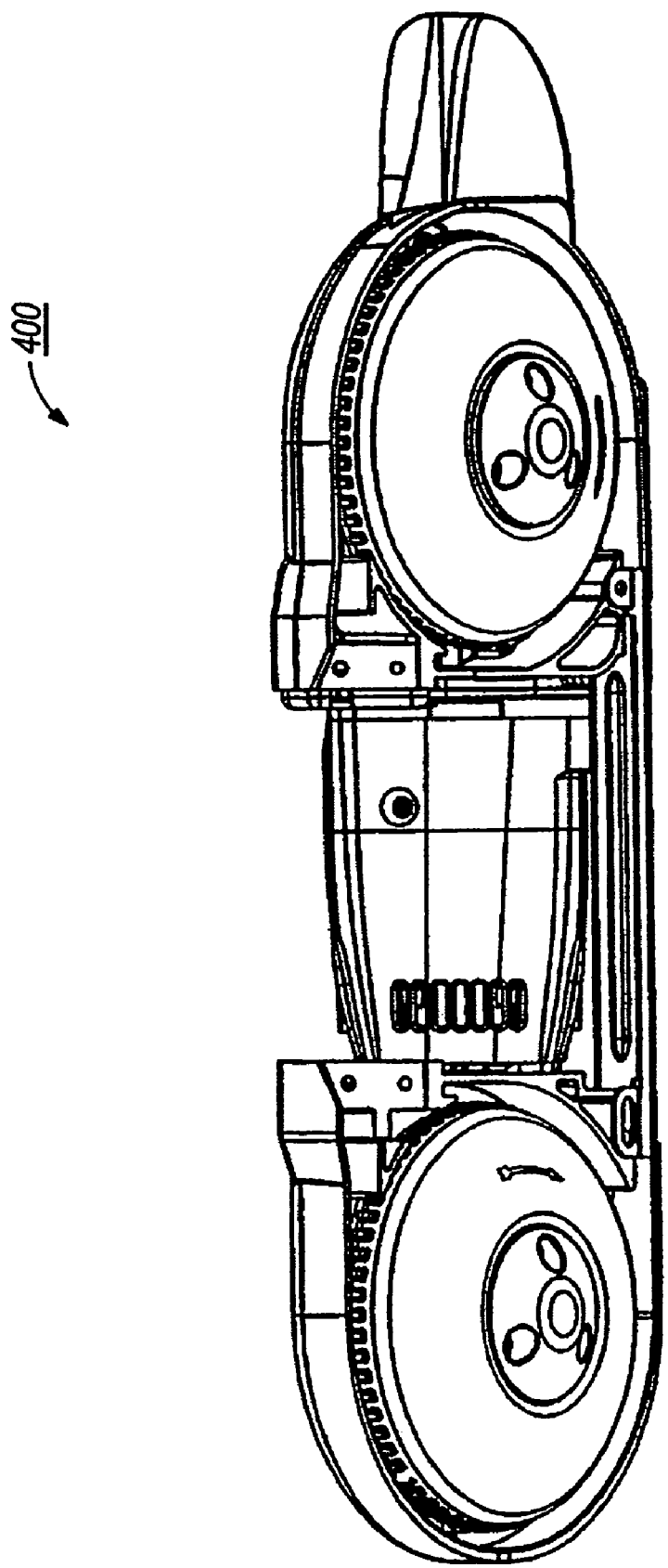

FIG. 6 illustrates an alternate construction of a power tool, such as, for example, an impact wrench 200A. In the illustrated construction, the impact wrench 200A is powered by a relatively lower power battery (not shown) of 18 V or less. With the lower power supplied by the battery through the electrical circuits of the motor 218A, a switch 234A capable of handling a higher current is not required. With the lower current capacity switch 234A, the axis $G_A$ of the handle 228A and the axis $S_A$ of the switch 234A may be oriented as illustrated relative to the axis $H_A$ of the housing 214A.

FIGS. 7A-7G illustrate a power tool, such as, for example, a reciprocating saw 300, embodying one or more independent aspects of the invention. Common elements are identified by the same reference number in the "300" series.

The reciprocating saw 300 may be similar to the power tool described in co-pending U.S. Patent Application Ser. No. 60/619,788, filed Oct. 16, 2004, entitled POWER TOOL AND METHOD OF OPERATING THE SAME and in co-pending U.S. patent application Ser. No. 11/250,931, filed Oct. 14, 2005, entitled POWER TOOL AND METHOD OF OPERATING THE SAME, the entire contents of all of which are hereby incorporated by reference.

FIGS. 8A-8H illustrate a power tool, such as, for example, a band saw 400, embodying one or more independent aspects of the invention. Common elements are identified by the same reference number in the "400" series.

The band saw 400 may be similar to the band saw described in co-pending U.S. patent application Ser. No. 11/061,057, filed Feb. 18, 2005, entitled BAND SAW, in co-pending U.S. Patent Application Ser. No. 60/623,422, filed Oct. 28, 2004, entitled BAND SAW, and in co-pending U.S. patent application Ser. No. 06/546,489, filed Feb. 20, 2004, entitled BAND SAW, the entire the contents of all of which are hereby incorporated by reference.

Figure 9A:
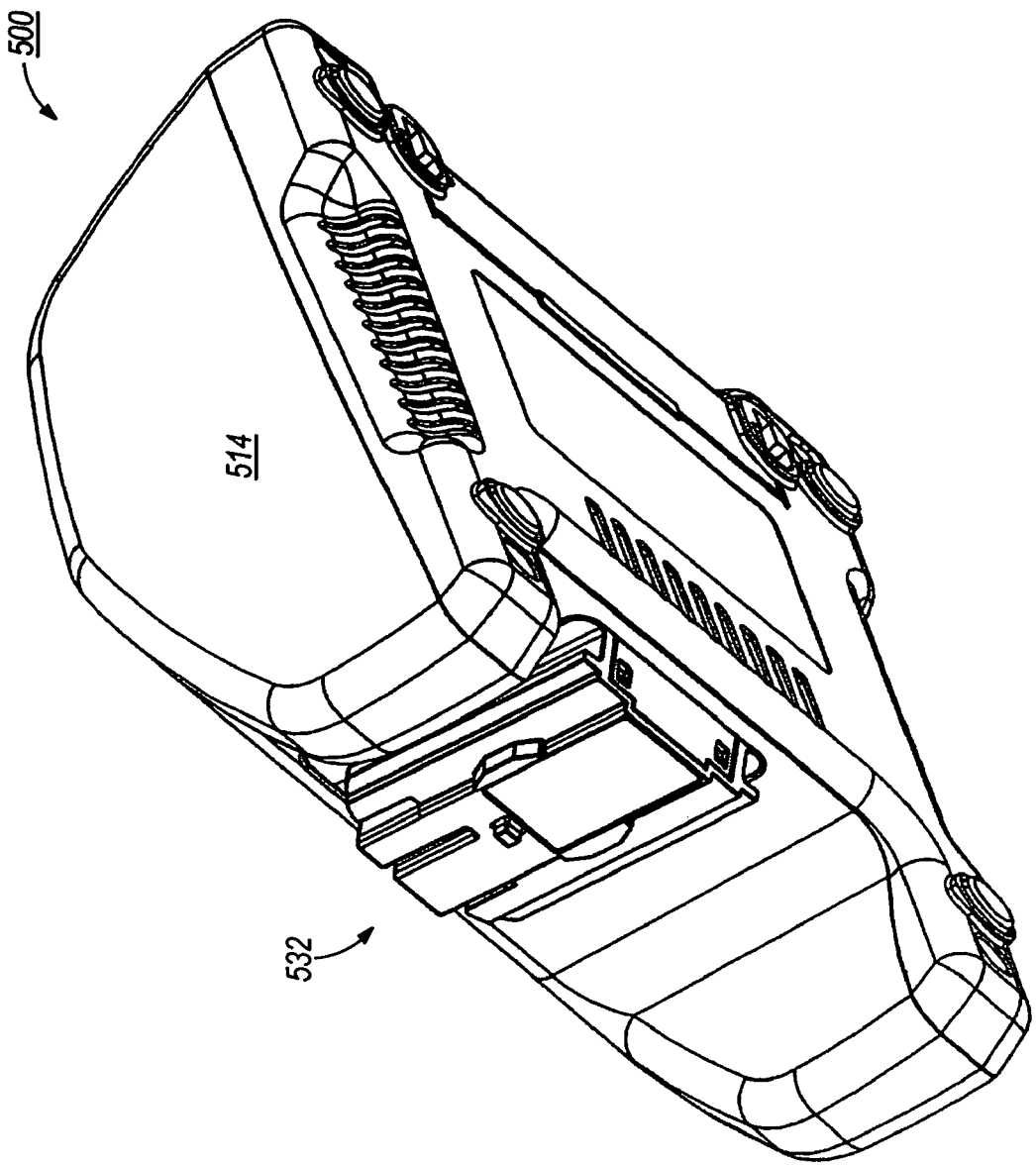
FIGS. 9A-9P are views of a battery charger.
Figure 9B:
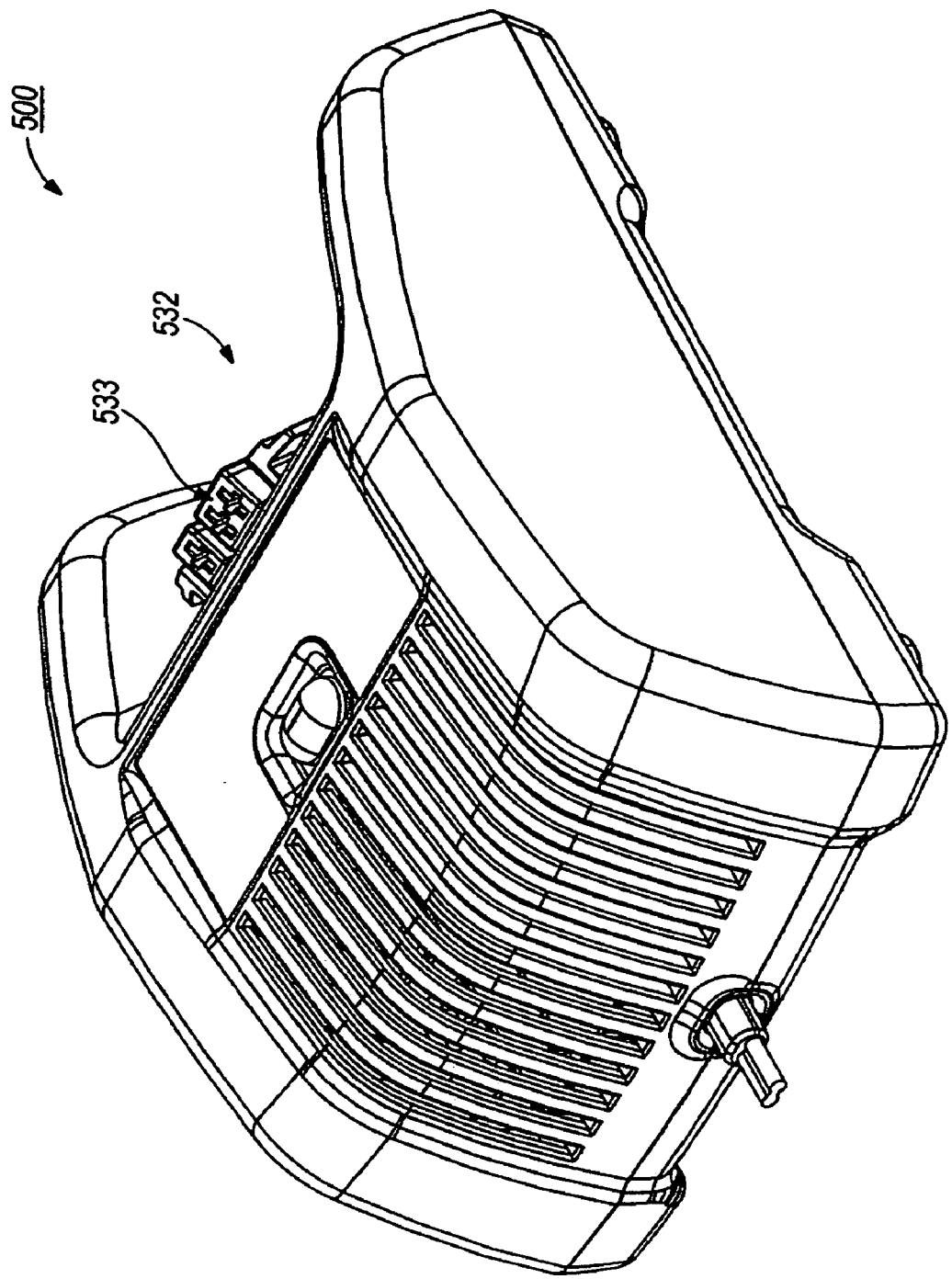
Figure 9C:
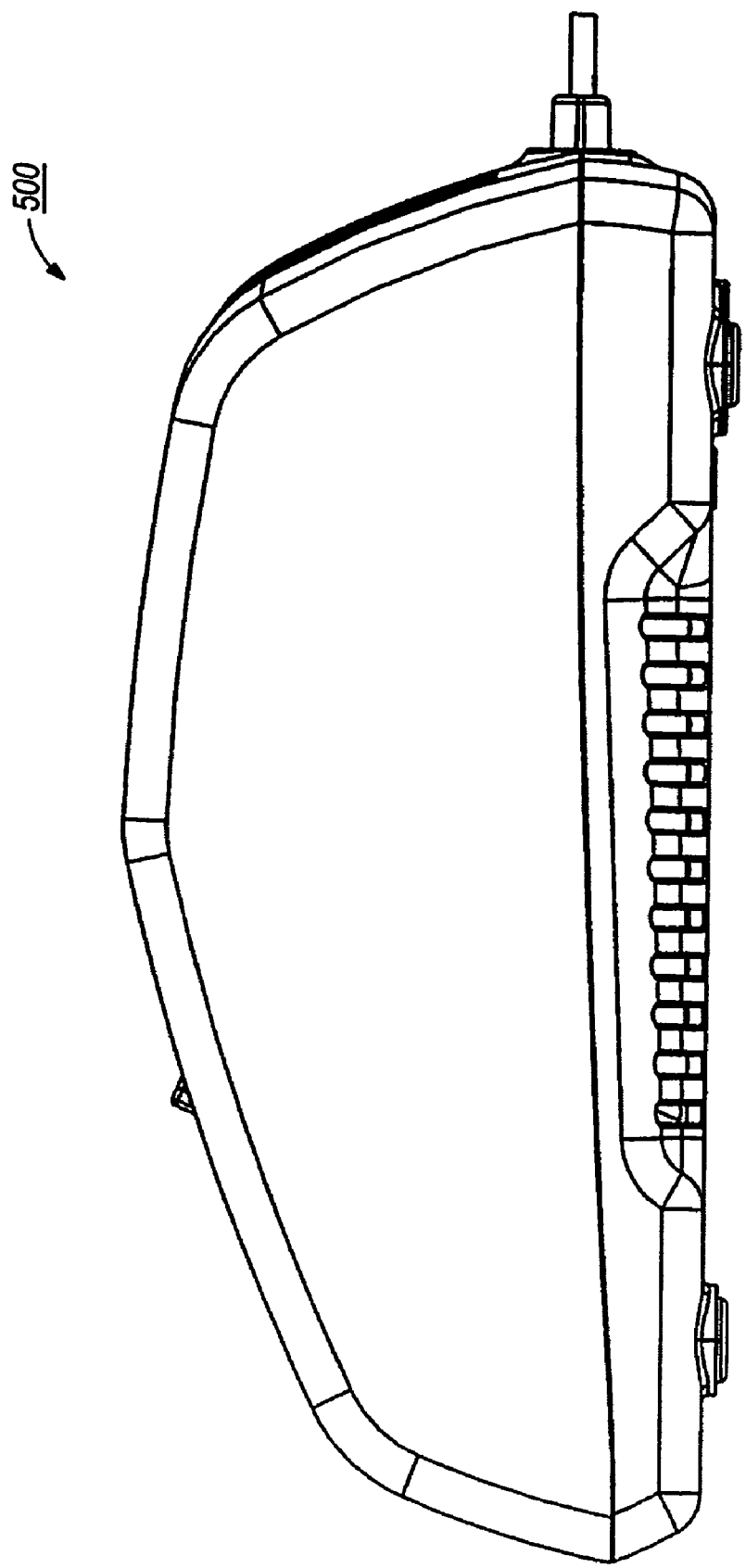
Figure 9D:
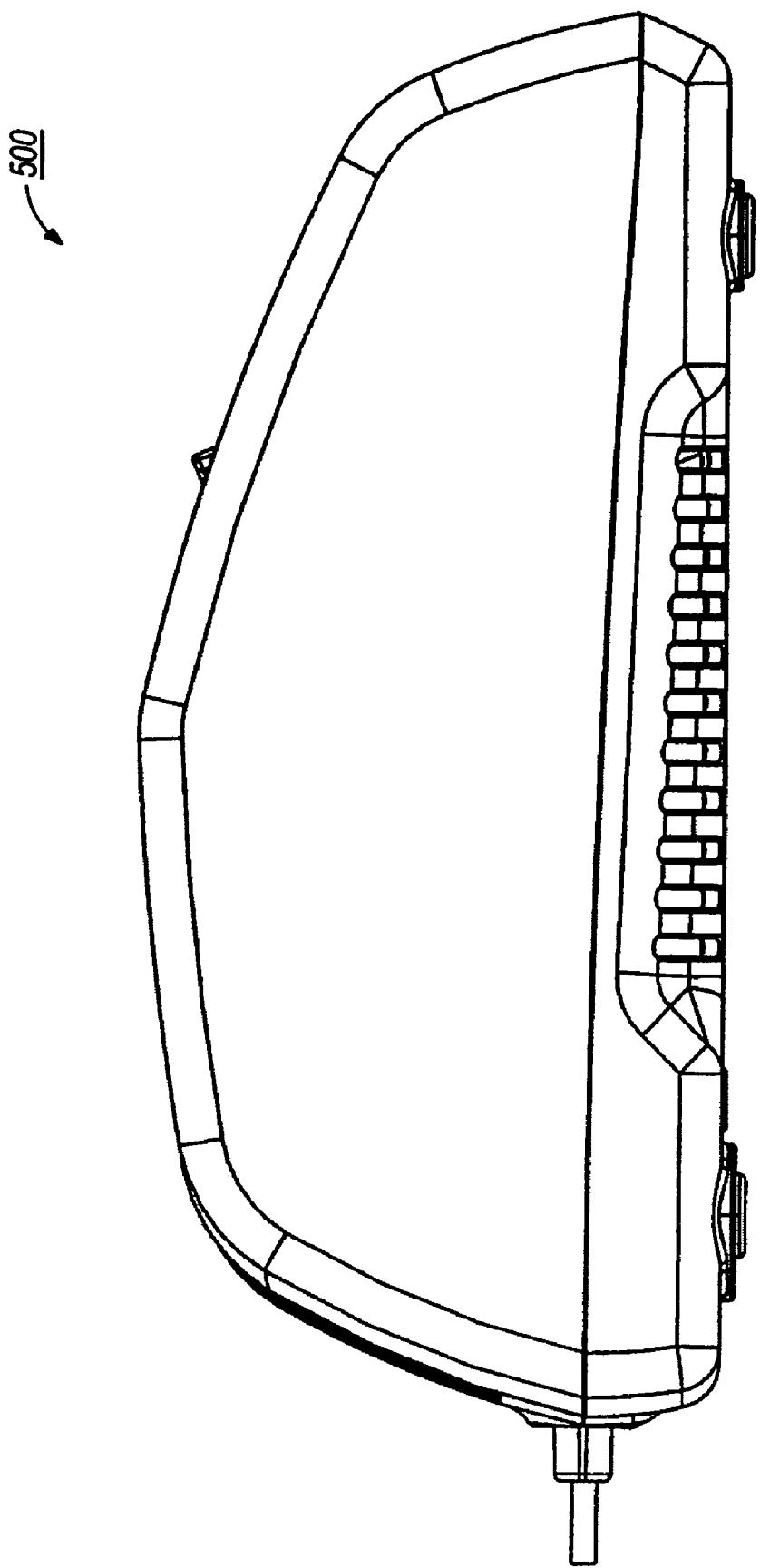
Figure 9E:
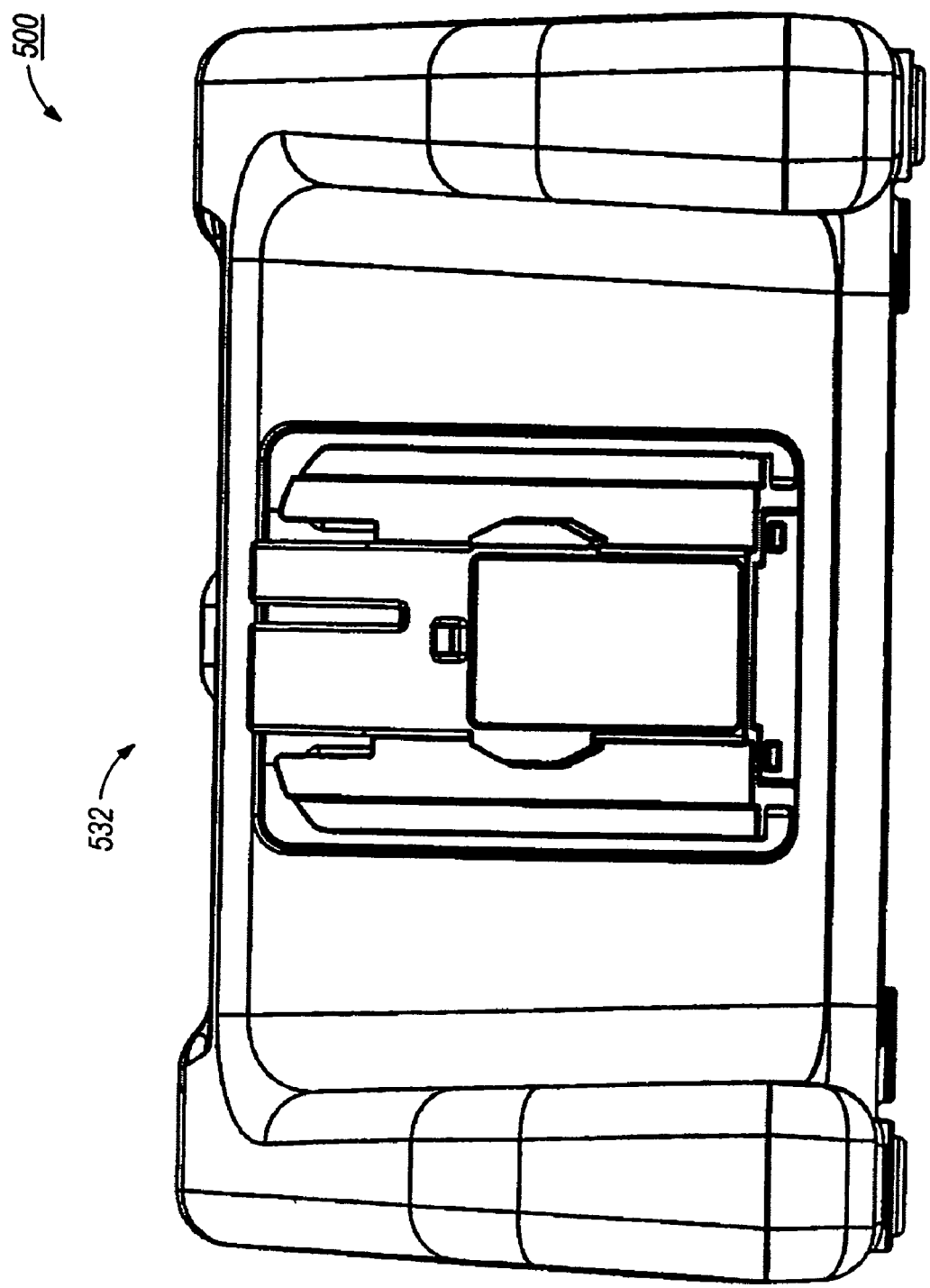
Figure 9F:
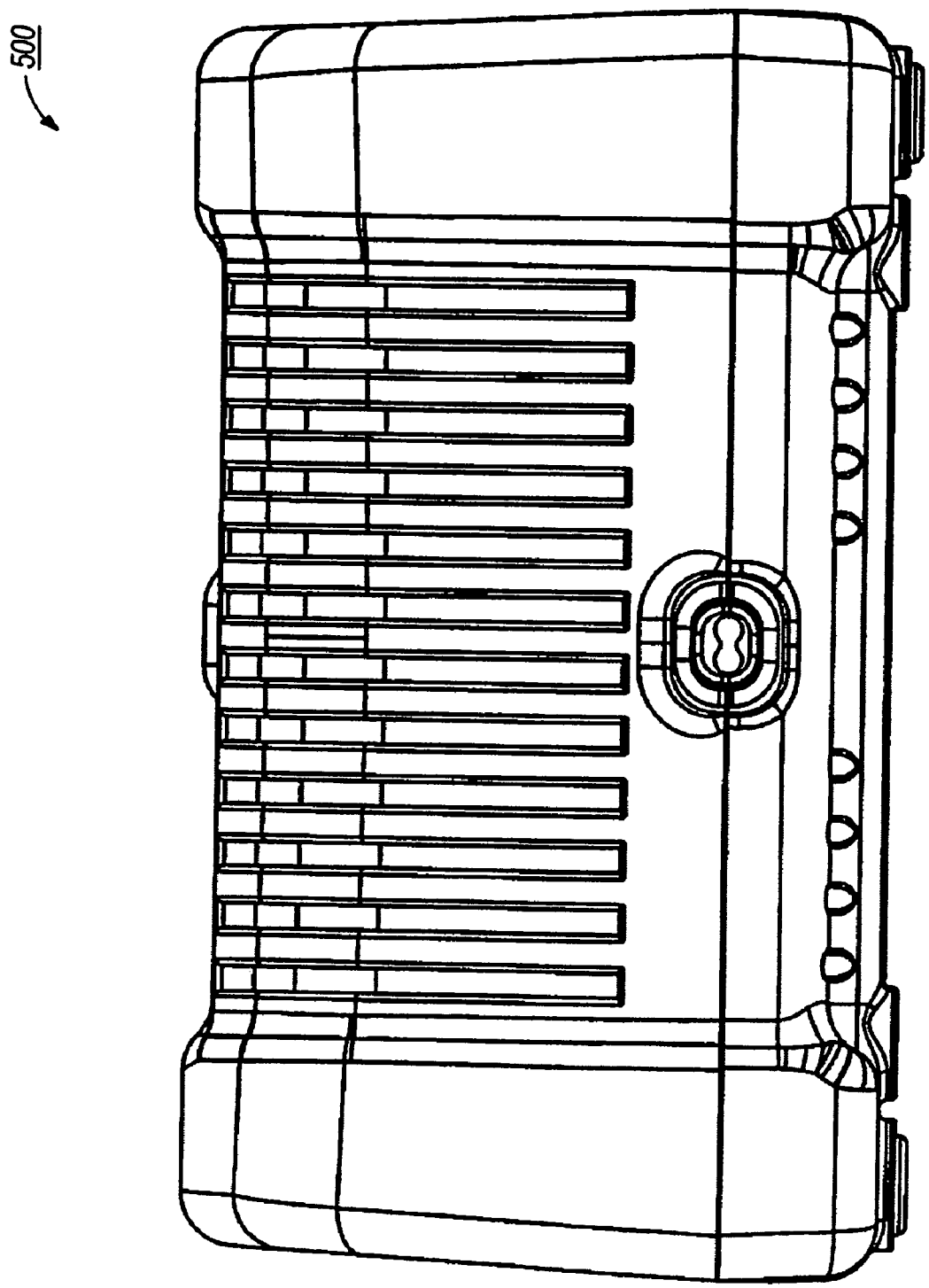
Figure 9G:
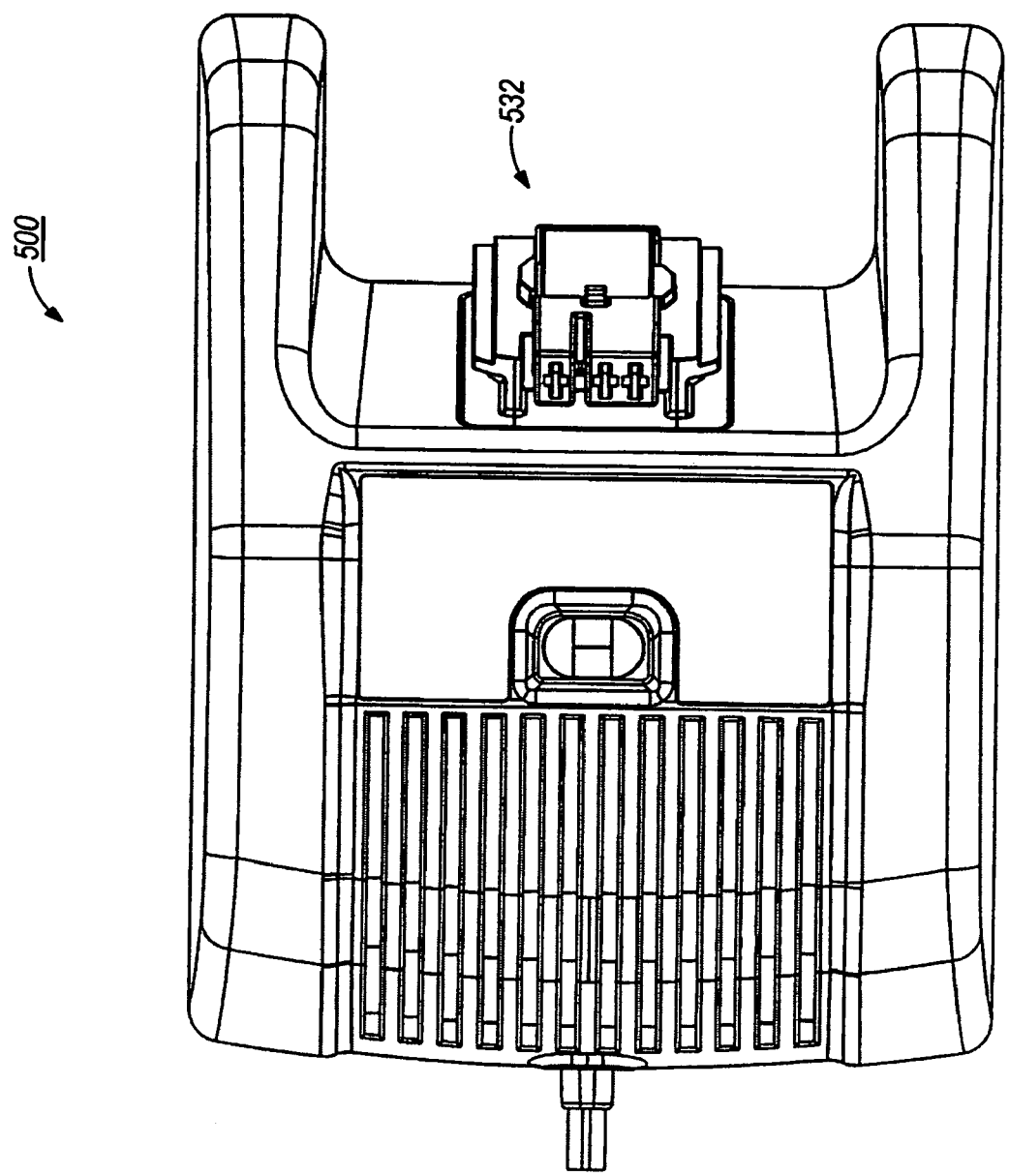
Figure 9H:
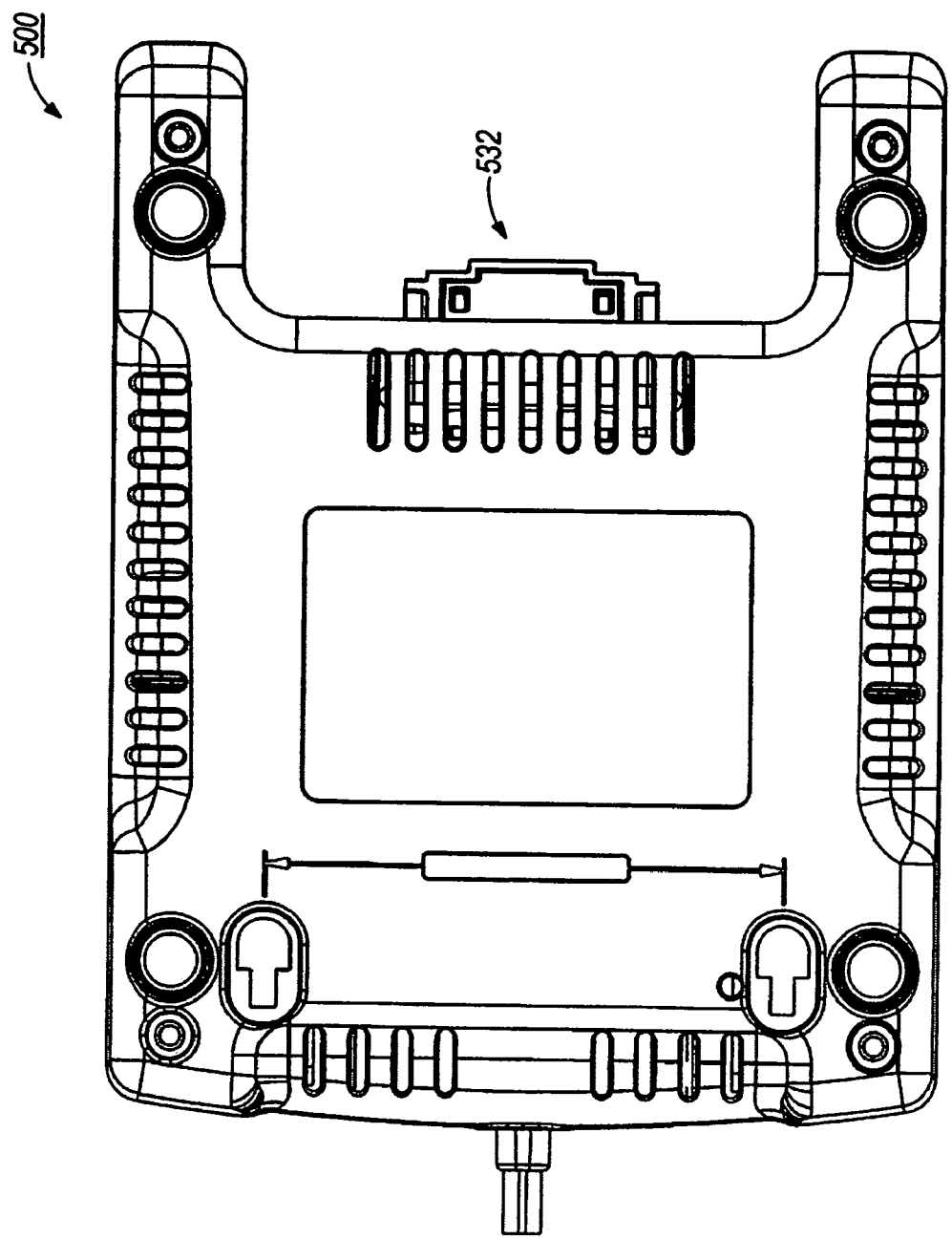
Figure 9I:
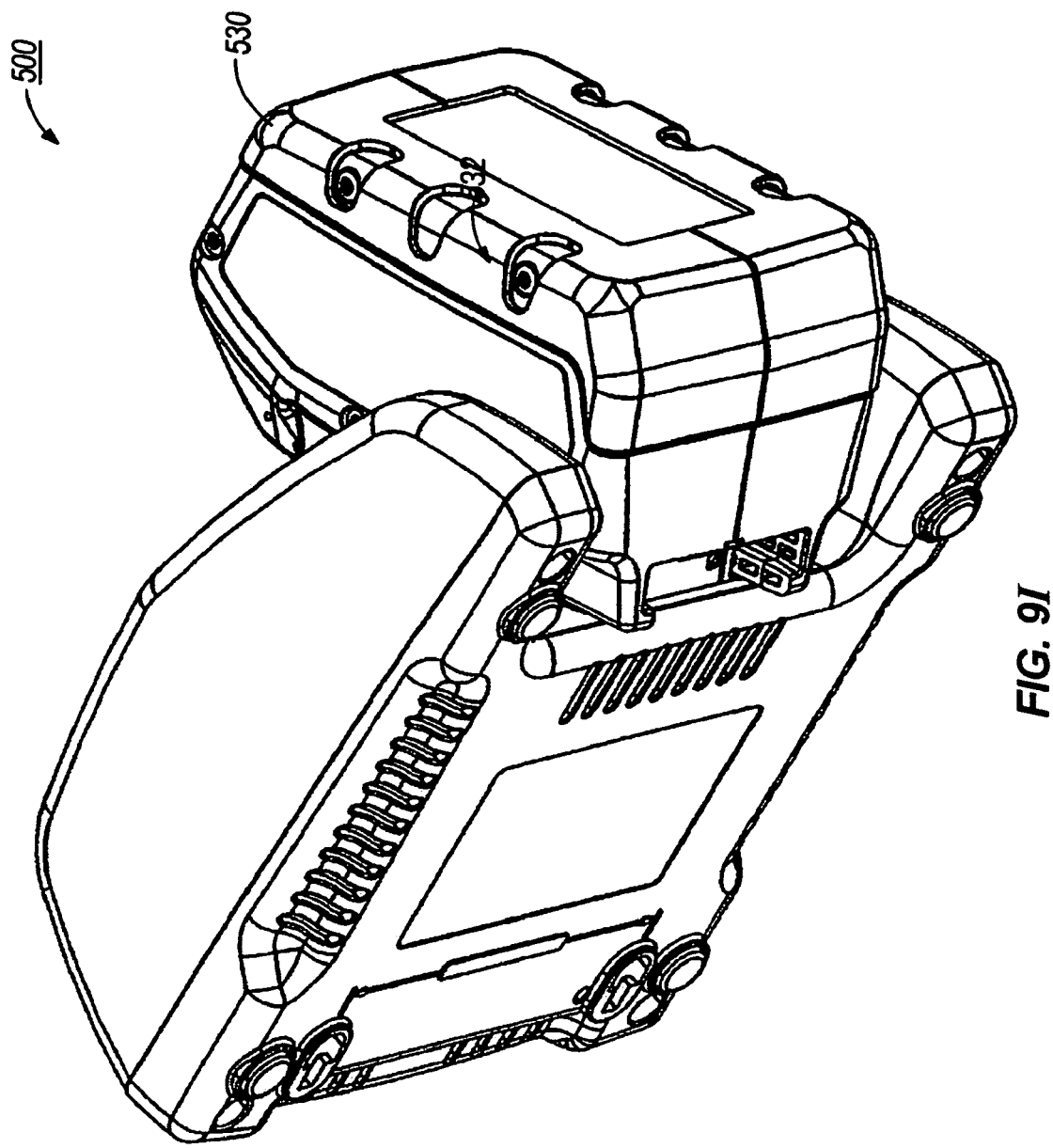
Figure 9J:
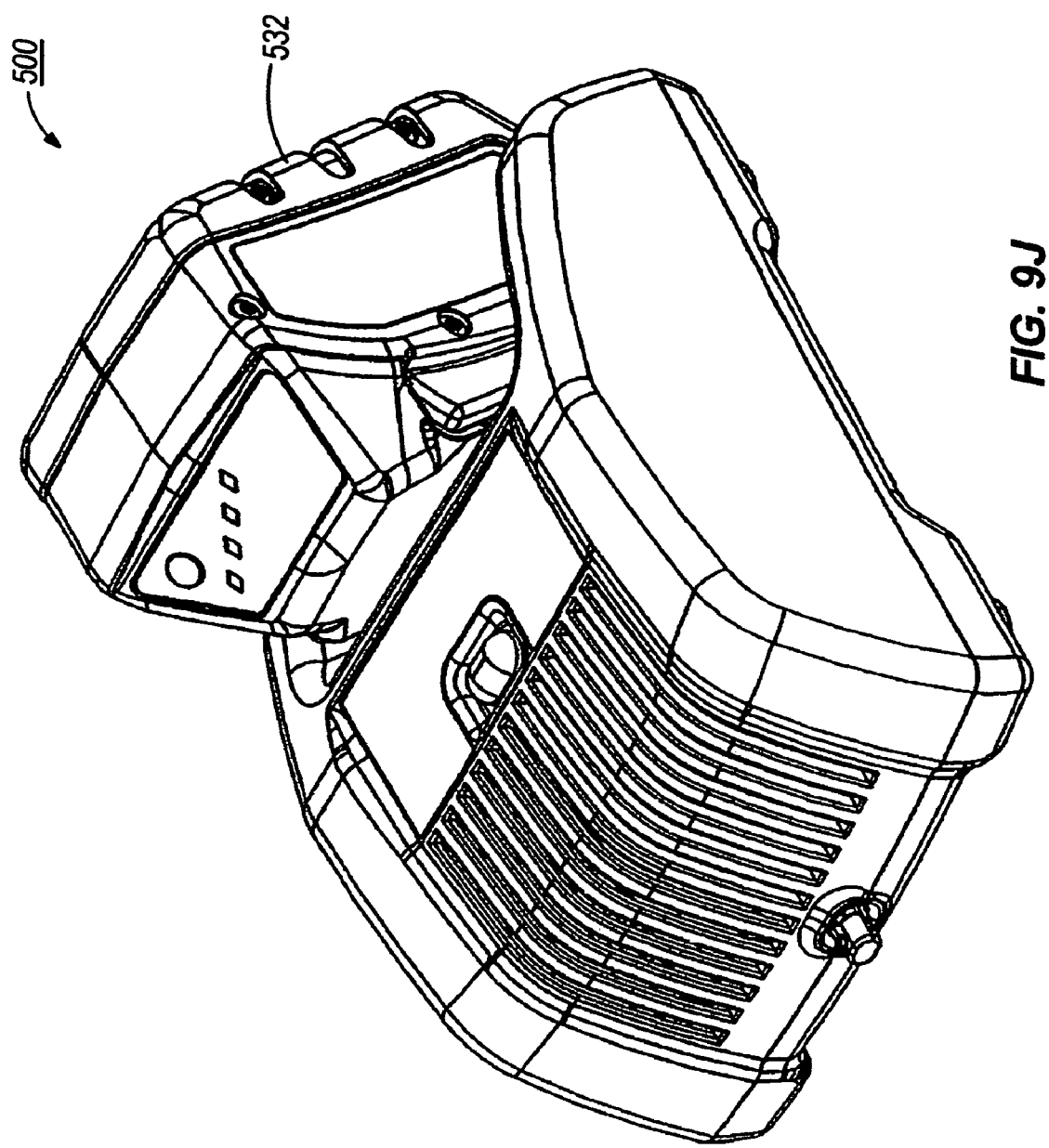
Figure 9K:
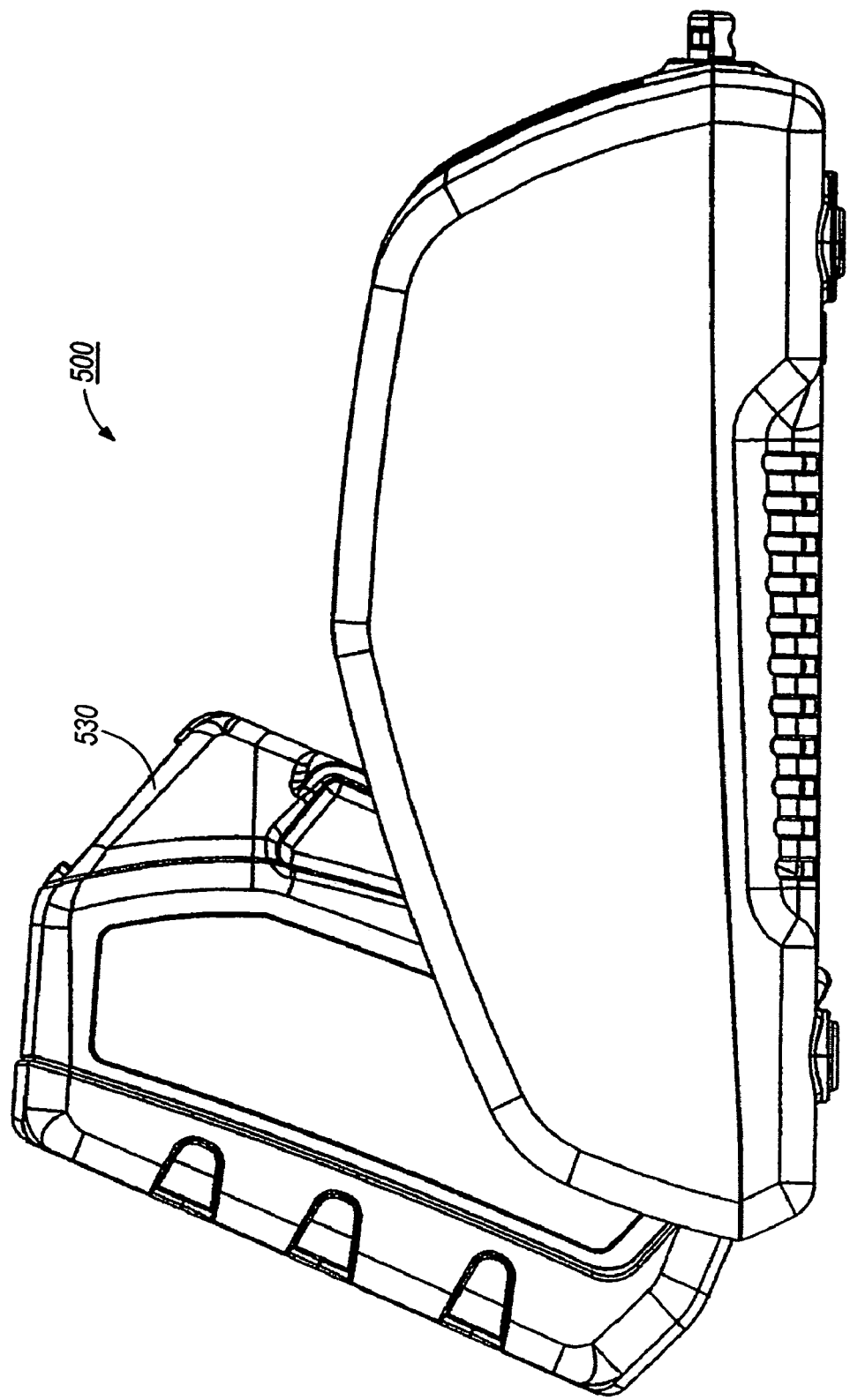
Figure 9L:
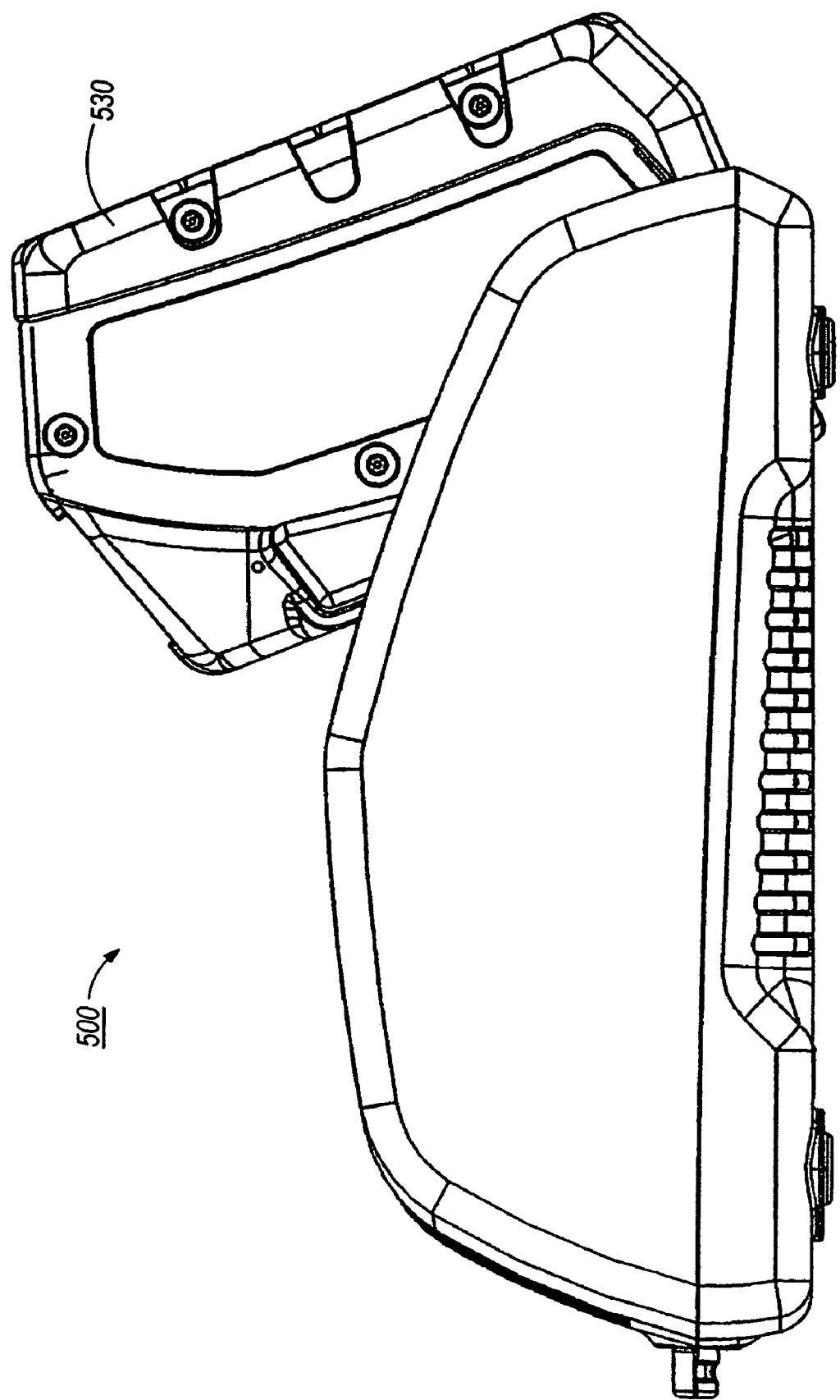
Figure 9M:
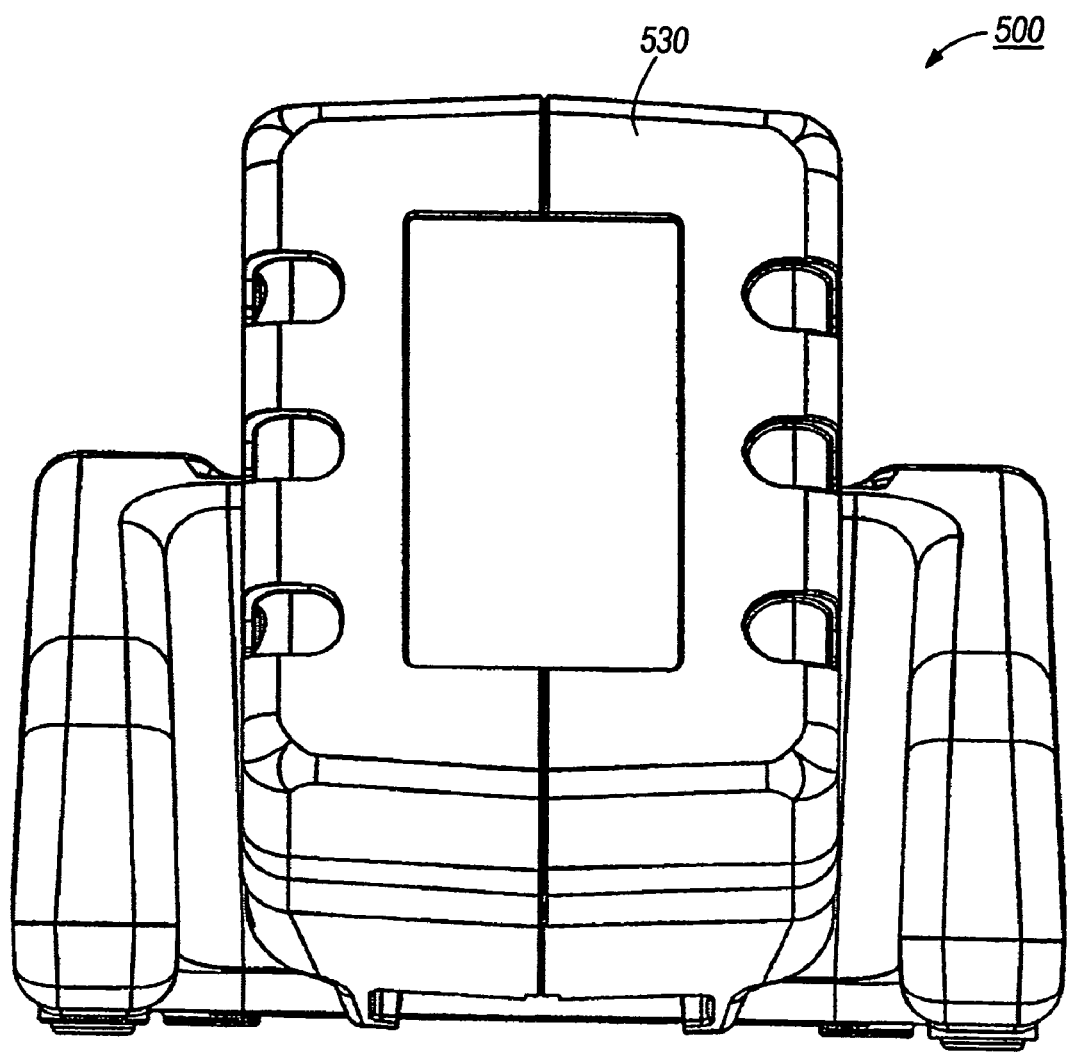
Figure 9N:
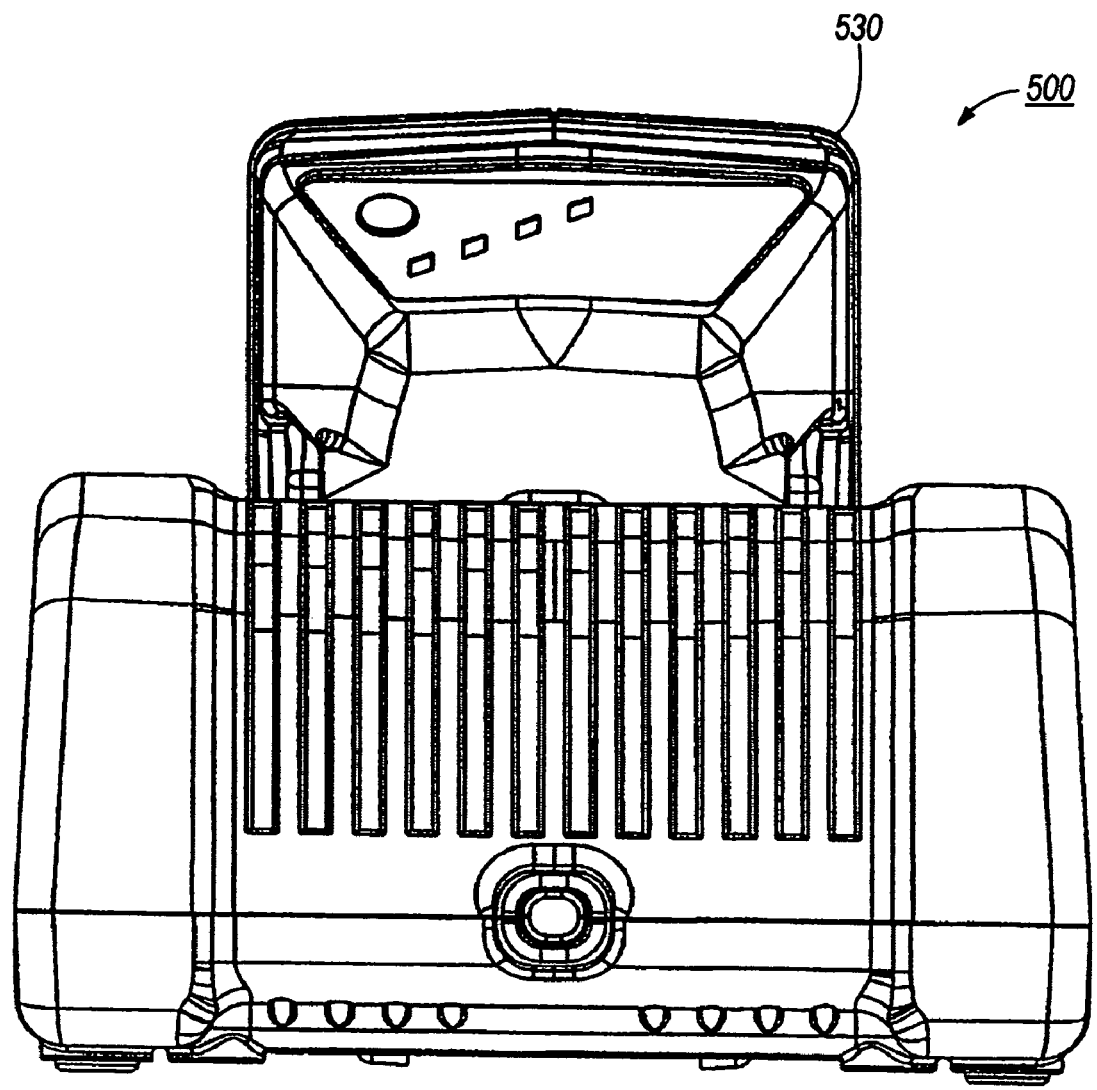
Figure 9O:
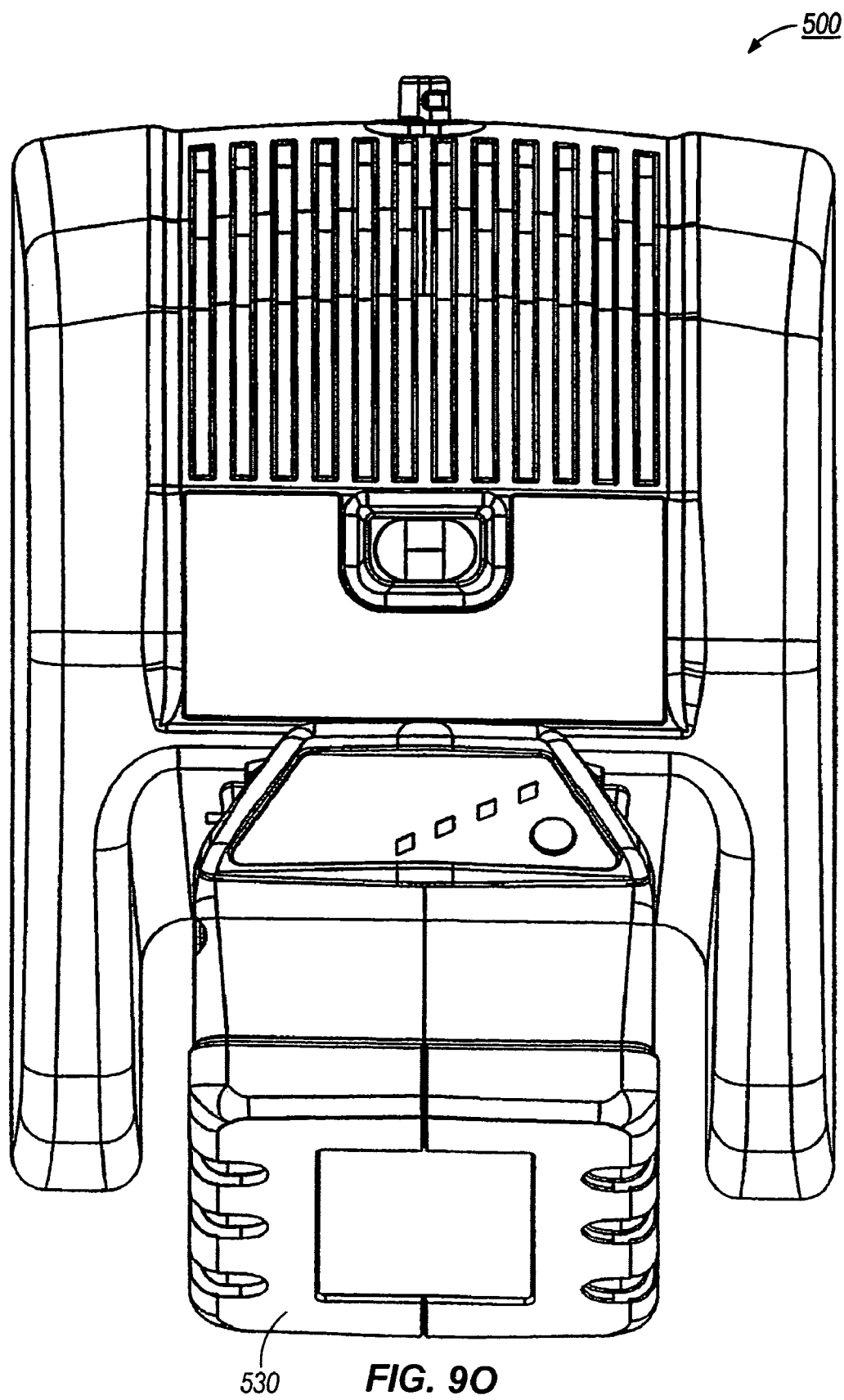
Figure 9P:
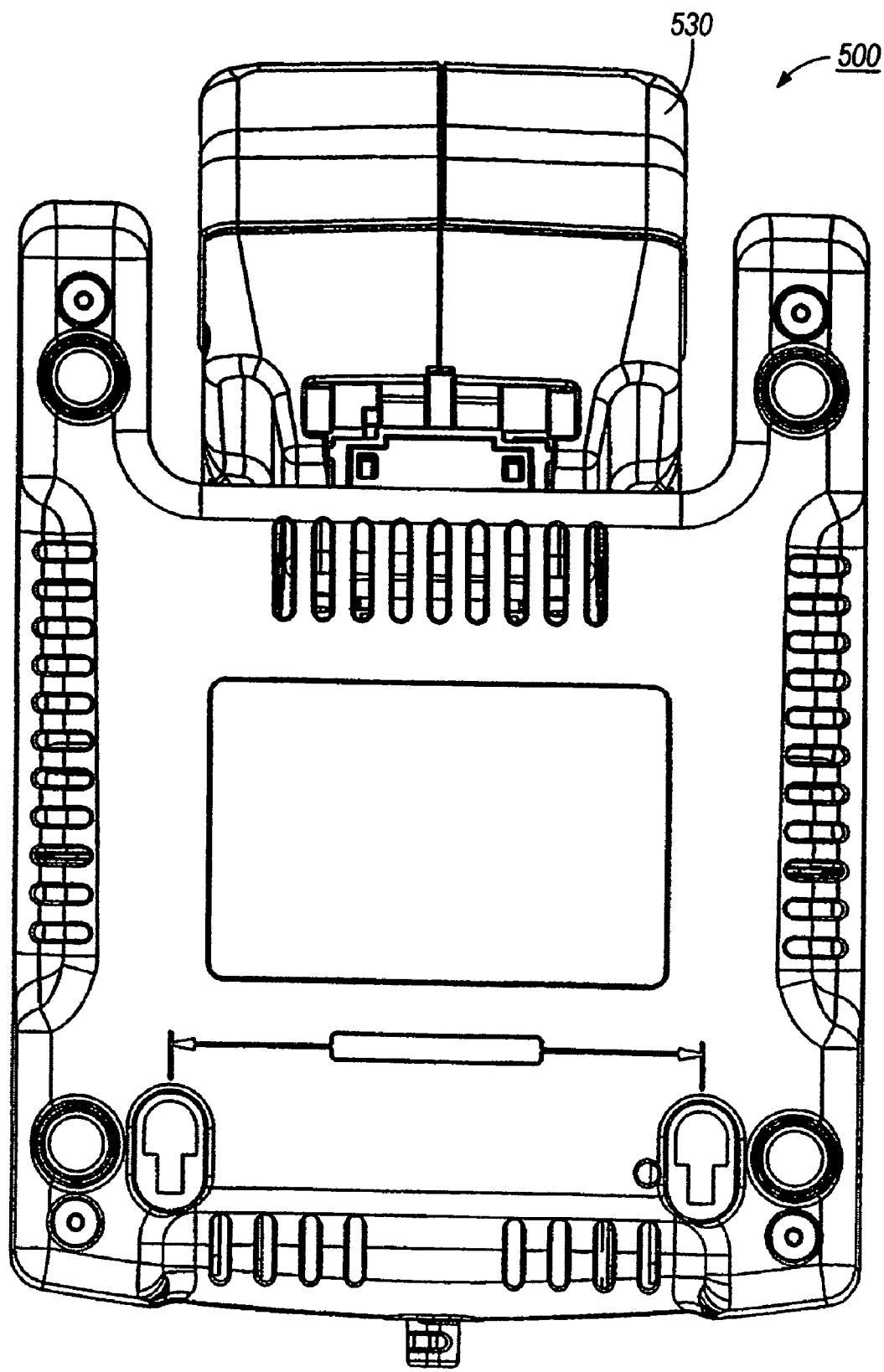

FIGS. 9A-9P illustrate an electrical component, such as, for example, a power tool or a battery charger 500, embodying one or more independent aspects of the invention. Common elements are identified by the same reference number in the "500" series.

The battery charger 500 may be similar to the battery charger described in co-pending U.S. patent application Ser. No. 10/719,680, filed Nov. 20, 2003, entitled METHOD AND SYSTEM OF BATTERY CHARGING, co-pending U.S. patent application Ser. No. 11/138,020, filed May 24, 2005, entitled METCHOD AND SYSTEM OF BATTERY CHARGING, and in co-pending U.S. patent application Ser. No. 60/624,435, filed on Nov. 2, 2004, entitled BATTERY CHARGER AND ASSEMBLY, the entire contents of all of which are hereby incorporated by reference.

Figure 10:
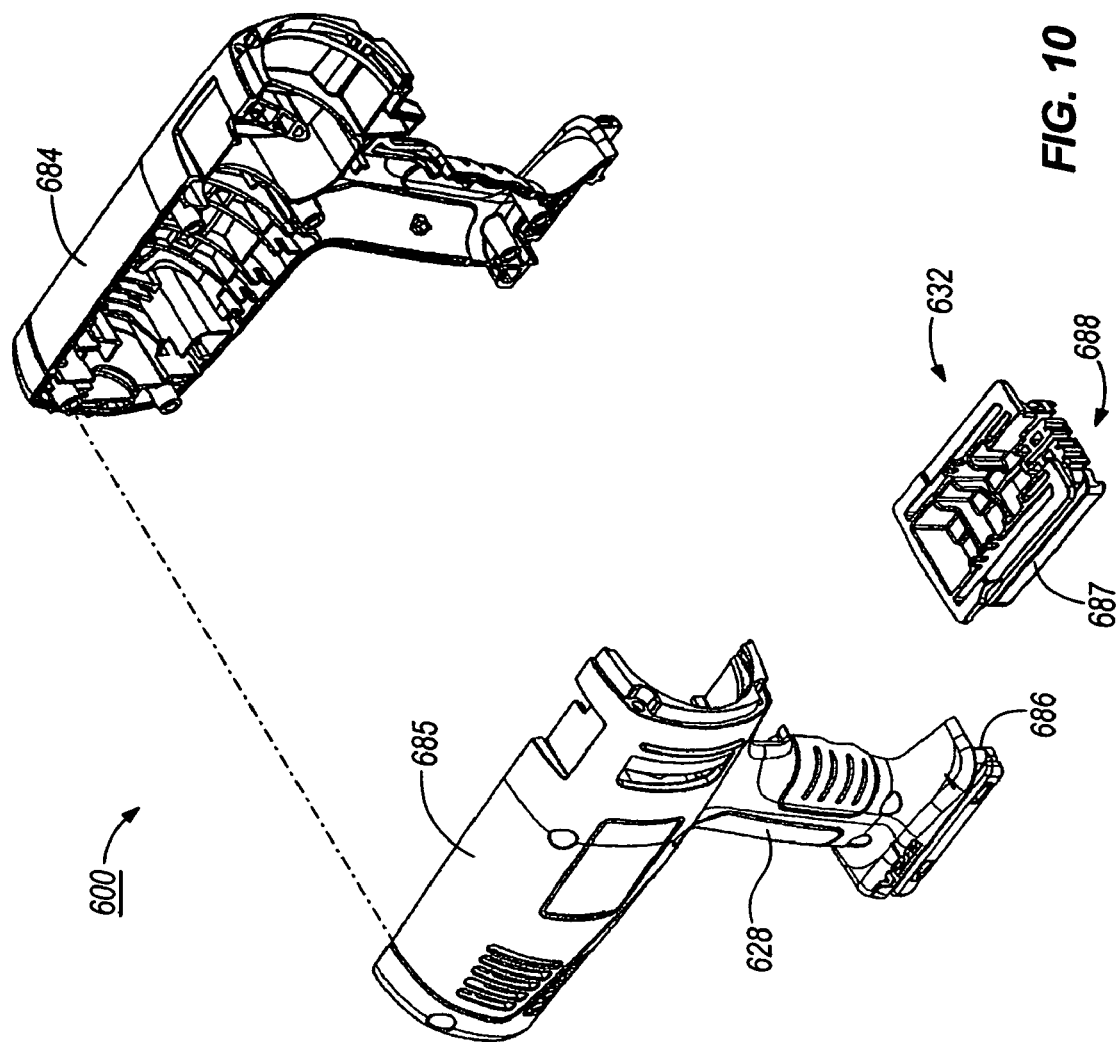
FIG. 10 is an exploded, perspective view of a portion of a power tool, such as, for example, an impact wrench.

FIG. 10 illustrates a power tool 600 including an arrangement of a housing 614 and a battery support portion 632. Common elements are identified by the same reference number in the "600" series.

In the illustrated construction and in some aspects, a portion of the housing 614 including the handle 628 is formed as a two-piece assembly. This assembly includes housing portions 684 and 685 which are secured together. As shown in FIG. 10, the housing portions 684 and 685 cooperate to define an opening 686, and the battery support portions 632 is supported in and projects through the opening 686.

In the illustrated construction and in some aspects, the connector block or battery support portion 632 provides a modular assembly for physically supporting the battery (not shown, but similar to the battery 230) on the housing 614 and for electrically connecting the battery to the motor (not shown, but similar to the motor 218). The battery support portion 632 includes structure 687 for physically supporting the battery. In the illustrated construction, the structure 687 includes rails and grooves which are complementary to and which cooperate with the rails and grooves on the battery.

The battery support portion 632 also includes structure 688 for electrically connecting the battery to the motor (not shown). In the illustrated construction, the structure 688 includes a terminal assembly which is complementary to the terminal assembly on the battery. The terminal assembly is electrically connected to the motor by an electrical circuit (not shown).

A portion of the battery support portion 632 engages a portion of housing 614 adjacent the periphery of the opening 686 to restrict movement of the battery support portion 632 outwardly through the opening 686. When the housing portions 684 and 685 are connected, the rearward portion of the battery support portion 632 is engaged to hold the battery support portion 632 in place relative to the housing 614. The housing portions 684 and 685 are connectable by suitable fasteners such as, for example, screws, and provide a compression retention of the battery support portion 632. The battery support portion 632 projects through the opening 686 defined by the cooperating housing portions 684 and 685 and is captured between the housing portions 684 and 685. In other constructions of power tools (as discussed below and as shown in FIGS. 11A-11B and 12-12C), the battery support portion 732 projects through an opening 786 in a side wall of the housing 714 and is captured between the housing portions 784 and 785.

To support the battery, the rails and grooves on the battery engage the structure 687 on the battery support portion 632. The rails on the battery are received in the grooves provided by the structure 687, and the rails on the structure 687 are received in the grooves on the battery. In this manner, the battery is physically supported on the battery support portion 632, and support provided by the housing 614 or handle 628 directly to the battery is not necessary.

As the battery is connected to the structure 687, the terminal assembly on the battery engages the terminal assembly of the battery support portion 632. In this manner, the battery is electrically connected to the electrical circuit and to the motor.

The arrangement of the battery support portion 632 as a modular assembly reduces manufacturing tolerances so that the structure 687 physically supporting the battery and the structure 688 for electrically connecting the battery provide improved support of the battery on the power tool 600. The battery is more easily connectable to and removable from the battery support portion 632, and, when the battery is supported, the battery support portion 632 and the battery maintain a tight alignment.

FIGS. 11A-11B and 12-12C illustrate a power tool 700 including an alternative arrangement of a housing 714 and a battery support portion 732. Common elements are identified by the same reference number in the "700" series.

Figure 11B:
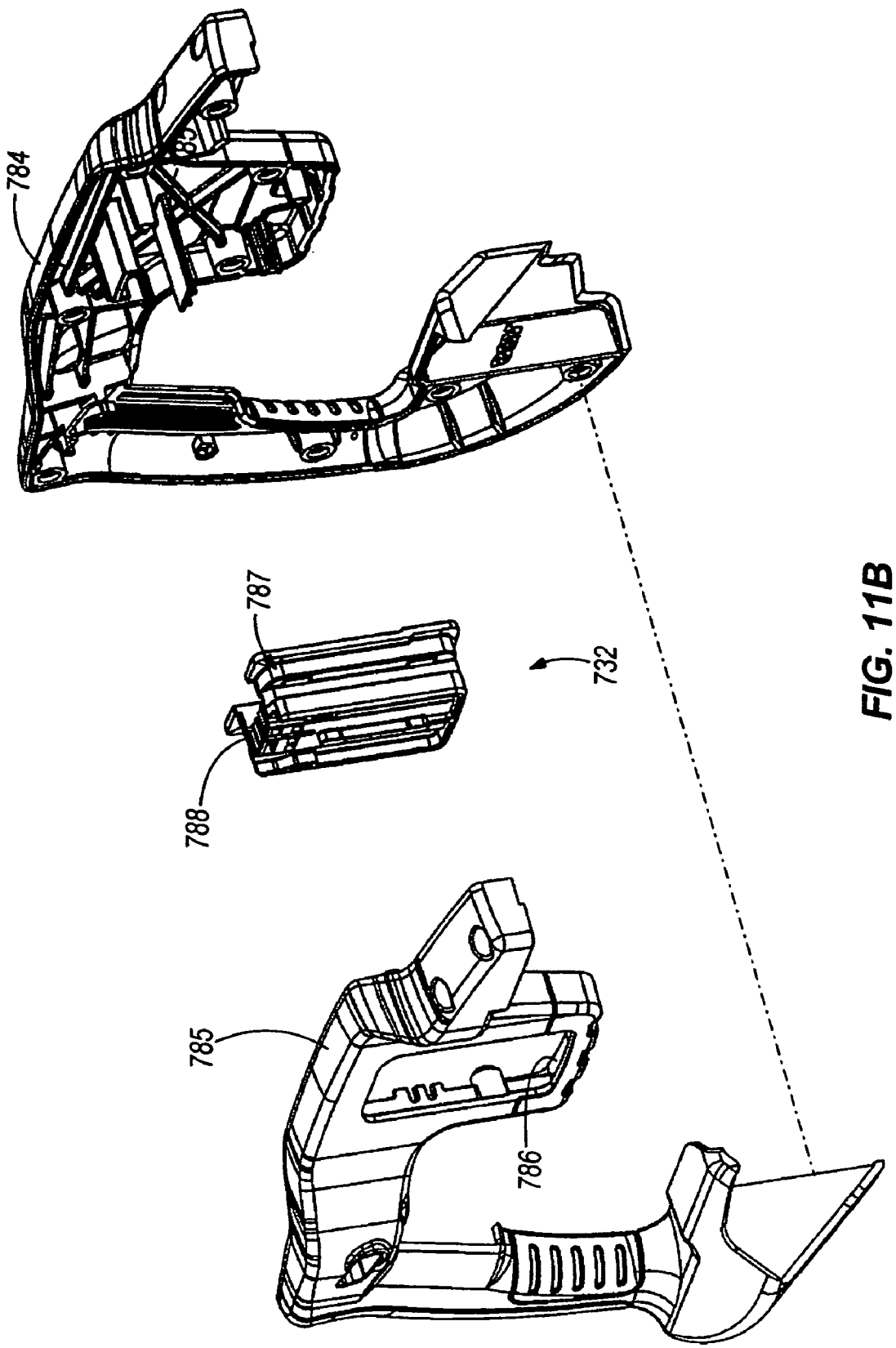
Figure 13A:
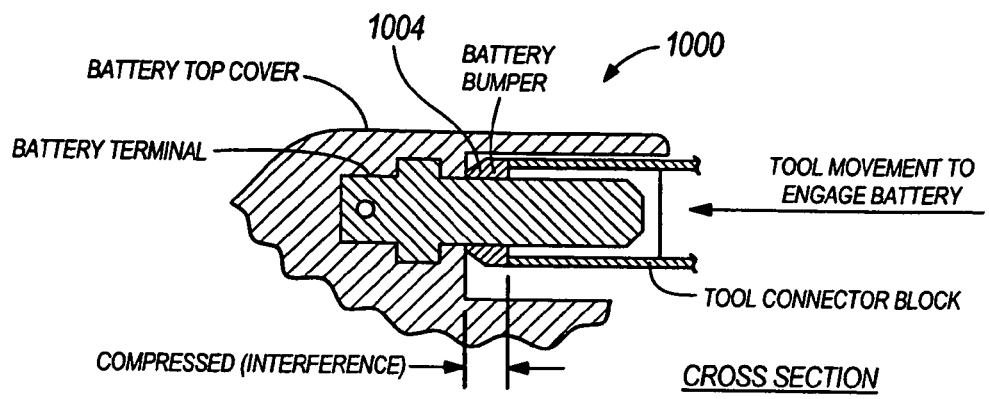
FIGS. 13A-13B are views of a portion of an electrical component, such as, for example, a power tool and a battery.
Figure 13B:
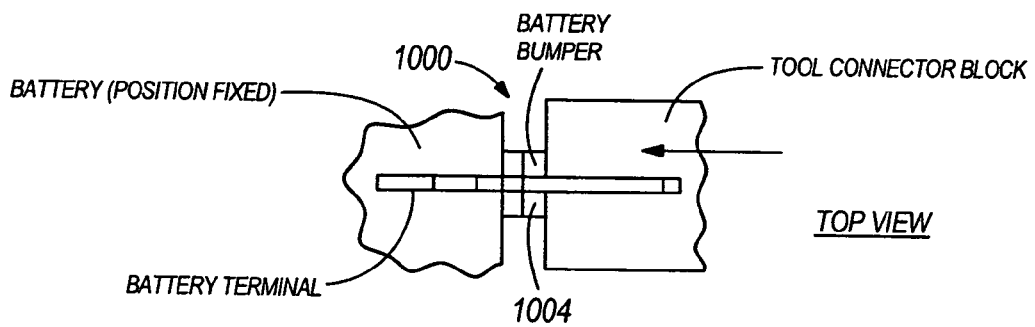
Figure 14A:
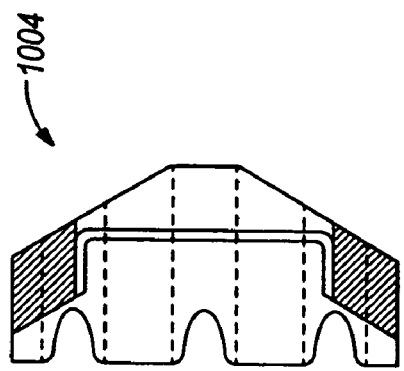
FIGS. 14-14C are views of a bumper.
Figure 14C:
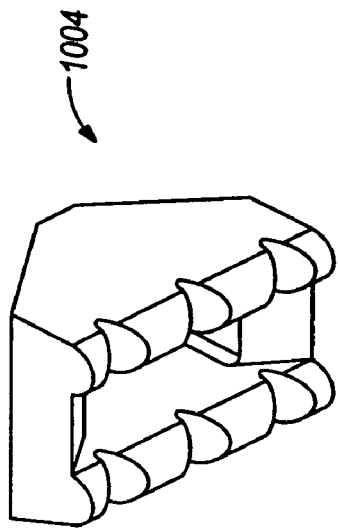
Figure 14:
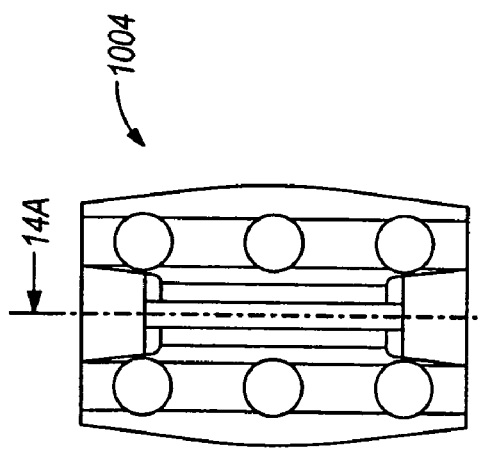
Figure 14B:
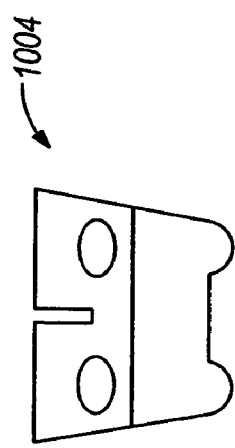
Figure 16C:
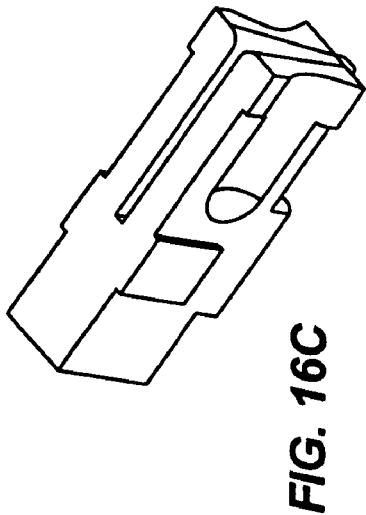
FIGS. 16-16C are views of a terminal clamp.
Figure 16A:
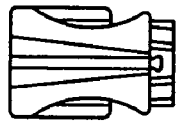
Figure 16B:
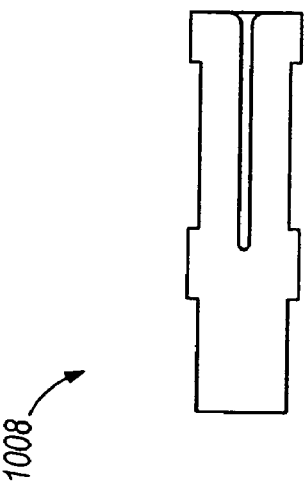
Figure 16:
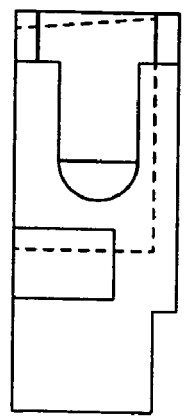

In the illustrated construction and some aspects a portion of the housing 714 including the handle 728 is formed as a two-piece assembly. This assembly includes housing portions 784 and 785 which are secured together. As shown in FIGS. 11A and 11B, the housing portion 785 defines an opening 786, and the battery support portion 732 projects through the opening 786.

In the illustrated construction and in some aspects, the connector block or battery support portion 732 provides a modular assembly for physically supporting the battery (not shown, but similar to the battery 430) on the housing 714 and for electrically connecting the battery to the motor (not shown, but similar to the motor 418). The battery support portion 732 includes structure 787 for physically supporting the battery. In the illustrated construction, the structure 787 includes rails and grooves which are complementary to and which cooperate with the rails and grooves on the battery. The battery support portion 732 also includes structure 788 for electrically connecting the battery to the motor. In the illustrated construction, the structure 788 includes a terminal assembly which is complementary to the terminal assembly on the battery. The terminal assembly is electrically connected to the motor by an electrical circuit (not shown).

A portion of the battery support portion 732 engaging a portion of the housing 785 adjacent the periphery of the opening 786 to restrict movement of the battery support portion 732 outwardly through the opening 786. As shown in FIGS. 12A-12C, when the housing portions 784 and 785 are connected, a portion of the housing portion 784 engages the rearward portion of the battery support portion 732 to sandwich the battery support portion 732 between the housing portions 784 and 785. The housing portions 784 and 785 are connected by suitable fasteners, such as, for example, screws, and provide a compression retention of the battery support portion 732.

The battery support portion 732 projects through an opening 786 in the side wall of the housing 714 and is captured between the housing portions 784 and 785. In other constructions of power tools (as discussed above and as shown in FIG. 10), the handle 628 has a joint to define an opening 686, and the battery support portion 632 is supported in the opening 686 between the handle halves.

To support the battery, the rails and grooves on the battery engage the structure 787 on the battery support portion 732.

The rails on the battery are received in the grooves provided by the structure 787, and the rails on the structure 787 are received in the grooves on the battery. In this manner, the battery is physically supported on the battery support portion 732, and support provided by the housing 714 or the handle 728 directly to the battery is not necessary.

As the battery is connected to the structure 787, the terminal assembly on the battery engages the terminal assembly of the battery support portion 732. In the manner, the battery is electrically connected to the electrical circuit and to the motor.

The arrangement of the battery support portion 732 as a modular assembly reduces manufacturing tolerances so that the structure 787 physically supporting the battery and the structure 788 for electrically connecting the battery provide improved support of the battery on the power tool 700. The battery is more easily connectable to and removable from the battery support portion 732, and, when the battery is supported, the battery support portion 732 and the battery maintain a tight alignment.

It should be understood that, in other constructions of the electrical components, the power tools 100, 200, 300, and 400 and the battery charger 500, a modular battery support portion, such as the battery support portion 632 or 732, may be provided.

In contrast, in other constructions (such as that shown in FIG. 2F), the structure 187 for physically supporting a battery is formed separately from the structure 188 for electrically connecting the battery circuit. These structures 187 and 188 are then connected to provide a battery support portion (such as the battery support portion 132) for the battery.

For example, the structure 187 for physically supporting the battery may be formed on the power tool housing 114 (e.g., on the handle 128). The structure 188 for electrically connecting the battery (e.g., the power tool terminal assembly 133) may be formed separately and may then be connected to the physical support structure 187 on the handle 128 (e.g., being sandwiched between the handle halves).

Manufacturing tolerances between the physical support structure 187 and the handle halves and between such structure and the electrically connecting structure 188 of the terminal assembly may cause a non-modular structures to be misaligned so that connection of the battery to the non-modular battery support portion and removal of the battery from such a battery support portion may be difficult. In other instances, these structures may be arranged so that the battery is loose when supported on such a battery support portion. In some aspects and in some constructions, the modular battery support portion 632 or 732 may alleviate such conditions.

In some constructions, the configuration of the electrical component and the battery may be such that there is some unwanted movement (e.g., play or rattle) between the electrical component and the battery when the battery is installed. This unwanted movement may be along and/or transverse to the attachment axis. For reciprocating power tools, such as, for example, a reciprocating saw, a rotary hammer, a hammer-drill, unwanted movement along the axis of reciprocation may be increased, especially if the axis of reciprocation is parallel to the attachment axis of the battery. Such unwanted movement may allow movement between the male and female terminals during use which may cause fretting corrosion and excessive wear. In some aspects and in some constructions, structure 1000 is provided to eliminate unwanted movement between the electrical component and the battery.

As shown in FIGS. 13A-13B and 14-14C, such structure 1000 may be in the form of a flexible or "soft" bumper 1004 between the connector block for the electrical component (e.g., the battery support portion of the power tool) and the terminal block of the battery. This bumper 1004 occupies the clearance between the electrical component connector block and the battery terminal block. The bumper 1004 may be mounted to a terminal on the electrical component or the battery. In the illustrated construction, the bumper 1004 is mounted on the central terminal on the battery. The bumper 1004 may be formed of an elastomeric materials, such as, for example, Santoprene.

Once the battery and the electrical component are assembled, the bumper 1004 is compressed. The compressed bumper 1004 fills any horizontal clearance between the electrical component and the battery, eliminating any residual movement between the battery and the electrical component once assembled.

In other constructions, as shown in FIGS. 15A-15B and 16-16C, the structure 1000 may be provided by a terminal clamp 1008 which fills the volume of both center terminal positions in the electrical component connector block. The clamp 1008 may be molded with a slot in its center which is intended to accept the male terminal from the battery. An interference fit between the clamp 1008 and the battery terminal restricts movement between the battery and the electrical component. A silicone or resilient material allows this interference to clamp the male terminal. The clamp 1008 may be formed of an elastomeric material, such as, for example, Santoprene.

Figure 17A:
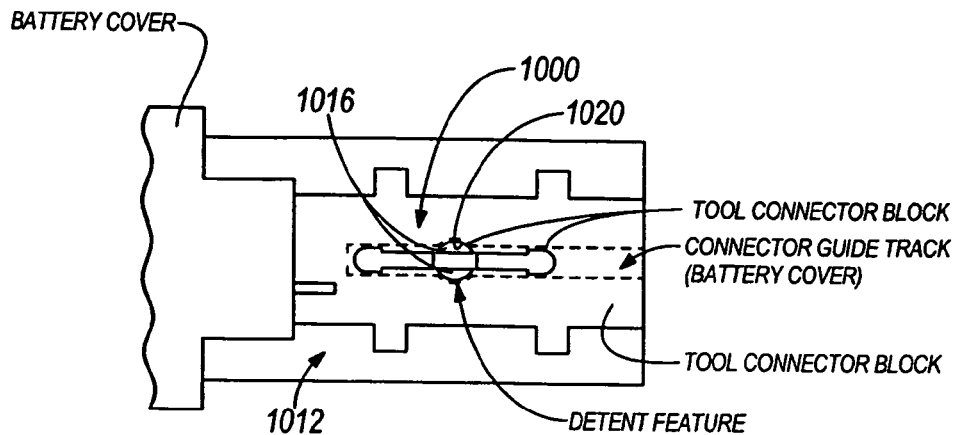
FIGS. 17A-17B are views of a portion of an electrical component, such as, for Example, a power tool, and a battery.
Figure 17B:
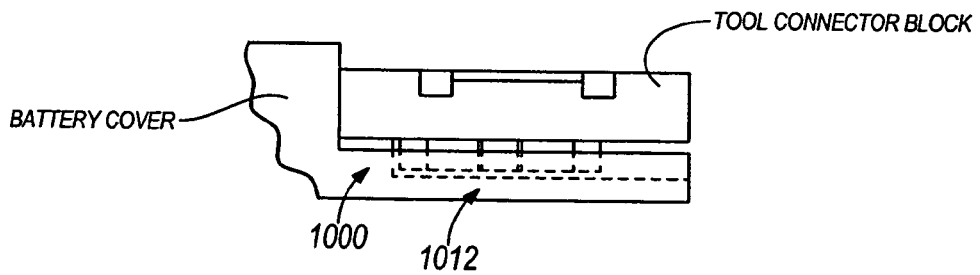

In other constructions, as shown in FIGS. 17A-17B, the structure 1000 may include a detent arrangement 1012. In such constructions, the detent arrangement 1012 includes two cantilever half round tabs 1016 integral with the electrical component's connector block. These tabs 1016 engage recesses 1020 located on the battery's top center cover when the battery is assembled on to the tool. With the battery fully assembled to the electrical component, the detent arrangement 1012 removes movement between the battery and the electrical component.

Figure 18A:
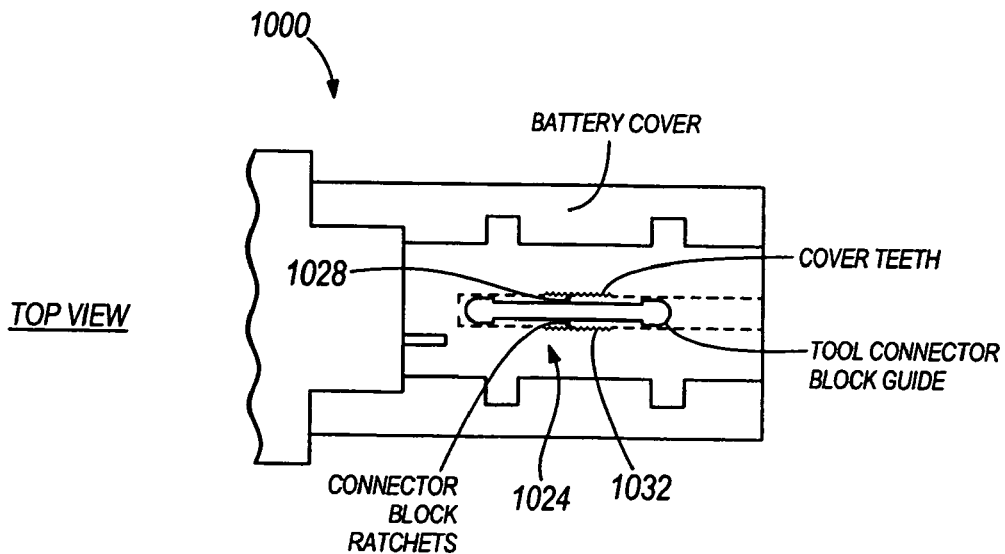
FIGS. 18A-18C are views of a portion of an electrical component, such as, for example, a power tool, and a battery.
Figure 18B:
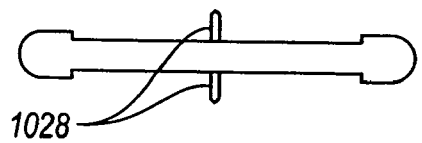
Figure 18C:
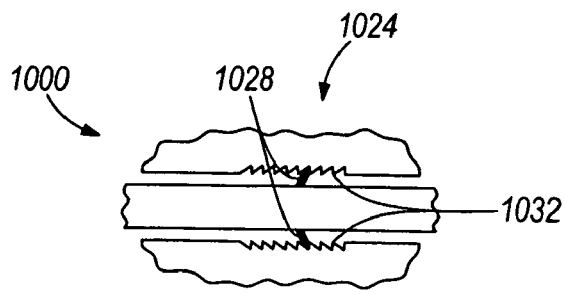
Figure 20A:
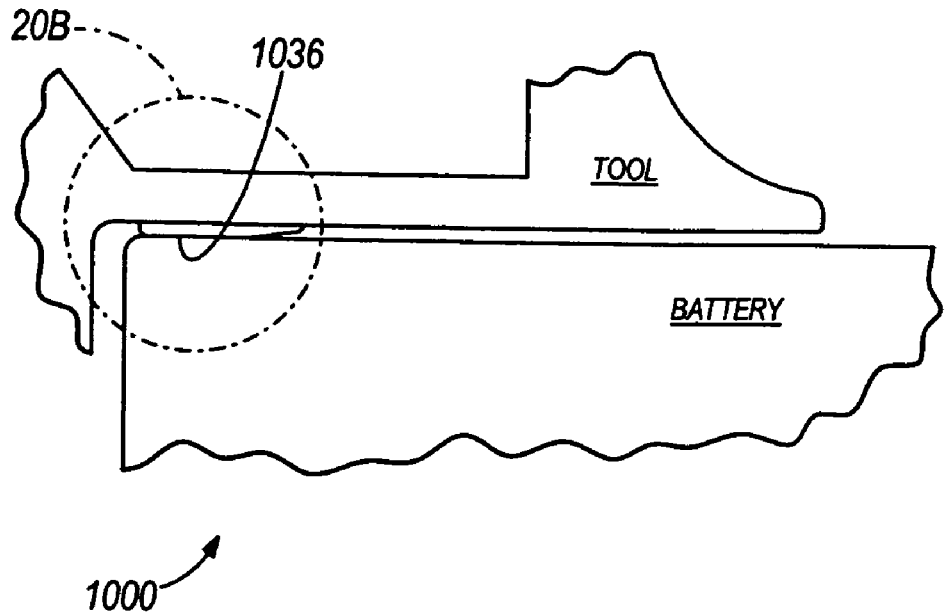
FIGS. 20A and 20B are side views of a portion of a power tool and a battery.
Figure 20B:
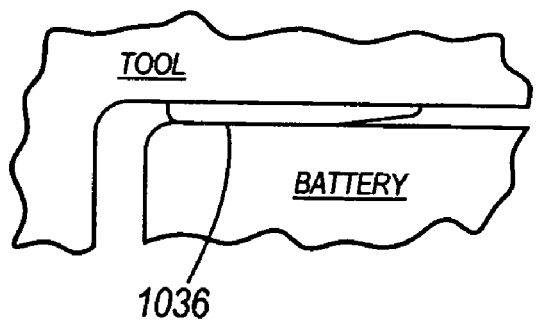

In other constructions, as shown in FIGS. 18A-18C, the structure 1000 may include a ratchet arrangement 1024. In such constructions, ratcheting contact points 1028 which are integral to the electrical component connector block act as lever arms to provide an interference fit to the battery's top center cover. Near the end of the assembly of the battery onto the electrical component, the ratchets 1028 engage teeth or detents 1032 on the battery's top center cover. When the battery if fully connected to the electrical component, the lever arms or tabs 1028 wedge the battery toward the electrical component, and this action removes movement between the battery and the electrical component. When removing the battery the lever arms or tabs 1028 will ratchet over center to allow the battery to be removed. The force to move the ratchet 1028 over center is greater than the force to install the battery or to fully remove the battery after disengagement is started.

In other constructions, as shown in FIGS. 19-19A and 20A-20B, for example, on a reciprocating saw (similar to that shown in FIGS. 7A-7G, the structure 1000 may include ramps 1036 formed on one of the electrical component and the battery. In such constructions, the molded ramps 1036 on the electrical component engage the battery during the last portion of installation travel (e.g., the approximately ½" of travel). In such constructions, this ramp feature 1036 may be located on top of the groove or "track" in which the rail on the battery is engaged. With the battery fully connected to the electrical component, movement between the battery and the electrical component is restricted along all axes, and rotation about these axes is restricted.

Figure 21:
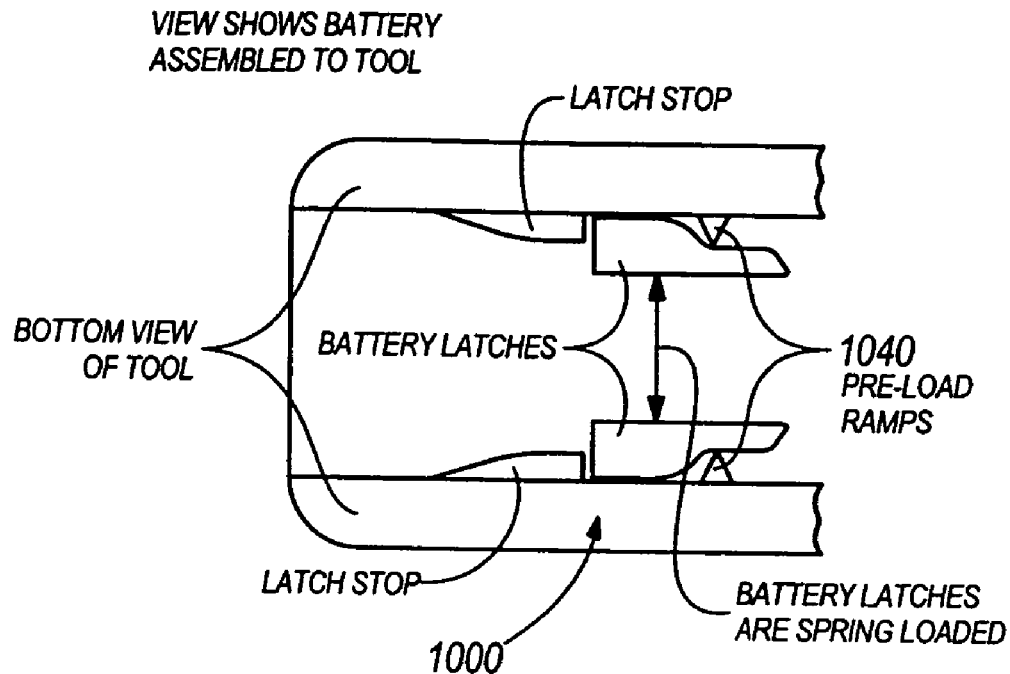
FIG. 21 is a top view of a portion of an electrical component, such as, for example, a power tool, and a battery.

In other constructions, as shown in FIG. 21, the structure 1000 includes pre-load ramps 1040. In such constructions, when the battery is connected to the electrical component, the latches on the battery are located between the pre-load ramps 1040 and the latch face. The latch face restricts the battery from disengaging from the electrical component. The pre-load ramps 1040 pre-load the battery against the latch face, and the battery is locked in one position along the attachment axis. In other words, with the battery assembled to the electrical component, the latches on the battery are located between the pre-load ramps 1040 and the latch stop. The latch stop constrains the battery from separating from the electrical component. The pre-load ramp 1040 constrains the battery from engaging further onto the electrical component. Essentially, the battery is locked in one position.

Figure 22:
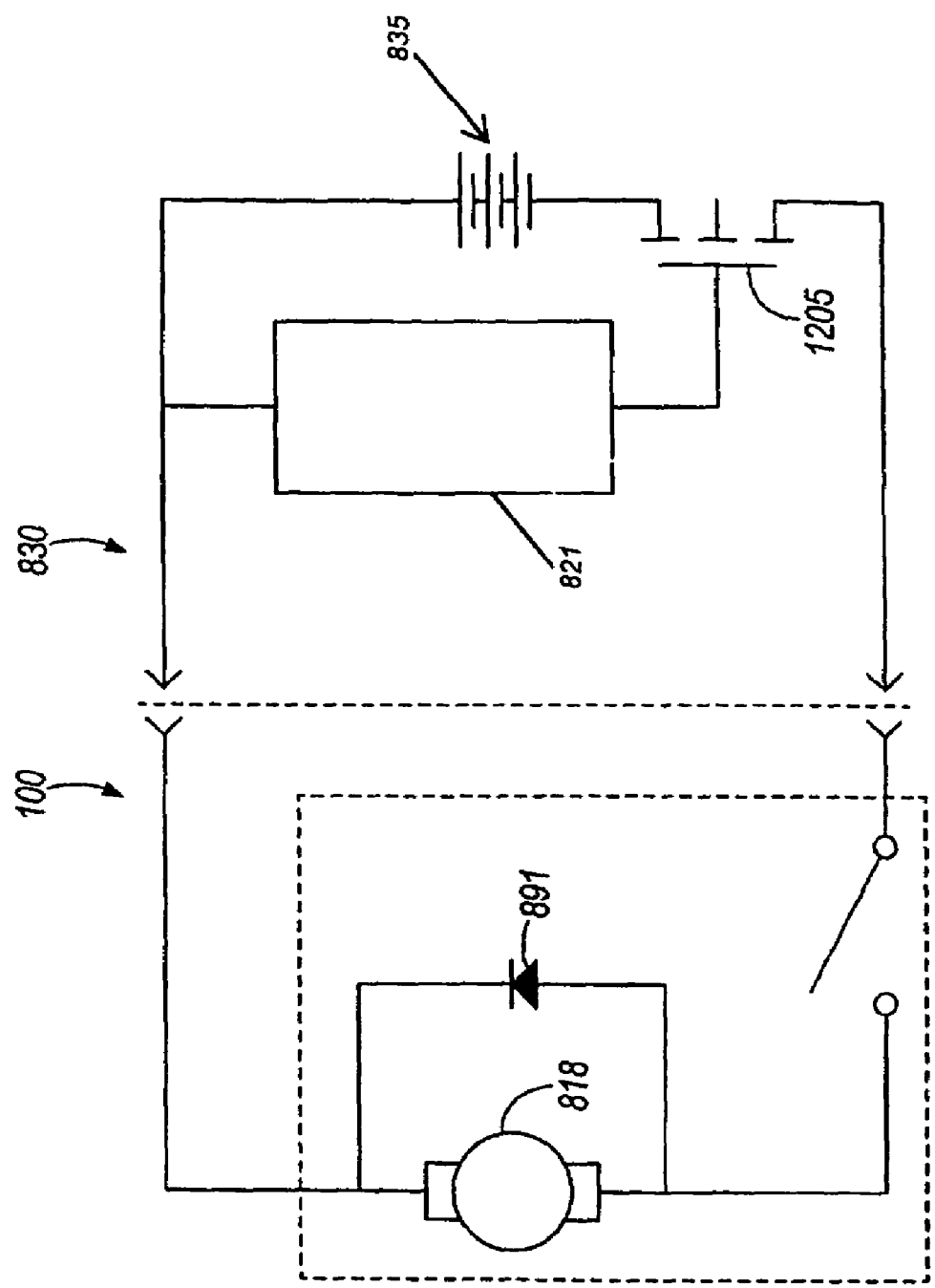
FIG. 22 is a schematic diagram of a portion of a battery electrically connected to a portion of an electrical circuit for a power tool.

FIG. 22 illustrates a portion of an electrical circuit 890 for a power tool. Common elements are identified by the same reference number in the "800" series.

As described in U.S. patent application Ser. Nos. 10/720,027 and 11/138,070, discussed above, the battery pack 830 includes a switch, such as FET 1205. The FET 1205 includes an ON state and an OFF state. When the FET 1205 is in the ON state, the FET 1205 allows the battery pack 830 to supply discharge current from one or more battery cells 835 to the power tool. When the FET 1205 is in the OFF state, the FET 1205 interrupts the discharge current and prohibits the battery pack 230 from supplying discharge current from the battery cells 835 to the power tool. In some constructions and in some aspects, the battery pack 830 may operate in a mode in which the FET 1205 is switched on and off by controller 821. When the battery pack 830 goes into this "fetting" mode, the FET 1205 in the battery pack 830 turns the motor 818 on and off very rapidly.

In some instances, back emf ("electro-motive force") can be generated by the motor 818 when the FET 1205 is operating in the "fetting" mode or even when the FET 1205 is switched from an ON state to an OFF state. In these instances, back emf can produce an influx of current traveling in a direction opposite to that of the discharge current being supplied from the battery pack 830.

To protect the FET 1205 and other electronics in the battery pack 830 from back emf generated by the motor 818, a protection device, such as a free-wheeling diode 891, for example, is provided. The protection device, i.e. the free-wheeling diode 891, allows current produced from back emf to be discharged through the device rather than through the FET 1205 in the battery pack 830 or any additional electronics.

For power tools that include a speed control circuit, such a free-wheeling diode may already be included in the speed control circuit and can already serve as the protection device. For on/off power tools, such as, for example, a wood-cutting circular saw 100, a metal-cutting saw, an impact wrench 200, a grinder (not shown), a sander (not shown), etc., the tool does not include a free-wheeling diode.

The free-wheeling diode 891 can be included in the power tool 100 or in the battery 830. In some constructions and in some aspects, it is more economical to include the protection device, such as the free-wheeling diode 891, in the on/off power tool (such as the circular saw 100) rather than including the diode 891 in the battery pack 830, since many cordless power tools have a speed control circuit (including a free-wheeling diode) and such a diode would be redundant when the battery pack 830 is used with a speed control power tool.

Figure 23:
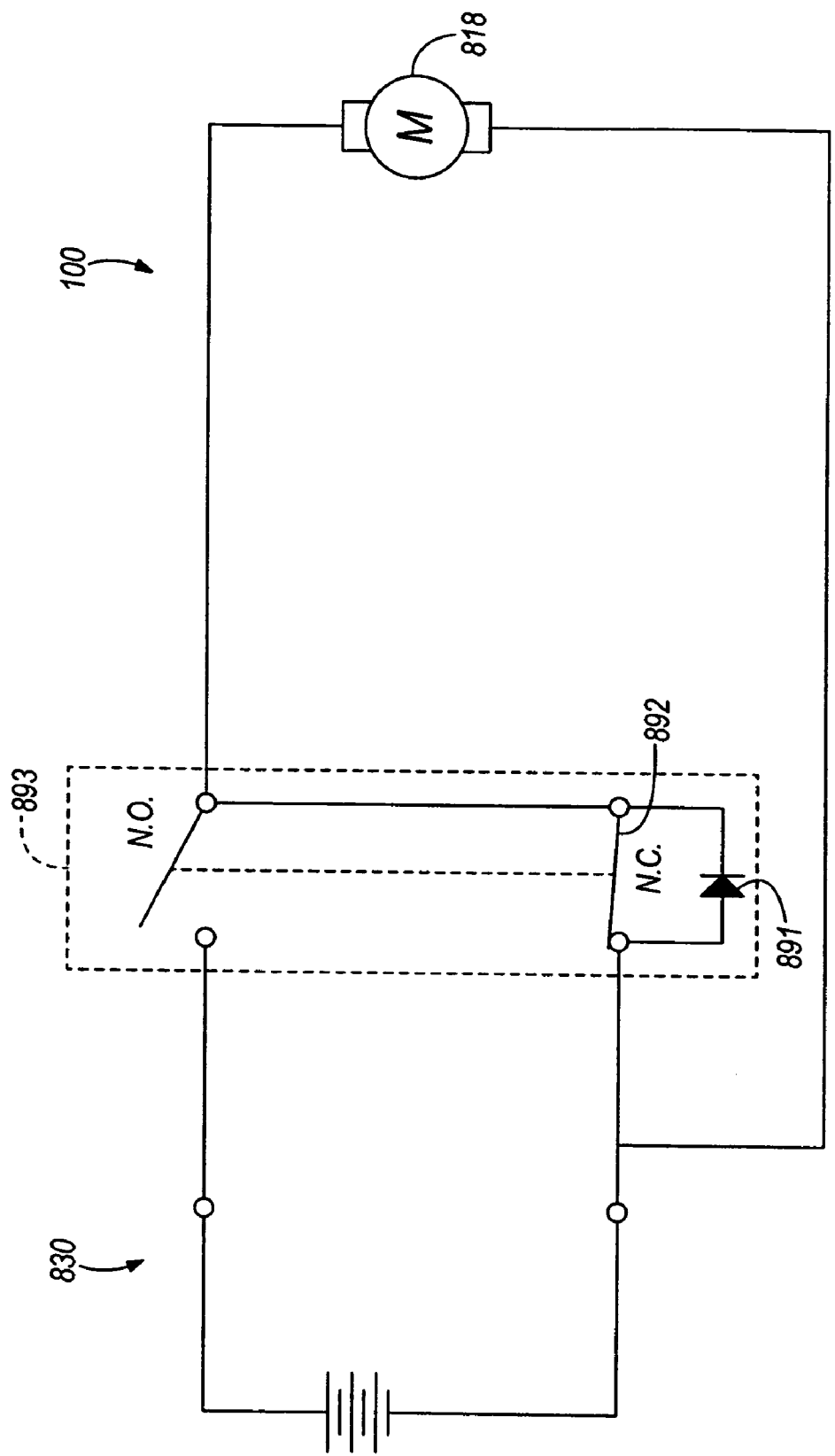
FIG. 23 is another schematic diagram of a portion of a battery electrically connected to a portion of an electrical circuit for a power tool.
Figure 24:
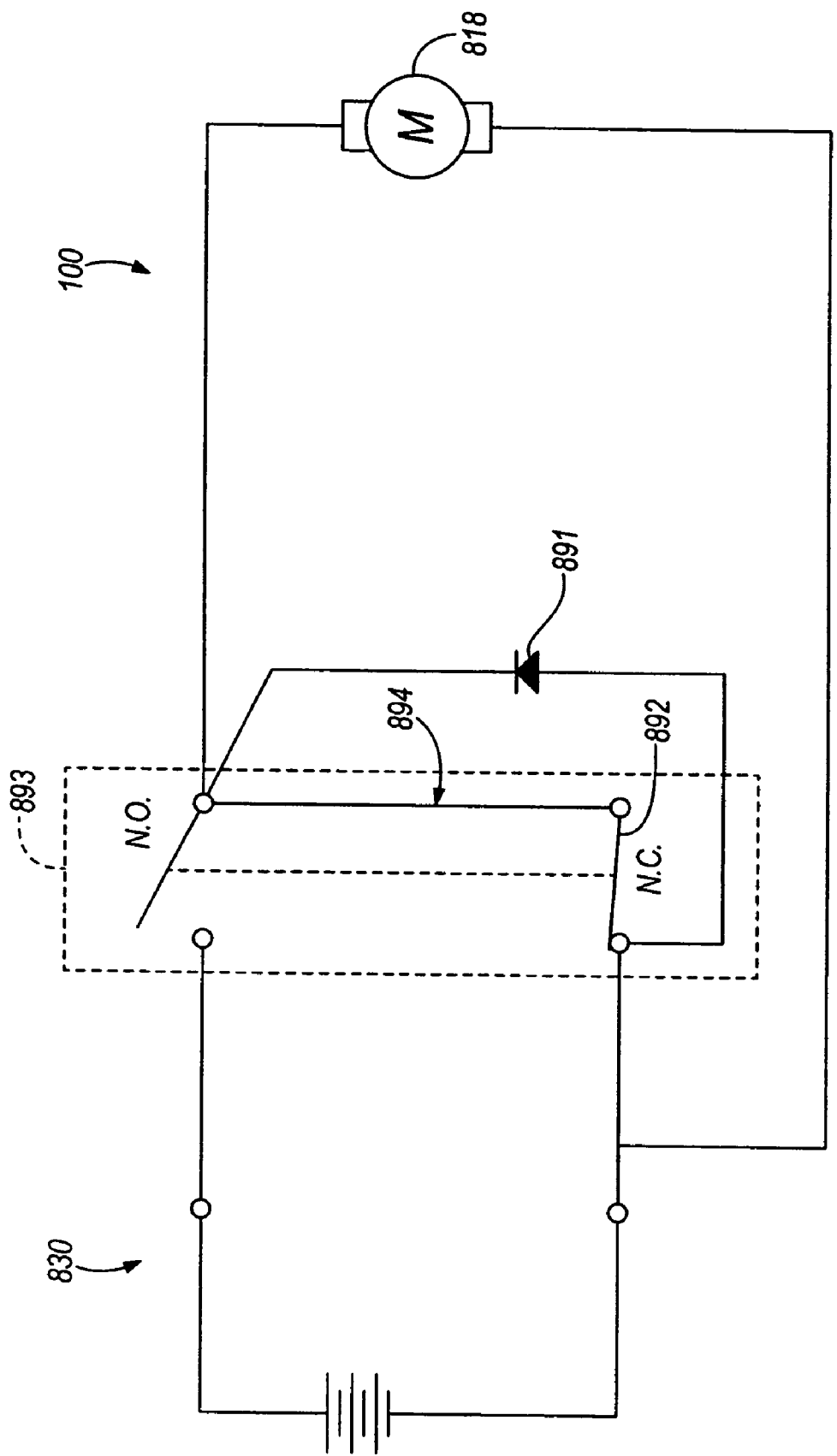
FIG. 24 is a further schematic diagram of a portion of battery electrically connected to a portion of an electrical circuit for a power tool.

FIGS. 22-24 illustrate examples of power tools 100 which include a free-wheeling diode 891 as the protection device. As shown in FIG. 22, the protection device, i.e. free-wheeling diode 891, is in parallel with the motor 818 of the power tool. As shown in FIG. 23, the protection device, i.e. free-wheeling diode 891, is in parallel with the normally-closed contact 892 of the on/off switch 893. As shown in FIG. 24, the protection device, i.e. free-wheeling diode 891, is positioned in parallel with the normally-closed contact 802 and the bus bar 894 of the on/off switch 893.

Figure 25:
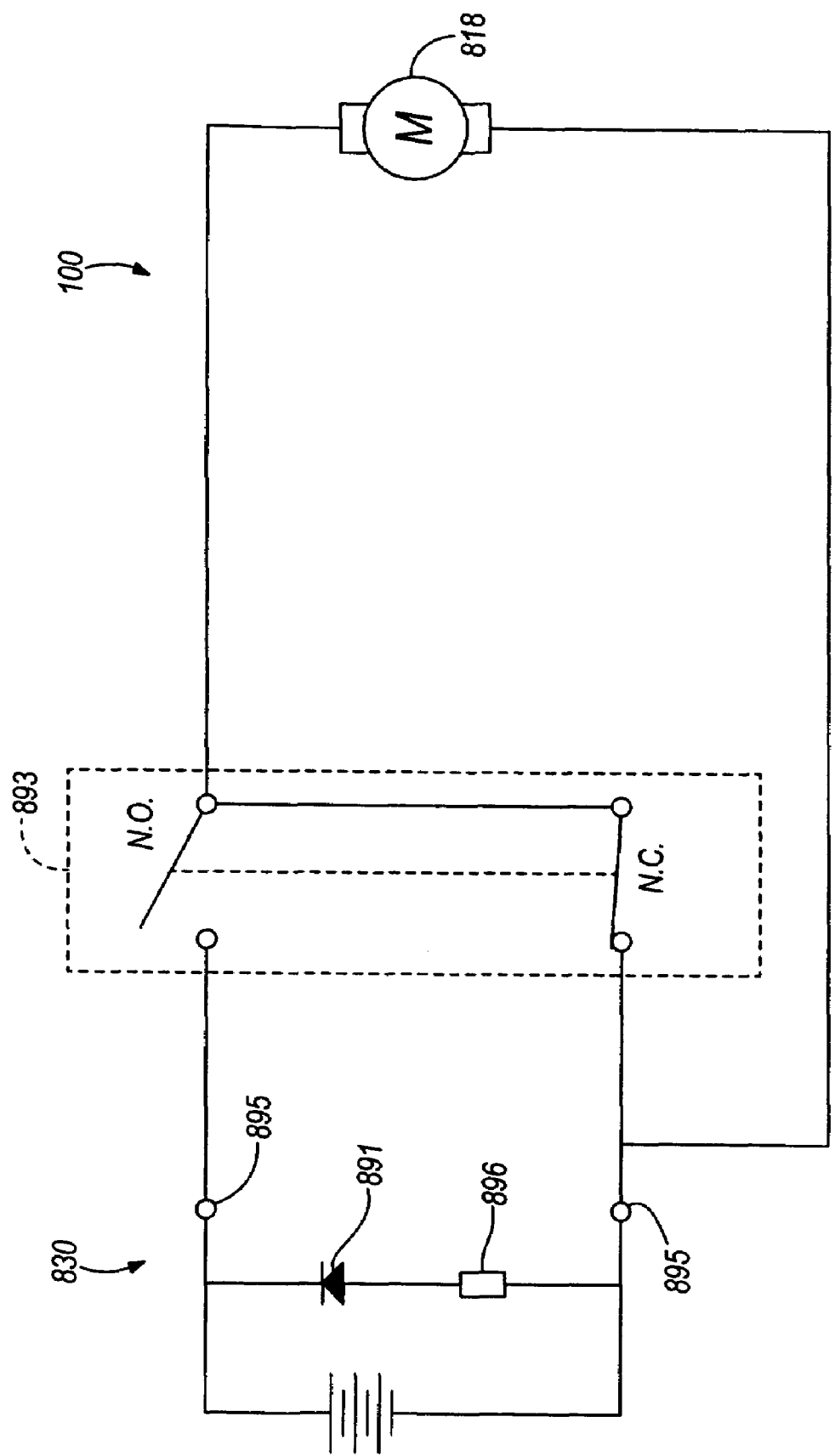
FIG. 25 is still a further schematic diagram of a portion of a battery electrically connected to a portion of an electrical circuit for a power tool.

However, in other constructions, the protection device may be included in the battery pack 830. As shown in FIG. 25, the protection device, i.e. free-wheeling diode 891, is positioned across the terminals 895 of the battery pack 830. Also, in some constructions, such as the construction shown in FIG. 25, the protection device can include the free-wheeling diode 891 in series with a fuse 896. The fuse 896 can add another level of protection for the battery pack 830 in the event that the free-wheeling diode 891 is damaged or fails. The fuse 896 can be a device that interrupts current when current exceeds a predetermined current rating. The fuse 896 can also be a device that interrupts current when current is sensed in a particular direction for a predetermined amount of time or when the temperature of the fuse 896 or another device exceeds a predetermined temperature rating. For example, if the free-wheeling diode 896 is mounted on a printed circuit board (not shown) within the battery pack 830, the fuse 896 can include a smaller conductive trace on the circuit board that will blow. The trace can only withstand so much heat and if the trace continues to heat due to a constant current, the trace will blow. In further constructions (not shown), the protection device can include two free-wheeling diodes 891 in series.

Figure 26:
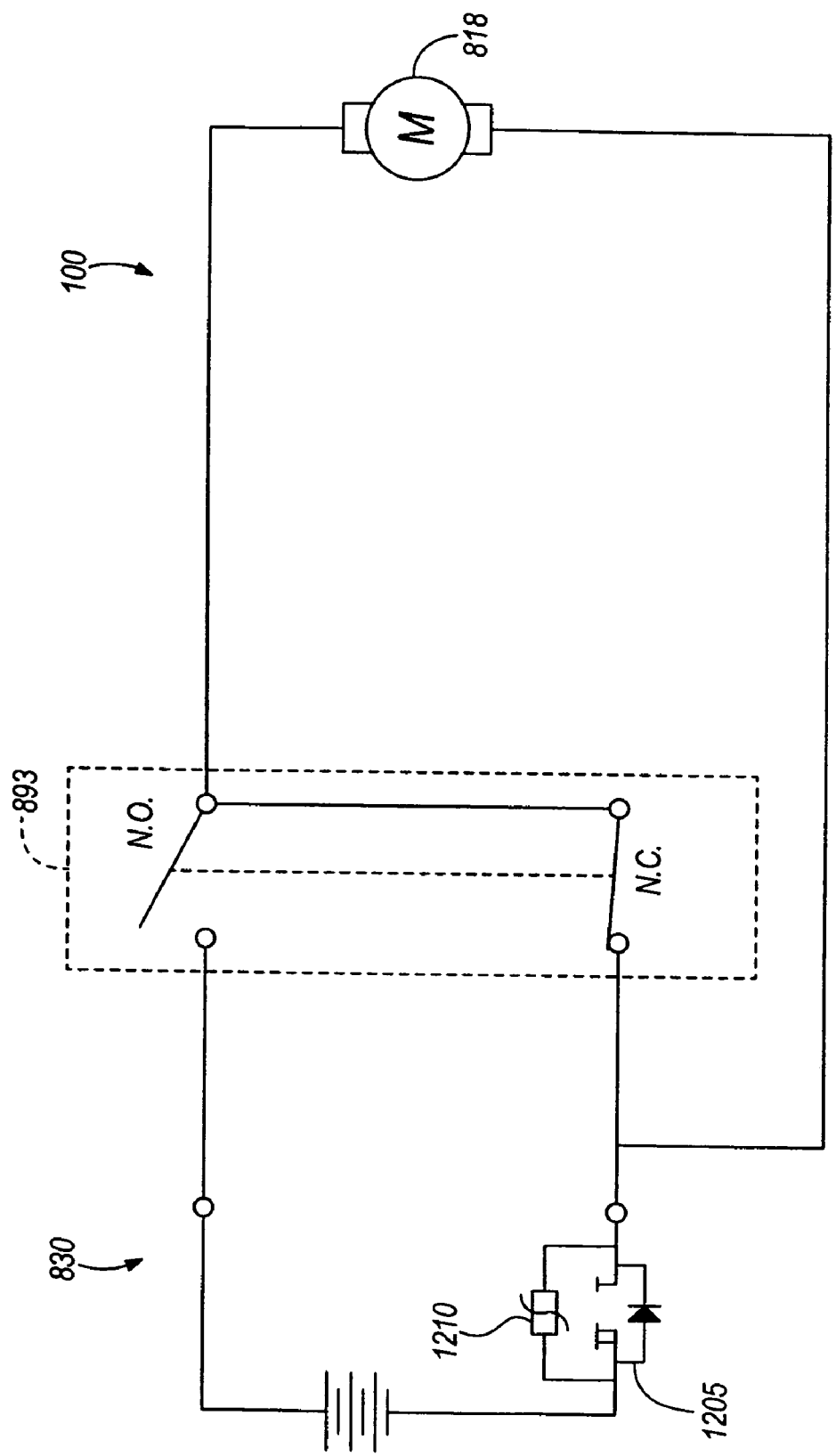
FIG. 26 is still a further schematic diagram of a portion of a battery electrically connected to a portion of an electrical circuit for a power tool.

In some constructions, such as the construction shown in FIG. 26, the protection device may include a voltage clamp device 1210. In this construction, the voltage clamp device 1210 is in parallel with the FET 1205 in the battery pack 830. The voltage clamp device 1210 limits the voltage across the FET 1205. For example, the voltage clamp device 1210 can include a zener diode.

Figure 27:
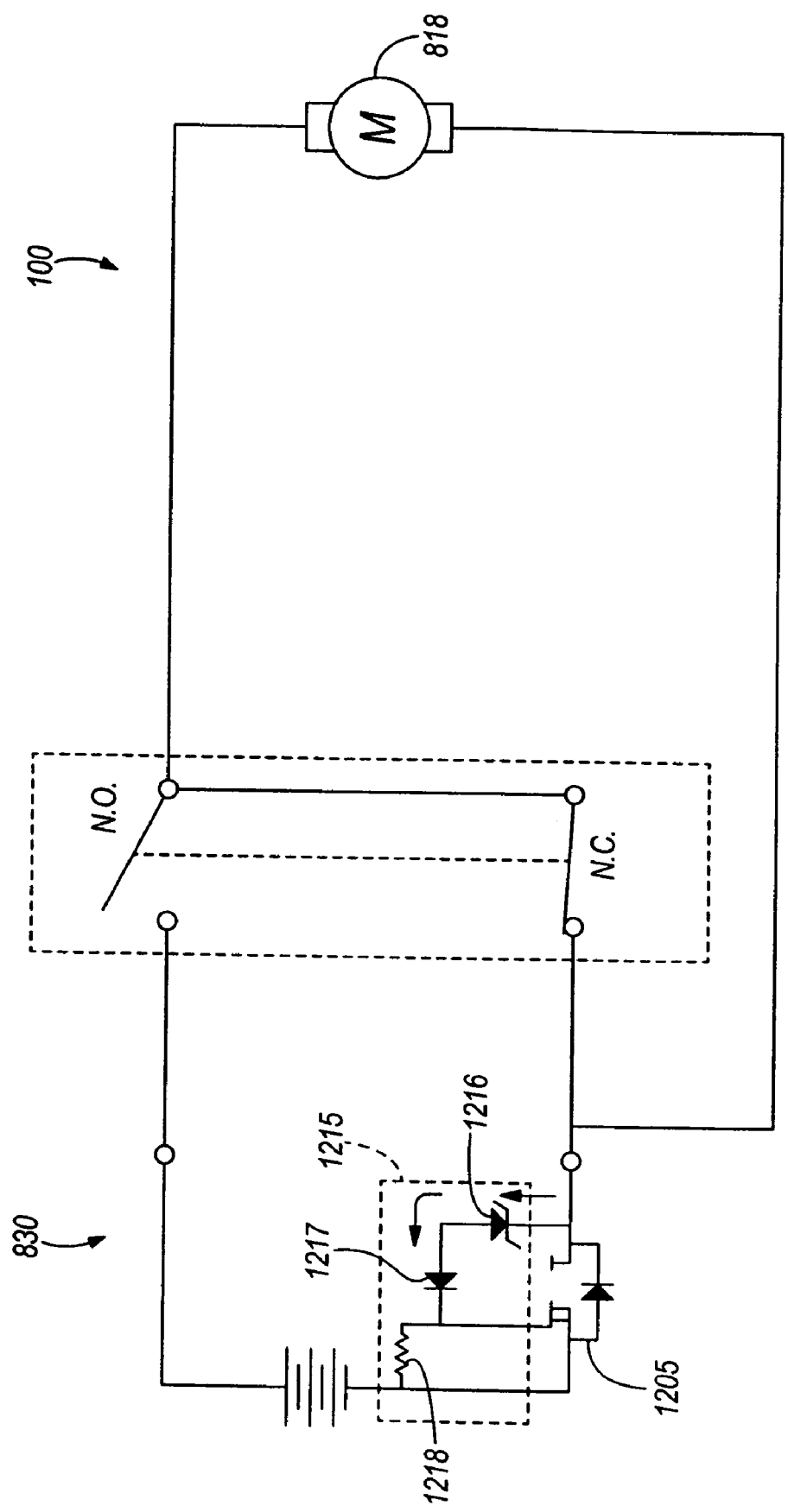
FIG. 27 is still a further schematic diagram of a portion of a battery electrically connected to a portion of an electrical circuit for a power tool.

In some constructions, such as the construction shown in FIG. 27, the protection device may include an active clamp circuit 1215. The active clamp circuit 1215 slows the switching speed of the FET 1205 in order to absorb the back emf current. In this construction, the active clamp 1215 includes a first diode 1216, a second diode 1217 and a resistive device 1218. In this construction, the FET 1205 is turned off causing current to conduct through the first diode 1216. The voltage drop across the active clamp 1215 causes the FET 1205 to switch to the ON state.

In these constructions in which the battery pack 830 includes the protection device, the battery pack 830 can be used with existing on/off power tools that may or may not include a protection device.

Figure 28:
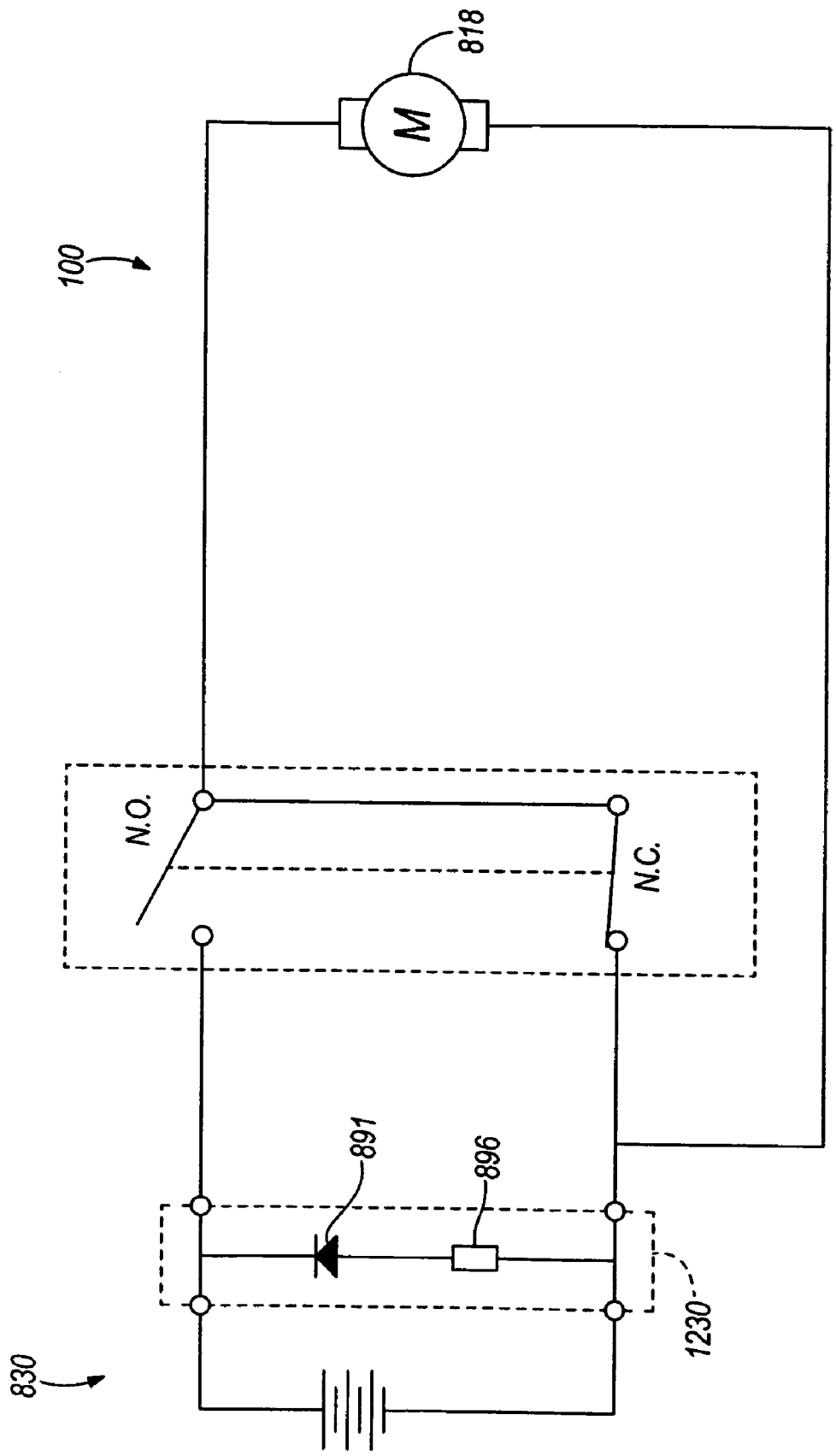
FIG. 28 is a schematic diagram of an electrical combination of a portion of a battery, an adapter and a portion of an electrical circuit for a power tool.

In some constructions, such as the construction shown in FIG. 28, the protection device may not be included in either the battery pack 830 or the power tool 100. As shown schematically in FIG. 28, the protection device (illustrated as the free-wheeling diode 891 and a fuse 896) may be included in an adapter 1230. In this construction, the adapter 1230 can be a device that allows a battery pack, such as battery pack 830, to electrically connect to and physically be coupled to a power tool that normally does not mate with the battery pack 830. For example, the battery pack 830 can be a slide-on battery pack and the power tool 100 can be configured to receive a tower-style battery pack.

In this construction, the adapter 1230 can be an adapter similar to the adapter shown and described in U.S. Pat. No. 6,525,511, entitled ADAPTER FOR A POWER TOOL, in U.S. Pat. No. 6,621,246, entitled ADAPTER FOR A POWER TOOL, in co-pending U.S. patent application Ser. No. 10/635,058, filed Aug. 6, 2003, entitled ADAPTER FOR A POWER TOOL, in co-pending U.S. patent application Ser. No. 11/095,780, entitled ADAPTER FOR A POWER TOOL, and in co-pending U.S. patent application Ser. No. 11/252,272, filed Oct. 17, 2005, entitled ADAPTER FOR A POWER TOOL. The adapter 1230 may also include the electronics included in the battery pack 830, such as, for example, the FET 1205. The adapter 1230 can also include any other electronics or components, with respect to the battery pack, shown and described in U.S. patent application Ser. Nos. 10/720,027 and 11/138,070, discussed above.

Although particular constructions embodying one or more independent aspects of the present invention have been shown and described, other alternative constructions will become apparent to those skilled in the art and are within the intended scope of the independent aspects of the present invention.

What is claimed is:

1. A combination comprising:
   a power tool having a body, a motor, a drive mechanism, and an on/off switch, the body housing the motor, the motor electrically connectable to the battery pack to receive a discharge current from the battery pack, the drive mechanism driven by the motor, and the on/off switch operable to control a discharge current from the battery pack when the battery pack is electrically connected to the motor, the drive mechanism being operably connected to a tool element; and
   a battery pack having at least one battery cell and an electronic circuit, the electronic circuit including a discharge control switch and an active clamp device positioned in parallel with the discharge control switch,
   the discharge control switch including a field effect transistor with a source terminal, a gate terminal, and a drain terminal,
   the active clamp device including a zener diode, a second diode, a resistive element, and a voltage tap connected to the gate terminal of the field effect transistor.

2. The combination of claim 1, wherein the second diode is oriented in the opposite direction of the discharge current, thereby preventing the discharge current from flowing through the active clamp device.

3. The combination of claim 1, wherein the active clamp device is configured to prevent back EMF caused by the motor from traveling in a direction opposite to that of the discharge current.

4. The combination of claim 1, wherein the active clamp device is configured to toggle the discharge control switch on and off.

5. The combination of claim 4, wherein the discharge current through the discharge control switch creates a negative voltage at the gate terminal relative to the source terminal thereby causing the discharge control switch to open.

6. The combination of claim 5, wherein the back EMF through the active clamp device creates a positive voltage at the gate terminal relative to the source terminal, thereby causing the discharge control switch to close.

7. The combination of claim 1, wherein
   the second diode is positioned in series with the zener diode, wherein the second diode is configured to prevent discharge current supplied by the at least one battery cell from flowing through the active clamp device,
   the resistive element is in series with the second diode and the zener diode, and
   the voltage tap is positioned between the diode and the resistive element and connected to the gate terminal of the field effect transistor.

* * * * *